United States Patent
Nagaoka et al.

(10) Patent No.: US 10,948,684 B2
(45) Date of Patent: Mar. 16, 2021

(54) INTERCHANGEABLE LENS

(71) Applicant: NIKON CORPORATION, Tokyo (JP)

(72) Inventors: Koji Nagaoka, Yokohama (JP);
Masateru Asayama, Kawasaki (JP);
Satoshi Kazahaya, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 16/444,614

(22) Filed: Jun. 18, 2019

(65) Prior Publication Data
US 2020/0026023 A1 Jan. 23, 2020

(30) Foreign Application Priority Data

Jul. 20, 2018 (JP) .............................. JP2018-137276

(51) Int. Cl.
*G02B 7/02* (2006.01)
*G03B 17/14* (2006.01)
*H04N 5/225* (2006.01)

(52) U.S. Cl.
CPC ............. *G02B 7/022* (2013.01); *G03B 17/14* (2013.01); *H04N 5/2254* (2013.01)

(58) Field of Classification Search
CPC ........ G02B 7/022; G02B 7/14; H04N 5/2254; G03B 17/14; G03B 17/00; G03B 2206/00
USPC ......................................................... 348/360
See application file for complete search history.

(56) References Cited

U.S. PATENT DOCUMENTS

| | | | | |
|---|---|---|---|---|
| 3,758,198 A | * | 9/1973 | Kanie | G03B 17/12 359/828 |
| 4,307,954 A | | 12/1981 | Ludwig | |
| 5,644,441 A | * | 7/1997 | Hirasaki | G02B 7/022 359/827 |
| 7,657,174 B2 | * | 2/2010 | Arai | G03B 17/14 396/535 |

(Continued)

FOREIGN PATENT DOCUMENTS

| | | |
|---|---|---|
| EP | 2725418 A1 | 4/2014 |
| EP | 3477376 A1 | 5/2019 |

(Continued)

OTHER PUBLICATIONS

Apr. 29, 2020 Extended European Search Report issued in European Patent Application No. 19183817.6.

(Continued)

*Primary Examiner* — Pritham D Prabhakher
(74) *Attorney, Agent, or Firm* — Oliff PLC

(57) ABSTRACT

An interchangeable lens that is removably attachable to a camera body includes: a lens-side mount; a cylindrical portion; a lens-side terminal group; a first lens-side projecting portion disposed at an outer periphery side of the lens-side terminal group, the first lens-side projecting portion projecting outwardly from the cylindrical portion and extending in a circumferential direction of the cylindrical portion; a third lens-side projecting portion at least partly disposed at a position facing the first lens-side projecting portion across the optical axis, the third lens-side projecting portion projecting outwardly from the cylindrical portion and extending in the circumferential direction; and a cutout provided on the third lens-side projecting portion in the circumferential direction.

17 Claims, 30 Drawing Sheets

(56) References Cited

U.S. PATENT DOCUMENTS

| | | | | |
|---|---|---|---|---|
| 8,770,868 | B1* | 7/2014 | Hasuda | G03B 17/14 |
| | | | | 396/531 |
| 9,197,801 | B2* | 11/2015 | Iikawa | G02B 7/022 |
| 10,775,585 | B2* | 9/2020 | Sasaki | H04N 5/23248 |
| 10,775,682 | B2* | 9/2020 | Shigematsu | G03B 17/565 |
| 10,782,598 | B2* | 9/2020 | Yamazaki | G03B 17/14 |
| 2008/0002968 | A1* | 1/2008 | Arai | G03B 17/14 |
| | | | | 396/448 |
| 2012/0201531 | A1* | 8/2012 | Hasuda | G03B 17/566 |
| | | | | 396/531 |
| 2014/0111686 | A1* | 4/2014 | Iikawa | G03B 17/14 |
| | | | | 348/374 |
| 2014/0119720 | A1* | 5/2014 | Iikawa | G02B 7/14 |
| | | | | 396/531 |
| 2014/0119721 | A1* | 5/2014 | Iikawa | G03B 17/14 |
| | | | | 396/531 |
| 2015/0016814 | A1* | 1/2015 | Kuroiwa | G03B 17/14 |
| | | | | 396/530 |
| 2016/0050373 | A1* | 2/2016 | Nakamura | H04N 5/2254 |
| | | | | 348/208.11 |
| 2016/0291282 | A1* | 10/2016 | Matsui | G02B 7/14 |
| 2018/0203213 | A1* | 7/2018 | Ueki | H04N 5/2254 |

FOREIGN PATENT DOCUMENTS

| | | |
|---|---|---|
| JP | S55-138628 U1 | 10/1980 |
| JP | S58-086530 A | 5/1983 |
| JP | H05-25435 U | 4/1993 |
| JP | H05-25436 U | 4/1993 |
| JP | H08-043910 A | 2/1996 |
| JP | 2004-102005 A | 4/2004 |
| JP | 2010117571 A | 5/2010 |
| JP | 2013-003391 A | 1/2013 |

OTHER PUBLICATIONS

Nov. 20, 2018 Office Action issued in Japanese Patent Application No. 2018-196899.

Nov. 20, 2018 Office Action issued in Japanese Patent Application No. 2018-137276.

Apr. 2, 2019 Office Action issued in Japanese Patent Application No. 2018-137276.

* cited by examiner

INTERCHANGEABLE LENS

INCORPORATION BY REFERENCE

The disclosure of the following priority application is herein incorporated by reference: Japanese Patent Application No. 2018-137276 filed Jul. 20, 2018

TECHNICAL FIELD

The present invention relates to an interchangeable lens.

BACKGROUND ART

An accessory which can be removably attached to a camera body is known (refer to, PTL1). Conventionally, it has been necessary to attach an accessory to a camera body properly in a usable manner.

CITATION LIST

Patent Literature

PTL1: Japanese Laid-Open Patent Publication No. H08-43910

SUMMARY OF INVENTION

According to a first aspect of the present invention, an interchangeable lens removably attachable to a camera body that includes: an image sensor onto which a subject light is incident; a body-side terminal group disposed in an arc shape outside the image sensor; a body-side mount having a ring shape disposed outside the body-side terminal group; a plurality of body-side projecting portions each projecting inwardly from the body-side mount; and a plurality of elastic members respectively disposed at an image side of the plurality of body-side projecting portions, the interchangeable lens comprising: a lens-side mount that is configured to contact with the body-side mount with the interchangeable lens being attached to the camera body; a cylindrical portion extending from an inner peripheral edge of the lens-side mount in an optical axis direction of the subject light; a lens-side terminal group that is disposed inside the cylindrical portion and is configured to contact with the body-side terminal group with the interchangeable lens being attached to the camera body; a first lens-side projecting portion disposed at an outer periphery side of the lens-side terminal group, the first lens-side projecting portion projecting outwardly from the cylindrical portion and extending in a circumferential direction of the cylindrical portion; a third lens-side projecting portion at least partly disposed at a position facing the first lens-side projecting portion across the optical axis, the third lens-side projecting portion projecting outwardly from the cylindrical portion and extending in the circumferential direction; and a cutout provided at the third lens-side projecting portion in the circumferential direction.

According to a second aspect of the present invention, an interchangeable lens removably attachable to a camera body that includes: an image sensor onto which a subject light is incident; a body-side terminal group disposed in an arc shape outside the image sensor; a body-side mount having a ring shape disposed outside the body-side terminal group; a plurality of body-side projecting portions each projecting inwardly from the body-side mount; and a plurality of elastic members respectively disposed at an image side of the plurality of body-side projecting portions, the interchangeable lens comprising: a lens-side mount that is configured to contact with the body-side mount with the interchangeable lens being attached to the camera body; a cylindrical portion extending from an inner peripheral edge of the lens-side mount in an optical axis direction of the subject light; and a plurality of lens-side projecting portions projecting outwardly from the cylindrical portion and extending in the circumferential direction of the cylindrical portion, wherein: the plurality of lens-side projecting portions comprises: a fifth lens-side projecting portion having a fifth longest length in the circumferential direction; and a fourth lens-side projecting portion having a fourth longest length in the circumferential direction; and a first lens-side projecting portion disposed at a position facing at least a part of the fifth lens-side projecting portion and at least a part of the fourth lens-side projecting portion across the optical axis.

According to a third aspect of the present invention, an interchangeable lens removably attachable to a camera body that includes: an image sensor onto which a subject light is incident; a body-side terminal group disposed in an arc shape outside the image sensor; a body-side mount having a ring shape disposed outside the body-side terminal group; a plurality of body-side projecting portions each projecting inwardly from the body-side mount; and a plurality of elastic members respectively disposed at an image side of the plurality of body-side projecting portions, the interchangeable lens comprising: a lens-side mount that is configured to contact with the body-side mount; a cylindrical portion extending from an inner peripheral edge of the lens-side mount in an optical axis direction of the subject light; a lens-side terminal group that is disposed inside the cylindrical portion and is configured to contact with the body-side terminal group when attached to the camera body; and a plurality of lens-side projecting portions projecting outwardly from the cylindrical portion and extending in a circumferential direction of the cylindrical portion, wherein: the plurality of lens-side projection portions comprises: a first lens-side projecting portion disposed at an outer circumference side of the lens-side terminal group, the first lens-side projecting portion having a longest length in the circumferential direction among the plurality of lens projecting portions; and a fourth lens-side projecting portion disposed at a position facing the first lens-side projecting portion across the optical axis, the fourth lens-side projecting portion having a fourth longest length in the circumferential direction among the plurality of lens-side projecting portions.

According to a fourth aspect of the present invention, an interchangeable lens removably attachable to a camera body that includes: an image sensor onto which a subject light is incident; a body-side terminal group disposed in an arc shape outside the image sensor; a body-side mount having a ring shape disposed outside the body-side terminal group; a plurality of body-side projecting portions each projecting inwardly from the body-side mount; and four elastic members respectively disposed at an image side of the plurality of body-side projecting portions, the interchangeable lens comprising: a lens-side mount that is configured to contact with the body-side mount; a fixing member to which the lens-side mount is fixed, the fixing member being disposed in a direction orthogonal to an optical axis of the subject light; a cylindrical portion extending from an inner peripheral edge of the lens-side mount in the optical axis direction; a lens-side terminal group that is disposed inside the cylindrical portion and is configured to contact with the body-side terminal group when attached to the camera body; and a plurality of lens-side projecting portions projecting outwardly from the cylindrical portion and extending in a circumferential direction of the cylindrical portion, wherein: the plurality of lens-side projecting portions include four facing portions that face the four elastic members when the interchangeable lens is attached to the camera body; the lens-side mount is fixed to the fixing member with at least four screws; and the four screws are respectively disposed at an outer periphery side of the four facing portions and at one side of the four facing portions in the circumferential direction.

According to a fifth aspect of the present invention, an interchangeable lens removably attachable to a camera body that includes a body-side mount and a body-side terminal group, the interchangeable lens comprising: a lens-side mount that is configured to contact with the body-side mount with the interchangeable lens being attached to the camera body; a cylindrical portion extending from an inner peripheral edge of the lens-side mount in an optical axis direction of light entering the camera body; a lens-side terminal group that is disposed inside the cylindrical portion and is configured to contact with the body-side terminal group when the interchangeable lens is attached to the camera body; a first lens-side projecting portion disposed at an outer circumference side of the lens-side terminal group, the first lens-side projecting portion projecting outwardly from the cylindrical portion and extending in a circumferential direction of the cylindrical portion; a third lens-side projecting portion that projects outwardly from the cylindrical portion and extends in the circumferential direction, at least part of the third lens-side projecting portion being disposed at a position facing the first lens-side projecting portion across the optical axis; and a cutout provided at the third lens-side projecting portion in the circumferential direction.

According to a sixth aspect of the present invention, an interchangeable lens removably attachable to a camera body that includes a body-side mount and a body-side terminal group, the interchangeable lens comprising: a lens-side mount that is configured to contact with the body-side mount with the interchangeable lens being attached to the camera body; a cylindrical portion extending from an inner peripheral edge of the lens-side mount in an optical axis direction of a subject light; a plurality of lens-side projecting portions projecting outwardly from the cylindrical portion and extending in a circumferential direction of the cylindrical portion, wherein: the plurality of lens-side projecting portions comprises: a fifth lens-side projecting portion having a fifth longest length in the circumferential direction; and a fourth lens-side projecting portion having a fourth longest length in the circumferential direction; and a first lens-side projecting portion disposed at a position facing at least a part of the fifth lens-side projecting portion and at least a part of the fourth lens-side projecting portion across the optical axis.

DESCRIPTION OF EMBODIMENTS

Camera System 1

Figure 1A:
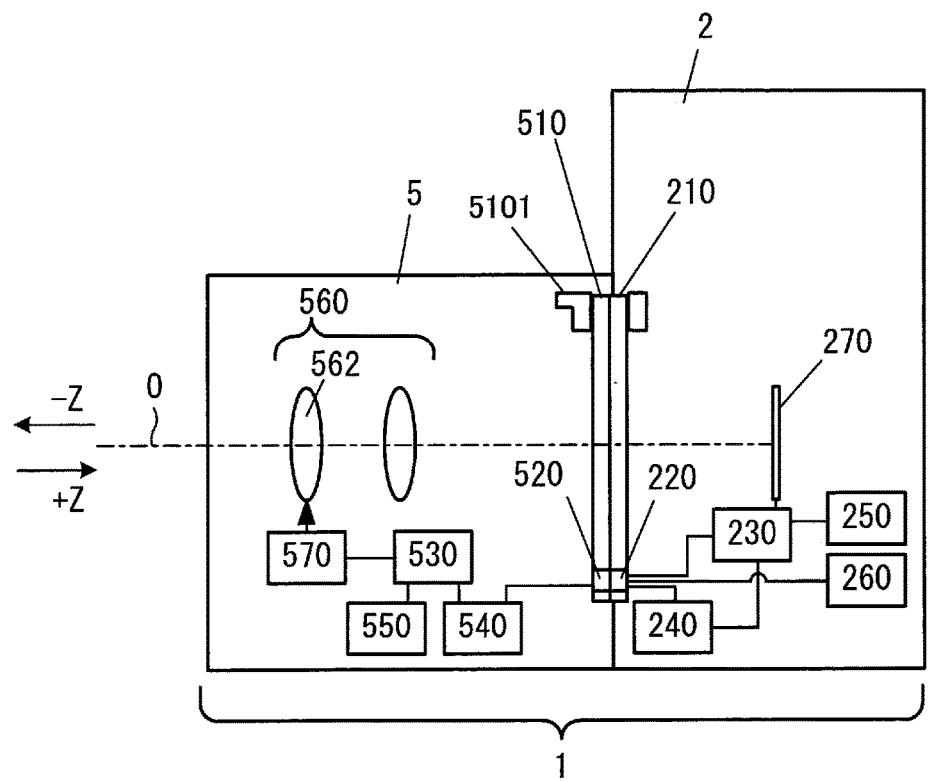
FIGS. 1A and 1B are views schematically illustrating a configuration of a camera system.

FIGS. 1A and 1B and FIGS. 2A and 2B schematically illustrate a configuration of a camera system 1 according to an embodiment of the present invention. The camera system 1 includes a camera body 2, a teleconverter 3 which can be removably attached to the camera body 2, a compatible lens 5 which can be removably attached to the camera body 2 and the teleconverter 3, and a non-compatible lens 6 which can be removably attached to the camera body 2 and cannot be attached to the teleconverter 3.

Figure 1B:
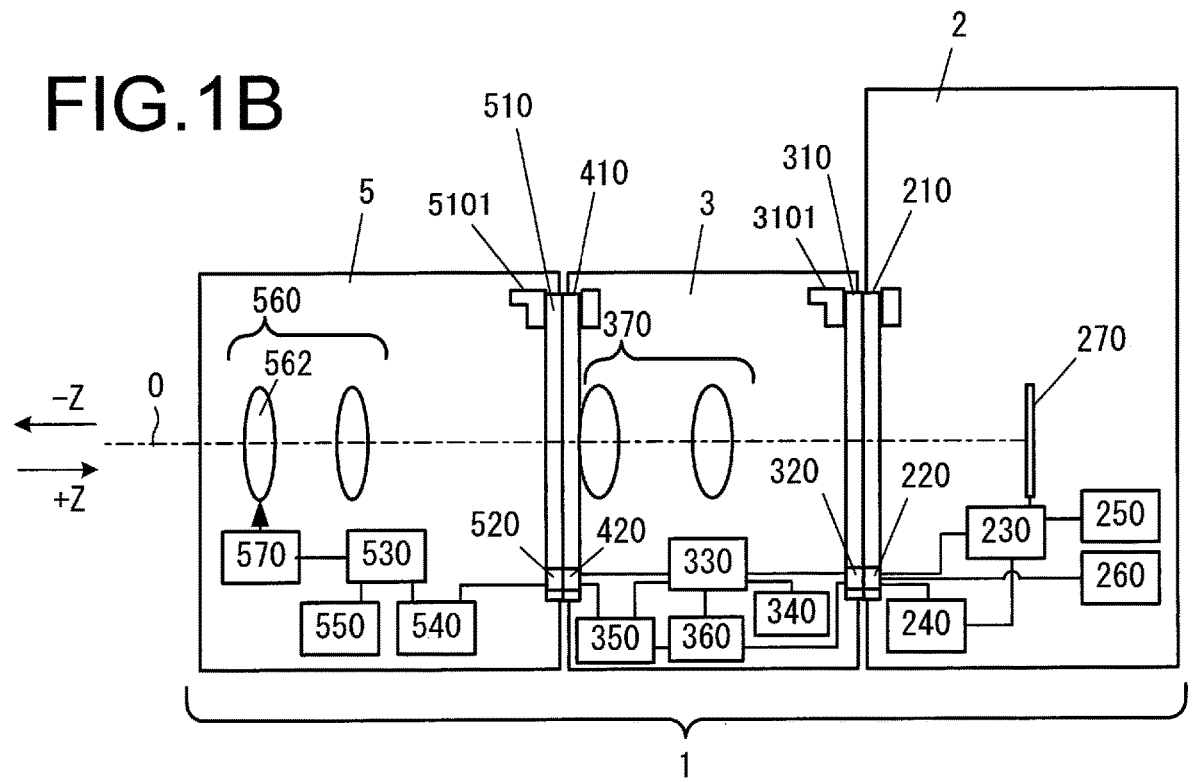

As illustrated in FIGS. 1A and 1B, the compatible lens 5 can be removably attached to the camera body 2 via the teleconverter 3. FIG. 1A illustrates an example where the compatible lens 5 is attached to the camera body 2, and FIG. 1B illustrates an example where the teleconverter 3 is interposed between the compatible lens 5 and the camera body 2. The compatible lens 5 is attached to the camera body 2 with a so-called bayonet coupling of a compatible mount 510 of the compatible lens 5 to a body-side mount 210 of the camera body 2. The teleconverter 3 is attached to the camera body 2 with a so-called bayonet coupling of a rear mount 310 of the teleconverter 3 to the body-side mount 210 of the camera body 2. The compatible lens 5 is attached to the teleconverter 3 with a so-called bayonet coupling of the compatible mount 510 of the compatible lens 5 to a front mount 410 of the teleconverter 3.

Figure 2A:
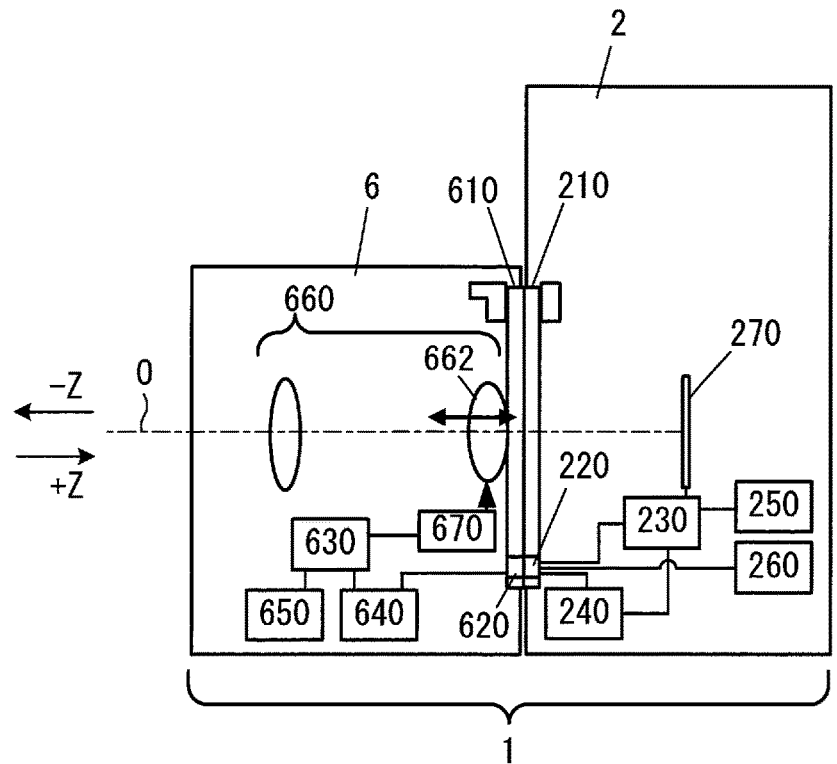
FIGS. 2A and 2B are views schematically illustrating a configuration of a camera system.

As illustrated in FIG. 2A, the non-compatible lens 6 can be removably attached to the camera body 2. The non-compatible lens 6 is attached to the camera body 2 with a so-called bayonet coupling of a non-compatible mount 610 of the non-compatible lens 6 to the body-side mount 210 of the camera body 2. The body-side mount 210 and the front mount 410 have different shapes, and the non-compatible mount 610 and the compatible mount 510 have different shapes. Therefore, the compatible mount 510 can be removably attached to both the body-side mount 210 and the front mount 410, and the non-compatible mount 610 can be removably attached to the body-side mount 210 and cannot be attached to the front mount 410.

Figure 2B:
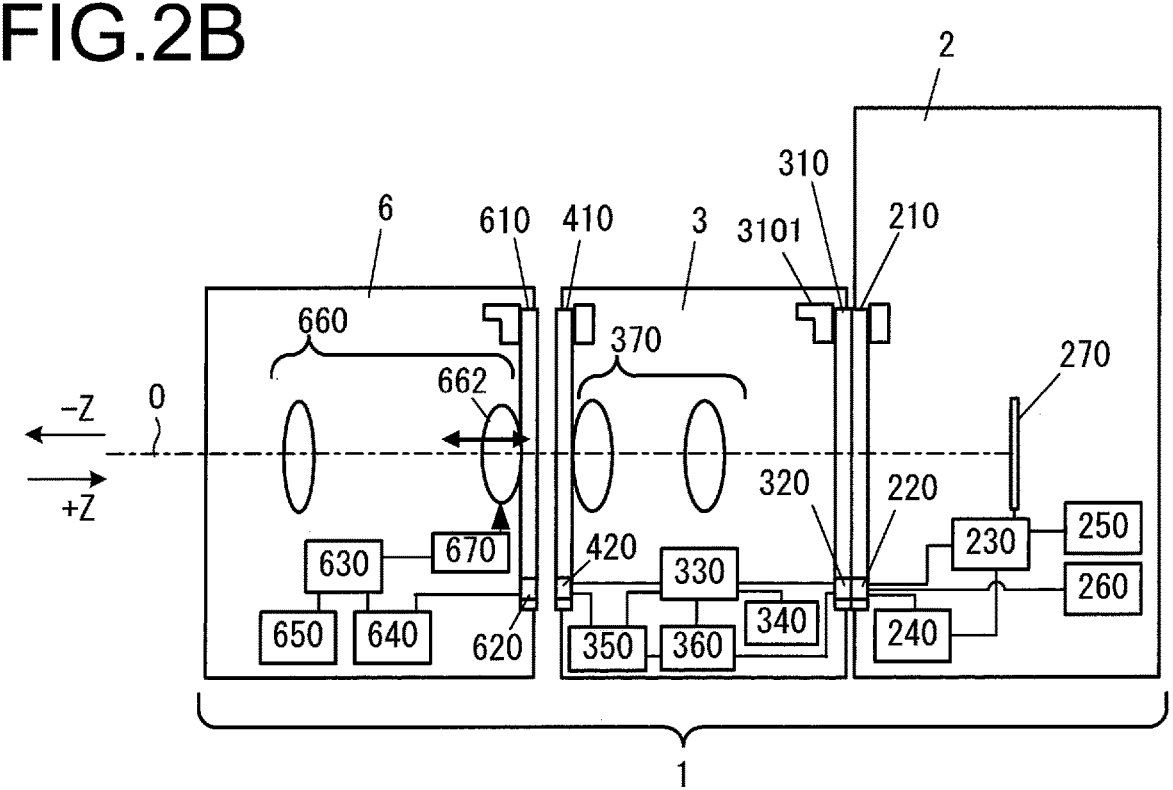

Here, the non-compatible lens 6 may be such an interchangeable lens or the like that, if it is tried to attach the non-compatible lens 6 to the teleconverter 3, a lens most toward the image side among lenses included in the non-compatible lens 6 moves in an optical axis O direction, so that the lens hits a lens closest to a subject among lenses of the teleconverter 3, as illustrated in FIG. 2B. Preferably, an interchangeable lens is also considered as a non-compatible lens 6, when any part in the interchangeable lens other than the lens most toward the image side hits a part of the teleconverter 3. Note that an interchangeable lens which need not be attached to the teleconverter 3 may also be considered as a non-compatible lens 6, whether any part in the interchangeable lens hits the teleconverter 3 or not.

Camera Body 2

The camera body 2 includes the body-side mount 210, a body-side terminal holding unit 220, a body-side CPU 230, a body-side communication unit 240, a body-side storage unit 250, a power supplying unit 260 and an image sensor 270. The body-side mount 210 and the body-side terminal holding unit 220 will be described in detail later.

The body-side CPU 230 is configured with a microcomputer, its peripheral circuits, and the like. The body-side CPU 230 performs various kinds of control on the camera body 2, the teleconverter 3, the compatible lens 5, and the non-compatible lens 6. The body-side communication unit 240 performs predetermined data communication with the teleconverter 3, the compatible lens 5, and the non-compatible lens 6. The body-side communication unit 240 is connected to a plurality of body-side terminals (which will be described later) provided at the body-side terminal holding unit 220, and the body-side CPU 230.

The body-side storage unit 250 is a non-volatile storage medium. The body-side storage unit 250 is connected to the body-side CPU 230. In the body-side storage unit 250, a predetermined control program, or the like, to be executed by the body-side CPU 230 is stored in advance. The body-side CPU 230 controls the camera body 2 by loading the control program from the body-side storage unit 250 and executing the program.

The power supplying unit 260 includes a power source, and supplies power to the camera body 2, the teleconverter 3, the compatible lens 5, and the non-compatible lens 6. The power supplying unit 260 is connected to the body-side terminals (which will be described later) provided at the body-side terminal holding unit 220, and the body-side CPU 230.

The image sensor 270 is, for example, a solid image sensor such as a CCD and a CMOS. The image sensor 270 is connected to the body-side CPU 230, captures an image of a subject and outputs an imaging signal. Explanation regarding processing on the imaging signal outputted will be omitted.

Teleconverter 3

The teleconverter 3 includes the rear mount 310, a rear terminal holding unit 320, the front mount 410, a front terminal holding unit 420, a teleconverter-side control/communication unit 330, a teleconverter-side storage unit 340, a switch 350, a teleconverter-side power supply circuit 360, and a lens 370. The rear mount 310, the rear terminal holding unit 320, the front mount 410, and the front terminal holding unit 420 will be described in detail later.

The teleconverter-side control/communication unit 330 is configured with a microcomputer, its peripheral circuits, and the like. The teleconverter-side control/communication unit 330 performs various kinds of control on the teleconverter 3, such as open/close control of the switch 350. The teleconverter-side control/communication unit 330 is interposed between the camera body 2 and the compatible lens 5 to perform predetermined data communication. The teleconverter-side control/communication unit 330 is connected to a plurality of body-side terminals (which will be described later) provided at the rear terminal holding unit 320.

The teleconverter-side control/communication unit 330 performs the open/close control on the switch 350 by executing a control program stored in the teleconverter-side storage unit 340. When the switch 350 is closed, power supplied from the camera body 2 to the teleconverter-side power supply circuit 360 is supplied to the compatible lens 5. When the switch 350 is open, the supply of the power to the compatible lens 5 is interrupted. The teleconverter-side control/communication unit 330 performs predetermined communication with the body-side communication unit 240.

The teleconverter-side control/communication unit 330 controls recording and reading of data in the teleconverter-side storage unit 340. In addition to storing control programs or the like to be executed by the teleconverter-side control/communication unit 330, the teleconverter-side storage unit 340 can store data (such as model name and magnification) regarding the teleconverter 3.

The lens 370 is a teleconverter lens that increases a focal length of the compatible lens 5. In a state where the teleconverter 3 is attached to the compatible lens 5, the focal length of the compatible lens 5 is 1.4 times larger than that in a state where the teleconverter 3 is not attached to the compatible lens 5. Although the magnification of the teleconverter 3 is set to 1.4 in the present embodiment, the magnification is not limited to this value.

Compatible Lens 5

The compatible lens 5 includes the compatible mount 510, a lens-side terminal holding unit 520, a lens-side CPU 530, a lens-side communication unit 540, a lens-side storage unit 550, an imaging optical system 560, and a driving unit 570. The compatible mount 510 and the lens-side terminal holding unit 520 will be described in detail later.

The lens-side CPU 530 is configured with a microcomputer, its peripheral circuits, and the like. The lens-side communication unit 540 performs predetermined data communication with the camera body 2, or with the camera body 2 via the teleconverter 3. The lens-side communication unit 540 is connected to lens-side terminals (which will be described later) provided at the lens-side terminal holding unit 520, and the lens-side CPU 530. The lens-side storage unit 550 is a non-volatile storage medium. The lens-side storage unit 550 is connected to the lens-side CPU 530. In the lens-side storage unit 550, a predetermined control program, or the like, to be executed by the lens-side CPU 530 is stored in advance. The lens-side CPU 530 controls the compatible lens 5 by loading the control program from the lens-side storage unit 550 and executing the program.

The imaging optical system 560 forms a subject image on an imaging surface of the image sensor 270. The optical axis O of the imaging optical system 560 substantially coincides with the center of the compatible mount 510, the front mount 410, the rear mount 310, the body-side mount 210, and the image sensor 270. The imaging optical system 560 has a plurality of lenses including a focusing lens 562. The focusing lens 562 is a lens for adjusting a position where the subject image is formed. The driving unit 570 is connected to the lens-side CPU 530 and includes an actuator, or the like, which is not illustrated. The driving unit 570 moves the focusing lens 362 back and forth in a direction of the optical axis O (+Z or −Z direction) by this actuator, or the like.

Non-Compatible Lens 6

The non-compatible lens 6 includes the non-compatible mount 610, a lens-side terminal holding unit 620, a lens-side CPU 630, a lens-side communication unit 640, a lens-side storage unit 650, an imaging optical system 660, and a driving unit 670. The non-compatible mount 610 and the lens-side terminal holding unit 620 will be described in detail later.

In contrast to the imaging optical system 560 of the compatible lens 5, the imaging optical system 660 of the non-compatible lens 6 includes a lens that moves in the optical axis O direction, such as a focusing lens 662, located closest to the image. Thus, the non-compatible mount 610 has a shape different from that of the compatible mount 510, so that non-compatible lens 6 will not be attached to the teleconverter 3. The lens-side CPU 630, the lens-side communication unit 640, the lens-side storage unit 650, and the driving unit 670 of the non-compatible lens 6 may be equivalent to the lens-side CPU 530, the lens-side communication unit 540, the lens-side storage unit 550, and the driving unit 570 of the compatible lens 5, but they may be changed as appropriate.

Body-Side Mount 210

Figure 3:
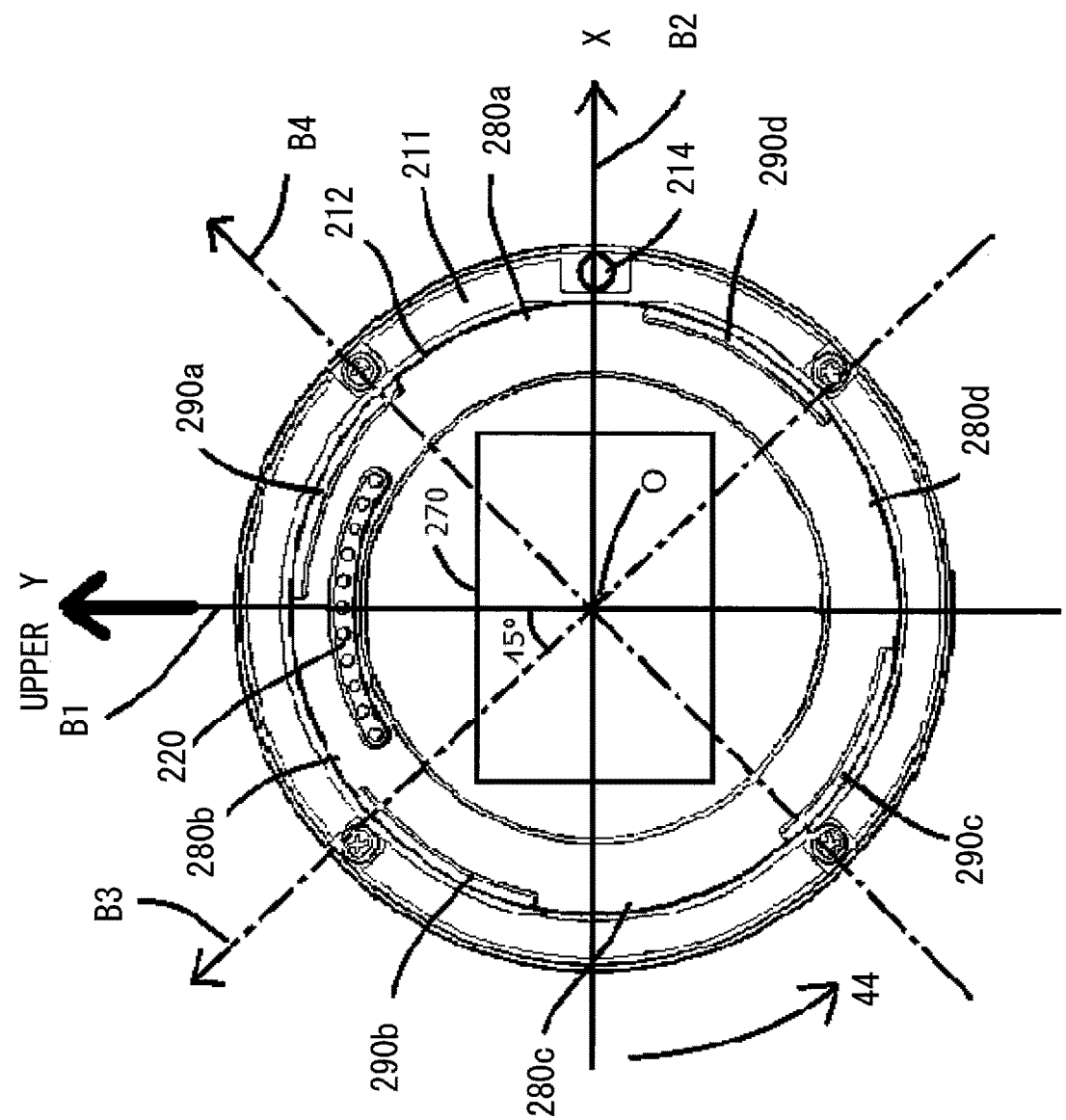
FIG. 3 is a front view of a mount surface of a camera body, as seen from a subject side.
Figure 4:
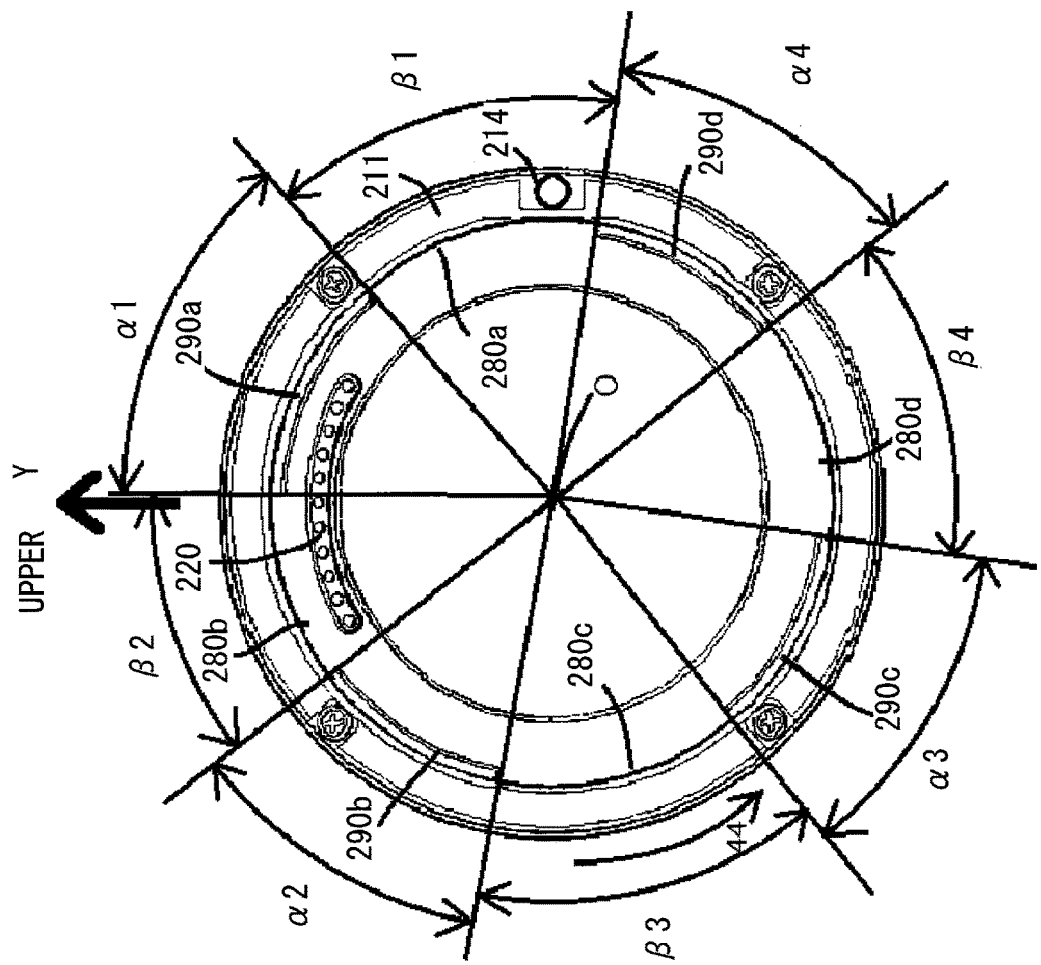
FIG. 4 is a front view of a mount surface of a camera body, as seen from a subject side.

FIG. 3 and FIG. 4 are views schematically illustrating the mount of the camera body 2, as seen from the subject side. FIG. 3 and FIG. 4 illustrate the camera body 2 being held in a laterally holding or in a lateral orientation. As illustrated in FIG. 3, in the case where the camera body 2 is held in the laterally holding, the rectangular image sensor 270 is placed so that the longitudinal direction of the image sensor 270 extends in a horizontal or lateral direction, that is, so that long sides become an upper side and a lower side, and short sides become a right side and a left side. A first body-side line B1 extending in a vertical direction Y of the camera body 2, indicated with a solid line in FIG. 3, is in an up-and-down direction seen from a photographer who is using the camera system 1 and holding the camera body 2 in the laterally holding. A second body-side line B2 extending in a horizontal direction X of the camera body 2, indicated with a solid line in FIG. 3, is in a right and left direction seen from the photographer who is using the camera system 1 and holding the camera body 2 in the laterally holding.

The first body-side line B1 is orthogonal to the second body-side line B2 on the optical axis O (center). Lines B3 and B4 indicated with a dashed-dotted line in FIG. 3 extend in directions intersecting with the first body-side line B1 and the second body-side line B2 on the optical axis O of the image sensor 270 at 45 degrees. These Lines B3 and B4 are referred to as a third body-side line B3 and a fourth body-side line B4.

The mount of the camera body 2 includes the body-side terminal holding unit 220 disposed in an arc shape at an outer circumference of the image sensor 270, and the ring-shaped body-side mount 210 disposed outwardly of the body-side terminal holding unit 220. The body-side mount 210 includes a ring-shaped reference surface 211 which has a fixed width and which is disposed along a plane orthogonal to the optical axis O. The body-side mount 210 includes a first body-side claw or tab portion 290a, a second body-side claw or tab portion 290b, a third body-side claw or tab portion 290c, and a fourth body-side claw or tab portion 290d, as projecting portions each projecting from an inner circumference of the body-side mount 210 toward the optical axis O.

In the following explanation, these first body-side claw portion 290a to fourth body-side claw portion 290d which are four projecting portions will be collectively referred to as a body-side claw portion 290.

The body-side claw portions 290 are disposed along a circular opening 212 of the body-side mount 210 at intervals. As illustrated in FIG. 3, the first body-side claw portion 290a, the second body-side claw portion 290b, the third body-side claw portion 290c and the fourth body-side claw portion 290d are respectively disposed at an upper right position, at an upper left position, at a lower left position and at a lower right position. The first body-side claw portion 290a is disposed in a region above the second body-side line B2 and on a right side of the first body-side line B1, the second body-side claw portion 290b is disposed in a region above the second body-side line B2 and on a left side of the first body-side line B1, the third body-side claw portion 290c is disposed in a region below the second body-side line B2 and on a left side of the first body-side line B1, and the fourth body-side claw portion 290d is disposed in a region below the second body-side line B2 and on a right side of the first body-side line B1.

The first body-side claw portion 290a and the third body-side claw portion 290c are disposed on the fourth body-side line B4, facing each other across the optical axis O. The second body-side claw portion 290b and the fourth body-side claw portion 290c are disposed on the third body-side line B3, facing each other across the optical axis O.

Note that the central position in the circumferential direction of each of the first body-side claw portion 290a to the fourth body-side claw portion 290d is not on the third body-side line B3 or the fourth body-side line B4, as illustrated in FIG. 3.

As illustrated in FIG. 4, lengths in the circumferential directions of the first body-side claw portion 290a to the fourth body-side claw portion 290d are different from each other. Specifically, the first body-side claw portion 290a is the longest, the third body-side claw portion 290c is the second longest, the fourth body-side claw portion 290d is the third longest, and the second body-side claw portion 290b is the shortest.

An angle $\alpha 1$ formed by a line connecting one end of the first body-side claw portion 290a and the optical axis O and a line connecting the other end of the first body-side claw portion 290a and the optical axis O is approximately 47 degrees, and is between 46.5 degrees and 47.5 degrees.

An angle $\alpha 3$ formed by a line connecting one end of the third body-side claw portion 290c and the optical axis O and a line connecting the other end of the third body-side claw portion 290c and the optical axis O is approximately 42.5 degrees, and is between 42.0 degrees and 43.0 degrees.

An angle $\alpha 4$ formed by a line connecting one end of the fourth body-side claw portion 290d and the optical axis O and a line connecting the other end of the fourth body-side claw portion 290d and the optical axis O is approximately 42 degrees, and is between 41.5 degrees and 42.5 degrees.

An angle $\alpha 2$ formed by a line connecting one end of the second body-side claw portion 290b and the optical axis O and a line connecting the other end of the second body-side claw portion 290b and the optical axis O is approximately 40 degrees, and is between 40.0 degrees and 41.0 degrees.

Lengths of the first body-side claw portion 290a to the fourth body-side claw portion 290d in a radial direction (heights of the claw portions) are the same. Further, lengths of the first body-side claw portion 290a to the fourth body-side claw portion 290d in the optical axis O direction (thicknesses of the claw portions) are the same.

The body-side claw portion 290 projects toward the optical axis O from the opening 212 of the body-side mount 210. There are a portion where the body-side claw portion 290 exists and a portion where the body-side claw portion 290 does not exist on a circumference of the opening 212. In the following explanation, a space 280a between the first body-side claw portion 290a and the fourth body-side claw portion 290d on the circumference of the opening 212 of the body-side mount 210 will be referred to as a first body-side through portion 280a.

In a similar manner, a space 280b between the first body-side claw portion 290a and the second body-side claw portion 290b will be referred to as a second body-side through portion 280b, a space 280c between the second body-side claw portion 290b and the third body-side claw portion 290c will be referred to as a third body-side through portion 280c, and a space 280d between the third body-side claw portion 290c and the fourth body-side claw portion 290d will be referred to as a fourth body-side through portion 280d. These first body-side through portion 280a to fourth body-side through portion 280d which are four spaces will be collectively referred to as a body-side through portion 280.

Lengths of the first body-side through portion 280a to the fourth body-side through portion 280d in the circumferential direction are different from each other. Specifically, the third body-side through portion 280c is the longest, the first body-side through portion 280a is the second longest, the fourth body-side through portion 280d is the third longest, and the second body-side through portion 280b is the shortest.

An angle $\beta 3$ formed by a line connecting one end of the third body-side through portion 280c and the optical axis O and a line connecting the other end of the third body-side through portion 280c and the optical axis O is approximately 51 degrees, and is between 51.0 degrees and 52.0 degrees.

An angle $\beta 1$ formed by a line connecting one end of the first body-side through portion 280a and the optical axis O and a line connecting the other end of the first body-side through portion 280a and the optical axis O is approximately 50 degrees, and is between 50.0 degrees and 51.0 degrees.

An angle $\beta 4$ formed by a line connecting one end of the fourth body-side through portion 280d and the optical axis O and a line connecting the other end of the fourth body-side through portion 280d and the optical axis O is approximately 46 degrees, and is between 45.5 degrees and 46.5 degrees.

An angle $\beta 2$ formed by a line connecting one end of the second body-side through portion 280b and the optical axis O and a line connecting the other end of the second body-side through portion 280b and the optical axis O is approximately 39 degrees, and is between 39.0 degrees and 40.0 degrees.

A sum of the angles $\alpha 1$ to $\alpha 4$ of all the body-side claw portions 290 and the angles $\beta 1$ to $\beta 4$ of all the body-side through portions 280 is 360 degrees.

The first body-side through portion 280a is formed in a region above the third body-side line B3 and below the fourth body-side line B4, the second body-side through portion 280b is formed in a region above the third body-side line B3 and above the fourth body-side line B4, the third body-side through portion 280c is formed in a region below the third body-side line B3 and above the fourth body-side line B4, and the fourth body-side through portion 280d is formed in a region below the third body-side line B3 and below the fourth body-side line B4.

The first body-side through portion 280a and the third body-side through portion 280c are disposed on the second body-side line B2, facing each other across the optical axis O. The second body-side through portion 280b and the fourth body-side through portion 280d are disposed on the first body-side line B1, facing each other across the optical axis O.

Note that the central position in the circumferential direction of each of the first body-side through portion 280a to the fourth body-side through portion 280d is not on the first body-side line B1 or the second body-side line B2, as illustrated in FIG. 3.

The body-side terminal holding unit 220 including a plurality of body-side terminals or contacts (hereinafter referred to as a "body-side terminal group") is provided inside the opening 212 of the body-side mount 210. The body-side terminal holding unit 220 has an arc shape corresponding to a shape of the ring-shaped body-side mount 210. The body-side terminal holding unit 220 is disposed on an inner periphery side of the opening 212 of the body-side mount 210 and above the image sensor 270. The center of the body-side terminal holding unit 220 in the circumferential direction is preferably located on the first body-side line B1.

The first body-side claw portion 290a is disposed at an upper right region of the body-side terminal holding unit 220, and the second body-side through portion 280b is disposed at an upper left region of the body-side terminal holding unit 220. Therefore, an angle formed by a line connecting one end of the body-side terminal holding unit 220 and the optical axis O and a line connecting the other end of the body-side terminal holding unit 220 and the optical axis O is smaller than a sum of the angle $\alpha 1$ of the first body-side claw portion 290a and the angle $\beta 2$ of the second body-side through portion 280b.

The body-side terminal group included in the body-side terminal holding unit 220 is disposed in an arc shape above the upper side of the image sensor 270. Each terminal or contact of the body-side terminal group is a conductive pin. The body-side terminal group is pressed toward the −Z direction (FIG. 1), that is, from the image side to the subject side, by a spring or the like which is not illustrated.

The body-side mount 210 has a hole through which a lock pin 214 passes. The hole through which the lock pin 214 passes is formed at an upper right region of the fourth body-side claw portion 290d. That is, on the ring-shaped reference surface 211 of the body-side mount 210, the hole for the lock pin 214 is provided between a region where the fourth body-side claw portion 290d exists and a region where the first body-side claw portion 290a exists. The lock pin 214 is pressed toward the −Z direction (the subject side) by a spring, or the like, which is not illustrated. The lock pin 214 can move to the +Z direction (toward the image side, toward the image sensor 270) against urging force of the spring by an unlocking button which is not illustrated being depressed.

Figure 5:
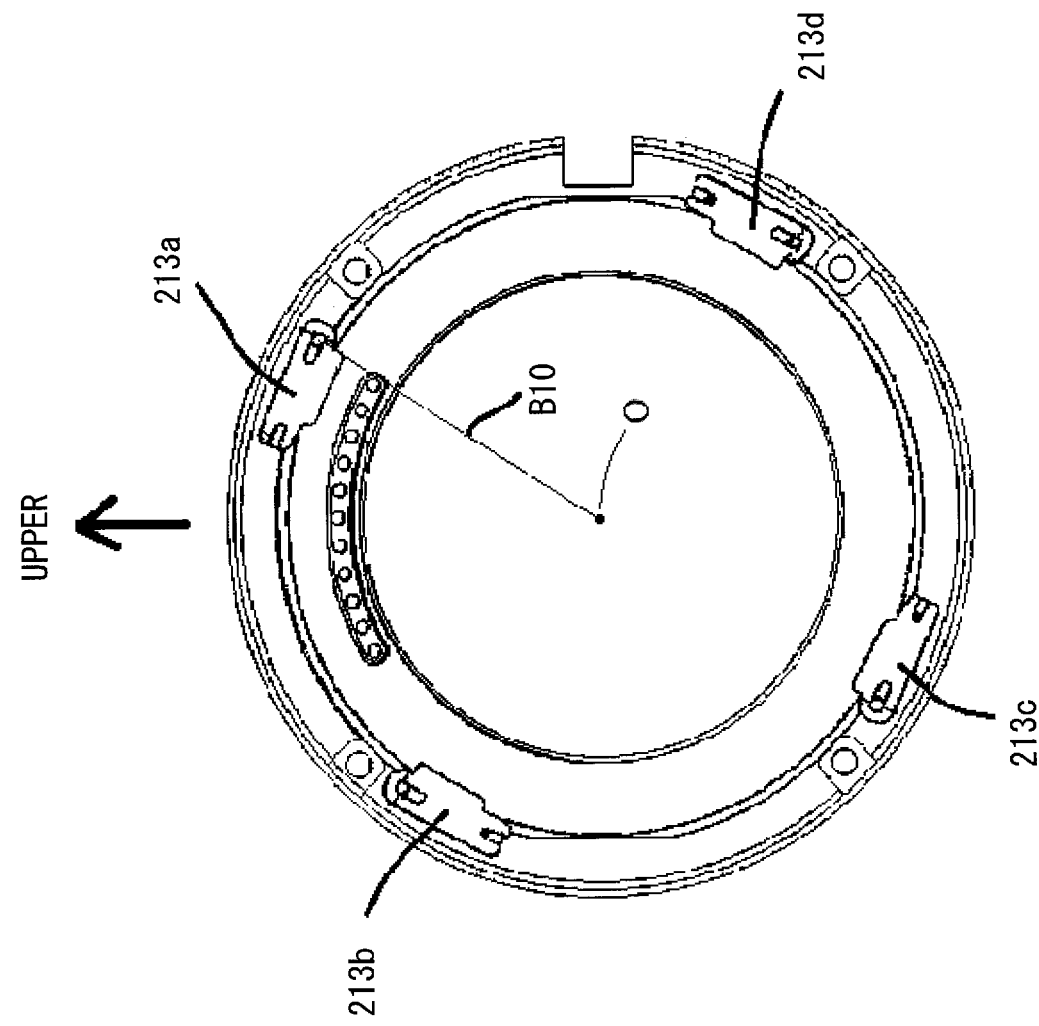
FIG. 5 is a view of a mount of the camera body from which a body-side mount is removed, as seen from the subject side.

FIG. 5 is a schematic view of the mount of the camera body 2 from which the body-side mount 210 is removed, as seen from the subject side. A first flat spring 213a is provided at a position corresponding to the first body-side claw portion 290a (at the image side of the first body-side claw portion 290a).

In a similar manner, a second flat spring 213b is provided at a position corresponding to the second body-side claw portion 290b (at the image side of the second body-side claw portion 290b), a third flat spring 213c is provided at a position corresponding to the third body-side claw portion 290c (at the image side of the third body-side claw portion 290c), and a fourth flat spring 213d is provided at a position corresponding to the fourth body-side claw portion 290d (at the image side of the fourth body-side claw portion 290d).

In the following explanation, these four springs, i.e., the first flat spring 213a to the fourth flat spring 213d, will be collectively referred to as a flat spring 213. The flat spring 213 urges a subject-side surface of the accessory-side claw portion 390 (which will be described later) or of the lens-side claw portions 590, 690 (which will be described later), which faces the flat spring 213, toward the image sensor 270 side (+Z direction).

As illustrated in FIG. 5, a rear end portion of the body-side terminal holding unit 220 in an attaching direction 44 (which will be described later) is disposed near a line B10 which connects the optical axis O and a rear end portion of the first flat spring 213a in the attaching direction 44. The second flat spring 213b, the third flat spring 213c and the fourth flat spring 213d are disposed around the optical axis O at intervals of approximately 90 degrees from the first flat spring 213a.

Rear Mount 310 of Teleconverter 3

Figure 6:
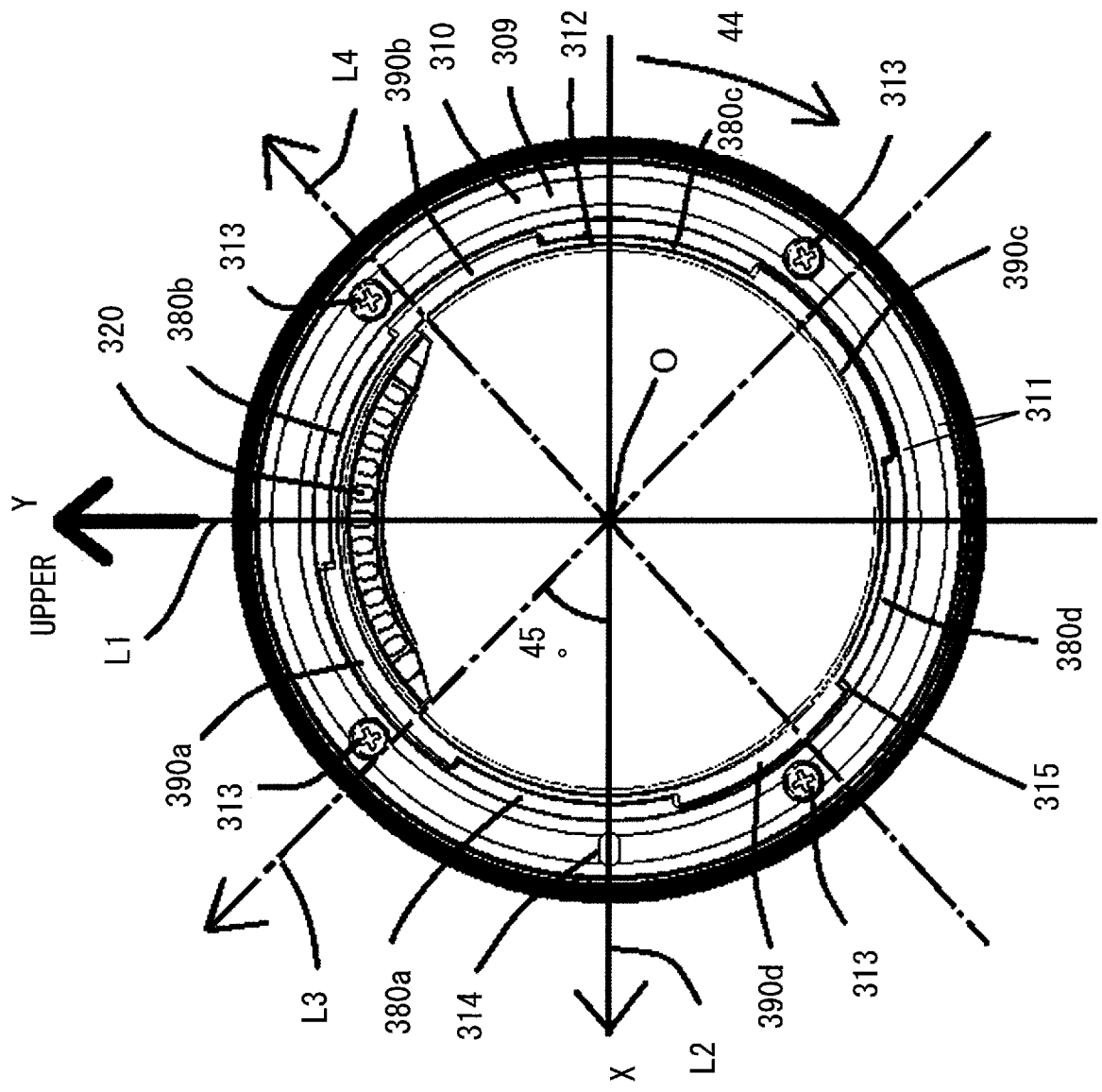
FIG. 6 is a view schematically illustrating a rear mount of a teleconverter, as seen from an image side.
Figure 7:
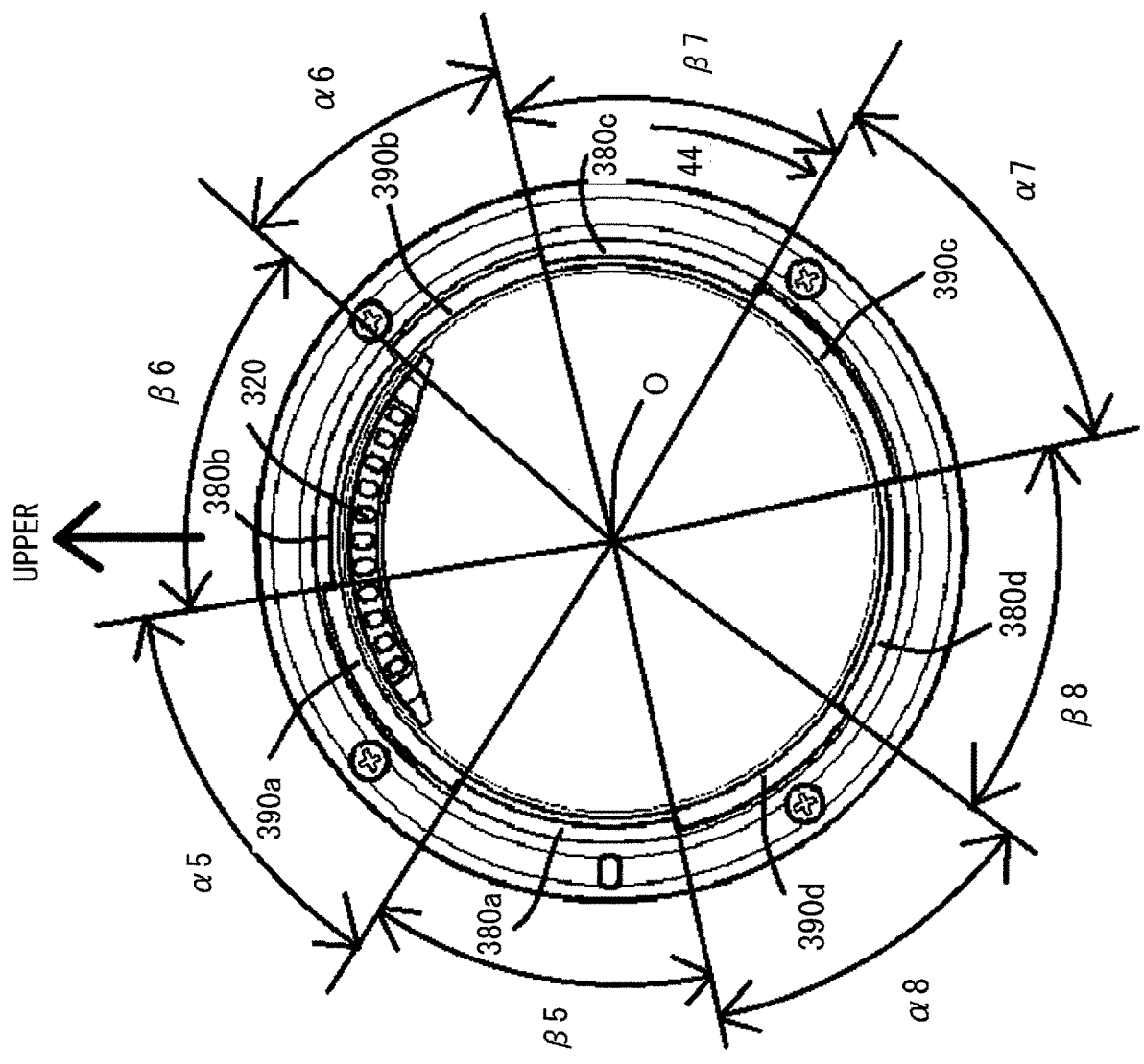
FIG. 7 is a view schematically illustrating the rear mount of the teleconverter, as seen from the image side.

FIG. 6 and FIG. 7 are views schematically illustrating the rear mount of the teleconverter 3, as seen from the image side. A first teleconverter-side line L1 extending in a vertical direction Y of the teleconverter 3, indicated with a solid line in FIG. 6, is in an up-and-down direction seen from a photographer who is using the camera system 1 and holding the camera body 2 in the laterally holding. A second teleconverter-side line L2 extending in a horizontal direction X of the teleconverter 3, indicated with a solid line in FIG. 6, is in a right and left direction seen from the photographer who is using the camera system 1 and holding the camera body 2 in the laterally holding.

The first teleconverter-side line L1 is orthogonal to the second teleconverter-side line L2 on the optical axis O of the teleconverter 3. As indicated with a dashed-dotted line in FIG. 6, lines extending in directions intersecting with the first teleconverter-side line L1 and the second teleconverter-side line L2 on the optical axis O at 45 degrees are referred to as a third teleconverter-side line L3 and a fourth teleconverter-side line L4. With the teleconverter 3 attached to the camera body 2 in a usable manner, the first body-side line B1 is aligned with the first teleconverter-side line L1, the second body-side line B2 is aligned with the second teleconverter-side line L2, the third body-side line B3 is aligned with the fourth teleconverter-side line L4, and the fourth body-side line B4 is aligned with the third teleconverter-side line L3. Note that the lines do not have to be completely aligned with each other, and a gap may occur as long as the teleconverter 3 can be properly attached to the camera body 2 in a usable manner.

The mount of the teleconverter 3 includes the rear terminal holding unit 320 that comes into contact with the body-side terminal holding unit 220 and the rear mount 310 that comes into contact with the body-side mount 210 once the teleconverter 3 is attached to the camera body 2. The rear mount 310 is formed in a ring shape centering around the optical axis O of the teleconverter 3, and is disposed along a plane orthogonal to the optical axis O. The rear mount 310 has a reference surface 311 which is to be in contact with the reference surface 211 of the body-side mount 210 once the teleconverter 3 is attached to the camera body 2. The reference surface 311 has a ring shape centering around the optical axis O, and is disposed along a plane orthogonal to the optical axis O. On a rear end surface of the reference surface 311 in the optical axis O direction, a lock pin slide surface 309, on which a lock pin is slid in an attachment incompletion state, is formed in a concave shape recessed from the reference surface 311 toward the −Z direction on a cross-section along the Z direction. The lock pin slide surface 309 is at least a part of a ring shape centering around the optical axis O and is disposed along a plane orthogonal to the optical axis O.

The rear mount 310 is fixed by being screwed at a fixing member 3101 disposed inside the teleconverter 3 using screws 313. In the case where the rear mount 310 is seen from the camera body 2 side, the screws 313 are disposed around the optical axis O at intervals of approximately 90 degrees. Further, four screws 313 are respectively disposed at outer peripheries of four rear claw portions 390 which will be described later. Still further, two screws 313 are respectively disposed at outer peripheries of the both end portions of the rear terminal holding unit 320 in the circumferential direction.

The rear mount 310 includes a cylindrical portion 312 extending in the optical axis O direction at an inner peripheral edge portion of the rear mount 310 (an inner peripheral edge portion of the reference surface 311). Once the teleconverter 3 is attached to the camera body 2, a rear end of the cylindrical portion 312 in the optical axis O direction is located to project further toward the camera body 2 beyond the reference surface 311. The rear mount 310 includes a first rear claw portion 390a, a second rear claw portion 390b, a third rear claw portion 390c and a fourth rear claw portion 390d. These four rear claw portions are disposed along an outer periphery of the rear end portion of the cylindrical portion 312 in the optical axis O direction at intervals.

In the following explanation, these first rear claw portion 390a to fourth rear claw portion 390d which are four projecting portions will be collectively referred to as a rear claw portion 390.

The rear claw portion 390 is provided at an outer peripheral edge portion of the cylindrical portion 312 of the rear mount 310 to project outwardly from the rear mount 310. The rear claw portion 390 is substantially orthogonal to the optical axis O. Further, the rear claw portion 390 extends in the circumferential direction around the optical axis O. As illustrated in FIG. 6 and FIG. 7, the first rear claw portion 390a is disposed at an upper left position, the second rear claw portion 390b is disposed at an upper right position, the third rear claw portion 390c is disposed at a lower right position, and the fourth rear claw portion 390d is disposed at a lower left position. That is, the first rear claw portion 390a is disposed in a region which is above the second teleconverter-side line L2 and on the left side of the first teleconverter-side line L1, the second rear claw portion 390b is disposed in a region which is above the second teleconverter-side line L2 and on the right side of the first teleconverter-side line L1, the third rear claw portion 390c is disposed in a region which is below the second teleconverter-side line L2 and on the right side of the first teleconverter-side line L1, and the fourth rear claw portion 390d is disposed in a region which is below the second teleconverter-side line L2 and on the left side of the first teleconverter-side line L1.

Further, the first rear claw portion 390a and the third rear claw portion 390c are respectively disposed in regions which are on the third teleconverter-side line L3 and which are substantially symmetric about the optical axis O, and the second rear claw portion 390b and the fourth rear claw portion 390d are respectively disposed in regions which are on the fourth teleconverter-side line L4 and which are substantially symmetric about the optical axis O.

Note that the third teleconverter-side line L3 and the fourth teleconverter-side line L4 do not necessarily pass through the respective central positions of the first rear claw portion 390a to the fourth rear claw portion 390d in the circumferential direction.

Once the teleconverter 3 is attached to the camera body 2, the body-side claw portion 290 is disposed between the rear mount 310 and the rear claw portion 390 in the optical axis O direction. At this time, the first rear claw portion 390a comes into contact with the flat spring 213a of the first body-side claw portion 290a, the second rear claw portion 390b comes into contact with the flat spring 213b of the second body-side claw portion 290b, the third rear claw portion 390c comes into contact with the flat spring 213c of the third body-side claw portion 290c, and the fourth rear claw portion 390d comes into contact with the flat spring 213d of the fourth body-side claw portion 290d.

Once the flat spring 213 of the body-side claw portion 290 comes into contact with the rear claw portion 390, the rear claw portion 390 is pressed in a direction (+Z direction) away from the body-side claw portion 290 along the optical axis O by the flat spring 213. By the rear claw portion 390 being pressed in the +Z direction (toward the image sensor 270), the rear mount 310 is pressed toward the body-side mount 210, and attachment between the camera body 2 and the teleconverter 3 becomes stable.

As illustrated in FIG. 7, lengths of the first rear claw portion 390a to the fourth rear claw portion 390d in the circumferential direction are different from one another. Further, angles respectively formed by lines connecting one ends of the first rear claw portion 390a to the fourth rear claw portion 390d in the circumferential direction and the optical axis O and lines connecting the other ends of the first rear claw portion 390a to the fourth rear claw portion 390d in the circumferential direction and the optical axis O are different from one another. Specifically, the third rear claw portion 390c is the longest, the first rear claw portion 390a is the second longest, the fourth rear claw portion 390d is the third longest, and the second rear claw portion 390b is the shortest.

An angle α7 formed by a line connecting one end of the third rear claw portion 390c and the optical axis O and a line connecting the other end of the third rear claw portion 390c and the optical axis O is approximately 48.5 degrees, and is between 48.0 degrees and 49.0 degrees.

An angle α5 formed by a line connecting one end of the first rear claw portion 390a and the optical axis O and a line connecting the other end of the first rear claw portion 390a and the optical axis O is approximately 48 degrees, and is between 47.5 degrees and 48.5 degrees.

An angle α8 formed by a line connecting one end of the fourth rear claw portion 390d and the optical axis O and a line connecting the other end of the fourth rear claw portion 390d and the optical axis O is approximately 44 degrees, and is between 43.0 degrees and 45.0 degrees.

An angle α6 formed by a line connecting one end of the second rear claw portion 390b and the optical axis O and a line connecting the other end of the second rear claw portion 390b and the optical axis O is approximately 36 degrees, and is between 35.5 degrees and 36.5 degrees.

Note that the angle α6 formed by the line connecting the one end of the second rear claw portion 390b and the optical axis O and the line connecting the other end of the second rear claw portion 390b and the optical axis O is less than an angle of rotation which will be described later.

Lengths of the first rear claw portion 390a to the fourth rear claw portion 390d in a radial direction (heights of the claw portions) are substantially the same. Further, lengths of the first rear claw portion 390a to the fourth rear claw portion 390d in the optical axis O direction (thicknesses of the claw portions) are substantially the same.

The rear claw portion 390 projects outward in the radial direction from an outer periphery of the cylindrical portion 312, and there is a portion where the rear claw portion 390 exists and a space portion where the rear claw portion 390 does not exist on the outer periphery of the cylindrical portion 312.

In the following explanation, a space 380a between the first rear claw portion 390a and the fourth rear claw portion 390d at the outer periphery of the cylindrical portion 312 will be referred to as a first rear through portion 380a. In a similar manner, a space 380b between the first rear claw portion 390a and the second rear claw portion 390b will be referred to as a second rear through portion 380b, a space 380c between the second rear claw portion 390b and the third rear claw portion 390c will be referred to as a third rear through portion 380c, and a space 380d between the third rear claw portion 390c and the fourth rear claw portion 390d will be referred to as a fourth rear through portion 380d.

These four through portions, i.e., the first rear through portion 380*a* to fourth rear through portion 380*d*, will be collectively referred to as a rear through portion 380.

Lengths of the first rear through portion 380*a* to the fourth rear through portion 380*d* in the circumferential direction are different from one another. Specifically, the second rear through portion 380*b* is the longest, the first rear through portion 380*a* is the second longest, the fourth rear through portion 380*d* is the third longest, and the third rear through portion 380*c* is the shortest.

An angle β6 formed by a line connecting one end of the second rear through portion 380*b* and the optical axis O and a line connecting the other end of the second rear through portion 380*b* and the optical axis O is approximately 50 degrees, and is between 49.5 degrees and 50.5 degrees.

An angle β5 formed by a line connecting one end of the first rear through portion 380*a* and the optical axis O and a line connecting the other end of the first rear through portion 380*a* and the optical axis O is approximately 45 degrees, and is between 44.5 degrees and 45.5 degrees.

An angle β8 formed by a line connecting one end of the fourth rear through portion 380*d* and the optical axis O and a line connecting the other end of the fourth rear through portion 380*d* and the optical axis O is approximately 44.5 degrees, and is between 44.0 degrees and 45.0 degrees.

An angle β7 formed by a line connecting one end of the third rear through portion 380*c* and the optical axis O and a line connecting the other end of the third rear through portion 380*c* and the optical axis O is approximately 44 degrees. The angle β7 is between 43.5 degrees and 44.5 degrees.

A sum of the angles α5 to α8 of all the rear claw portions and the angles β5 to β8 of all the rear through portions is 360 degrees.

Further, the first rear through portion 380*a* and the third rear through portion 380*c* are respectively disposed on the second teleconverter-side line L2, facing each other across the optical axis O, and the second rear through portion 380*b* and the fourth rear through portion 380*d* are respectively disposed on the first teleconverter-side line L1, facing each other across the optical axis O.

Note that the first teleconverter-side line L1 and the second teleconverter-side line L2 do not necessarily pass through the respective central positions of the first rear through portion 380*a* to the fourth rear through portion 380*d* in the circumferential direction.

The rear terminal holding unit 320 including a plurality of rear terminals is provided inside the cylindrical portion 312. The rear terminal holding unit 320 has an arc shape corresponding to a shape of the ring-shaped rear mount 310. The rear terminal holding unit 320 is preferably disposed at an upper part of the rear mount 310 along the opening of the rear mount 310 and disposed at the center of the upper part as illustrated in FIG. 6 and FIG. 7. That is, the center of the rear terminal holding unit 320 in the circumferential direction is preferably located on the line L1.

The first rear claw portion 390*a* is disposed at an upper left side of the rear terminal holding unit 320, and the second rear through portion 380*b* is disposed at an upper right side of the rear terminal holding unit 320. Therefore, an angle formed by a line connecting one end of the rear terminal holding unit 320 and the optical axis O and a line connecting the other end of the rear terminal holding unit 320 and the optical axis O is smaller than a sum of the angle α5 of the first rear claw portion 390*a* and the angle β6 of the second rear through portion 380*b*.

The rear terminal holding unit 320 has the plurality of rear terminals as described above. The plurality of rear terminals or contacts (which will be referred to as a rear terminal group) are disposed at the rear terminal holding unit 320 in a line inside the rear mount 310 in an arc shape. The rear terminal group is disposed so that respective conductive contact surfaces are exposed toward +Z direction (FIG. 1).

All the contact surfaces of the plurality of rear terminals may be located at a position further toward the +Z direction from a rear end of the rear claw portion 390 in the optical axis O direction or may be located at a position further toward the −Z direction from the rear end of the rear claw portion 390 in the optical axis O direction.

Further, part of the contact surfaces of the plurality of rear terminals may be located at a position on the +Z direction side from the rear end of the rear claw portion 390 in the optical axis O direction, and the remaining contact surfaces may be located at a position on the −Z direction side from the rear end of the rear claw portion 390 in the optical axis O direction.

The rear mount 310 has a lock pin receiving portion 314. The lock pin receiving portion 314 is disposed at an upper left side of the fourth rear claw portion 390*d* as illustrated in FIG. 6 and FIG. 7. That is, the lock pin receiving portion 314 is disposed in the lock pin slide surface 309 of the rear mount 310 between a portion corresponding to an outer periphery side of the first rear claw portion 390*a* and a portion corresponding to an outer periphery side of the fourth rear claw portion 390*d*.

The lock pin receiving portion 314 is a groove in which the lock pin 214 of the camera body 2 fits once the teleconverter 3 is attached to the camera body 2. This groove is provided in a concave shape recessed toward the −Z direction (FIG. 1) from the lock pin slide surface 309 of the rear mount 310.

In a state where the unlocking button of the camera body 2 is not depressed, an end portion of the lock pin 214 in the −Z direction (front end of the lock pin 214 on the subject side) fits in the lock pin receiving portion 314 of the rear mount 310. Further, in a state where the unlocking button of the camera body 2 is depressed, an end portion of the lock pin 214 in the −Z direction is located at a position on the +Z direction side from the lock pin slide surface 309. Therefore, rotating the teleconverter 3 and the camera body 2 relatively to each other while the unlocking button of the camera body 2 is depressed does not bring the lock pin 214 into contact with the lock pin slide surface 309.

Once the teleconverter 3 is attached to the camera body 2, the plurality of body-side terminals respectively physically come into contact with the corresponding plurality of rear terminals. By this contact, the plurality of body-side terminals are electrically connected to the plurality of rear terminals. That is, the plurality of body-side terminals are electrically conductive with the plurality of rear terminals.

Figure 8:
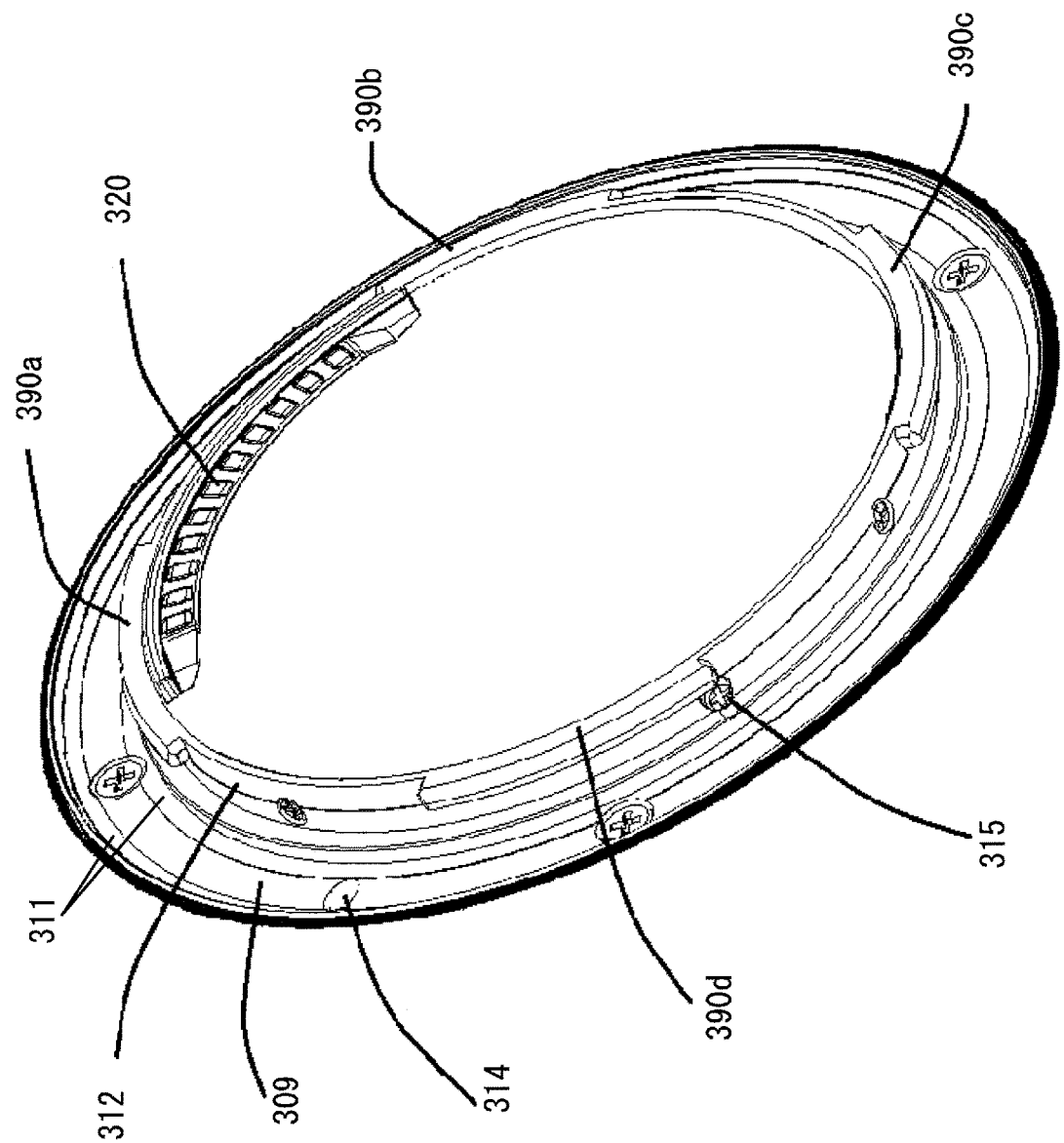
FIG. 8 is a perspective view of a rear mount surface.

As illustrated in FIG. 8, a restriction pin 315 is disposed between the reference surface 311 of the rear mount 310 and the fourth rear claw portion 390*d* and projects from an outer circumferential surface of the cylindrical portion 312. The restriction pin 315 is disposed on a rear end side (position close to the third rear claw portion 390*c*) of the fourth rear claw portion 390*d* in the attaching direction 44. Part of the restriction pin 315 is disposed behind the fourth rear claw portion 390*d* as the fourth rear claw portion 390*d* is seen from the rear (image side) of the teleconverter 3.

Note that, while, in the present embodiment, a screw member is used as the restriction pin 315, and the restriction pin 315 is screwed at the cylindrical portion 312 from outside in the radial direction, the shape and the material of the restriction pin 315 are not limited to this.

Front Mount 410 of Teleconverter 3

Figure 9:
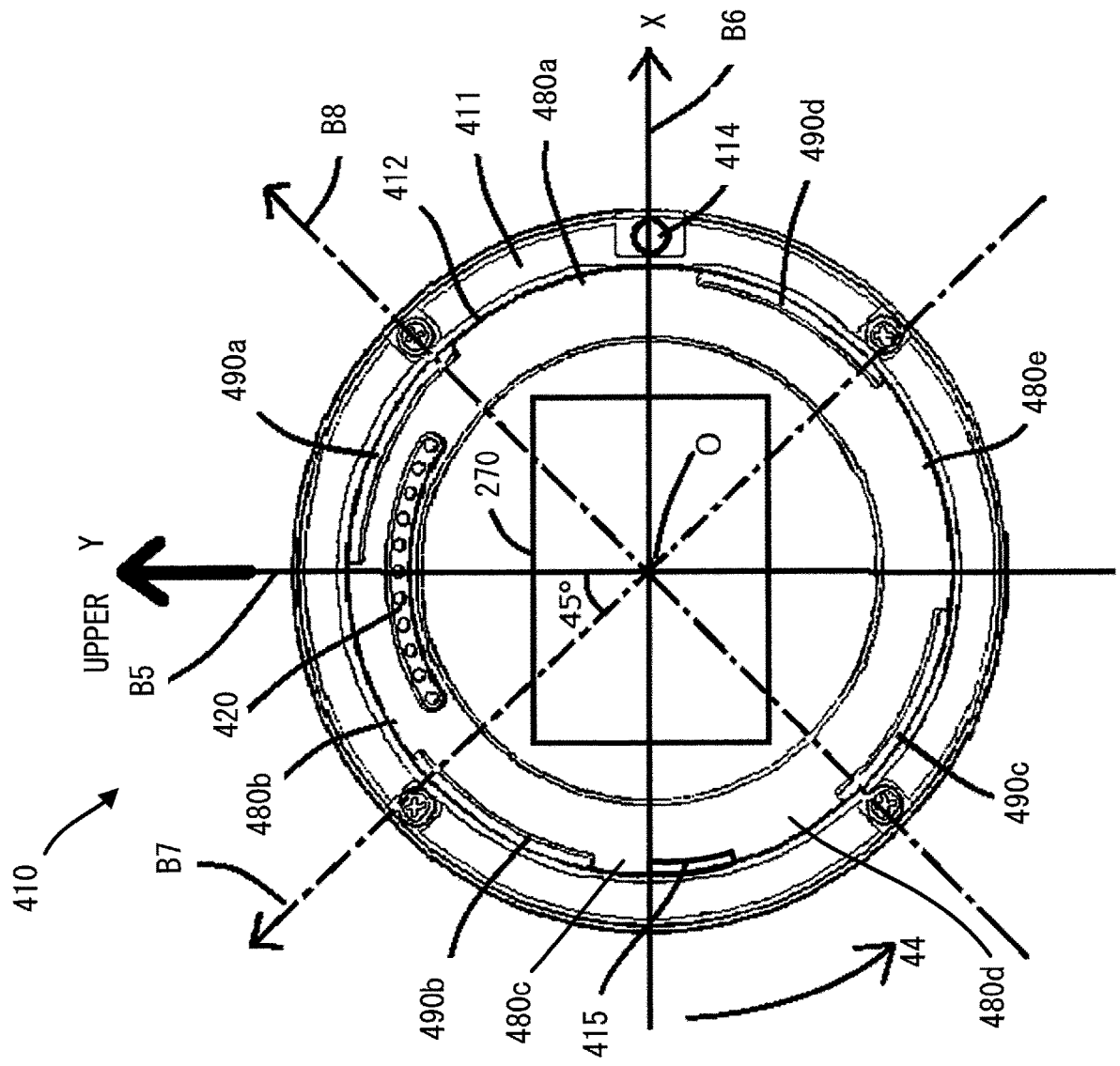
FIG. 9 is a view schematically illustrating a front mount of the teleconverter, as seen from the subject side.
Figure 10:
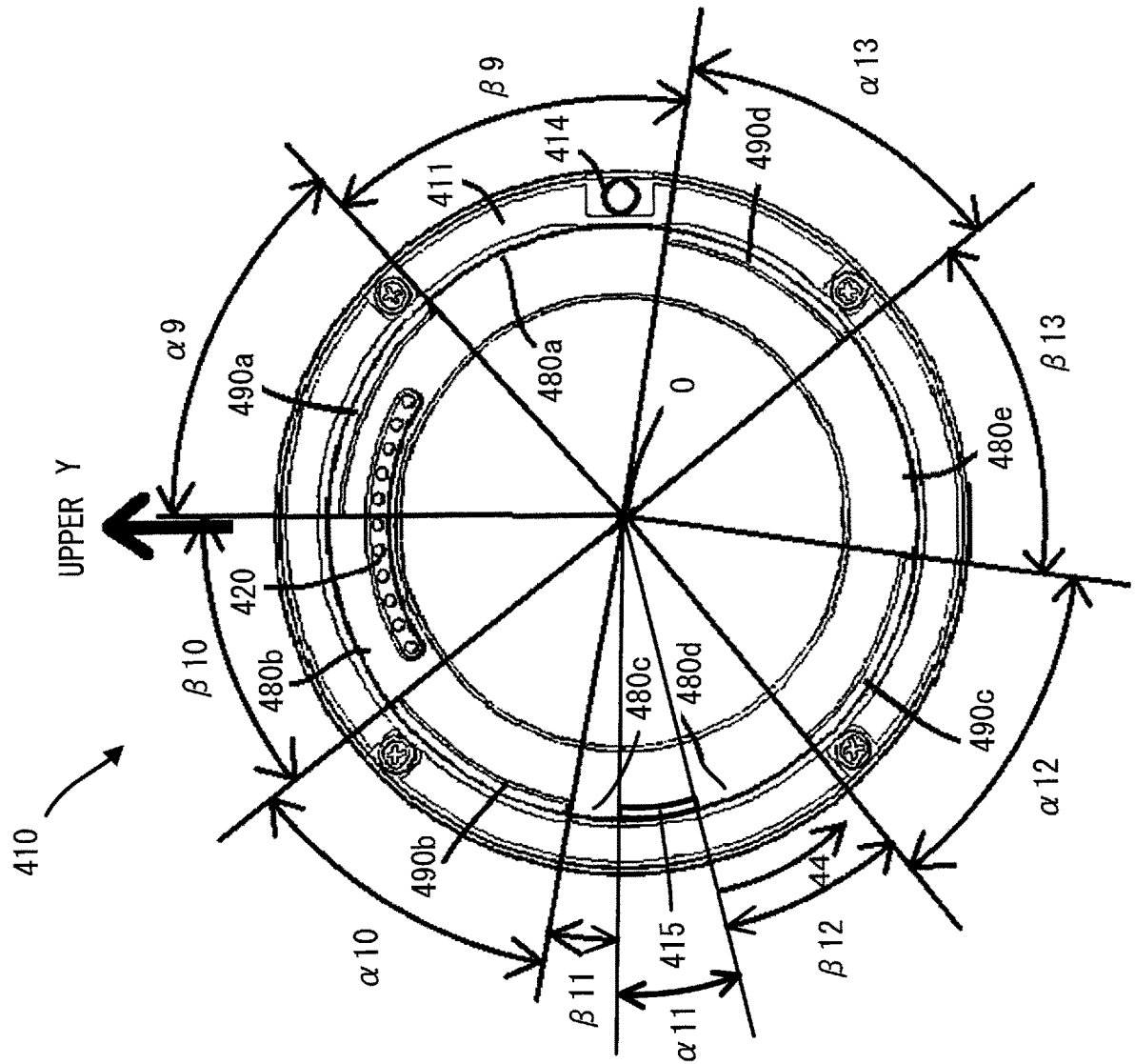
FIG. 10 is a view schematically illustrating the front mount of the teleconverter, as seen from the subject side.

FIG. 9 and FIG. 10 are views schematically illustrating a mount at the front (on the subject side, on a side where the compatible lens 5 is attached) of the teleconverter, as seen from the subject side. The front mount 410 of the teleconverter 3 differs from the body-side mount 210 in that the front mount 410 has a protrusion 415 (which will be described later).

The mount at the front of the teleconverter 3 includes the front mount 410, the front terminal holding unit 420, a reference surface 411, an opening 412, a lock pin 414, a front through portion 480, and a front claw portion 490. The front mount 410, the front terminal holding unit 420, the reference surface 411, the opening 412 and the lock pin 414 are substantially equivalent to the body-side mount portion 210, the body-side terminal holding unit 220, the reference surface 211, the opening 212, and the lock pin 214 of the body-side mount 210. The front terminal holding unit 420 has a plurality of front terminals or contacts (hereinafter referred to as a "front terminal group"). The front terminal group is connected to the teleconverter-side control/communication unit 330 and the like.

Further, teleconverter-side reference lines B5 to B8 in FIG. 9 are the same as the body-side reference lines B1 to B4 of the body-side mount 210.

The front mount 410 includes a first front claw portion 490a, a second front claw portion 490b, a third front claw portion 490c, and a fourth front claw portion 490d, as projecting portions each projecting from an inner circumference of the front mount 410 toward the optical axis O. In the following explanation, these first front claw portion 490a to fourth front claw portion 490d which are four projecting portions will be collectively referred to as a front claw portion 490. The front claw portion 490 is the same as the body-side claw portion 290.

The front mount 410 includes the protrusion 415 projecting from the inner circumference of the front mount 410 toward the optical axis O. The protrusion 415 is spaced from and between the second front claw portion 490b and the third front claw portion 490c, along the circular opening 412 of the front mount 410. As illustrated in FIG. 9, the protrusion 415 is disposed in a region at least partially below the second teleconverter-side line B6 and on the left side of the first teleconverter-side line B5. The length of the protrusion 415 in the circumferential direction is shorter than that of any of the front claw portions 490.

The front claw portion 490 and the protrusion 415 project toward the optical axis O from the opening 412 of the front mount 410. On a circumference of the opening 412, there are portions where the front claw portion 490 and the protrusion 415 do not exist. A space between the first front claw portion 490a and the fourth front claw portion 490d on the circumference of the opening 412 will be referred to as a first front through portion 480a.

Similarly, a space between the first front claw portion 490a and the second front claw portion 490b will be referred to as a second front through portion 480b, a space between the second front claw portion 490b and the protrusion 415 will be referred to as a third front through portion 480c, a space between the protrusion 415 and the third front claw portion 490c will be referred to as a fourth front through portion 480d, a space between the third front claw portion 490c and the fourth front claw portion 490d will be referred to as a fifth front through portion 480e. These first front through portion 480a to fifth front through portion 480e which are five spaces will be collectively referred to as a front through portion 480. The first front through portion 480a, the second front through portion 480b, and the fifth front through portion 480e are the same as the first body-side through portion 280a, the second body-side through portion 280b, and the fourth body-side through portion 280d.

Lengths of the first front through portion 480a to the fifth front through portion 480e in the circumferential direction are different from each other. Specifically, the first front through portion 480a is the longest, the fifth front through portion 480e is the second longest, the second front through portion 480b is the third longest, the fourth front through portion 480d is the fourth longest, and the third front through portion 480c is the shortest.

An angle α11 formed by a line connecting one end of the protrusion 415 and the optical axis O and a line connecting the other end of the protrusion 415 and the optical axis O is approximately 8 degrees, and is between 5 degrees and 10 degrees. An angle β11 formed by a line connecting one end of the protrusion 415 and the optical axis O and a line connecting the other end of the second front claw portion 490c and the optical axis O is approximately 12 degrees, and is between 10 degrees and 14 degrees. An angle β12 formed by a line connecting the other end of the protrusion 415 and the optical axis O and a line connecting one end of the third front claw portion 490c and the optical axis O is approximately 30 degrees, and is between 28 degrees and 32 degrees.

A sum of the angles α9 to α13 of all the front claw portions 490 and the protrusion and the angles β9 to β13 of all the front through portions 480 is 360 degrees.

Figure 22:
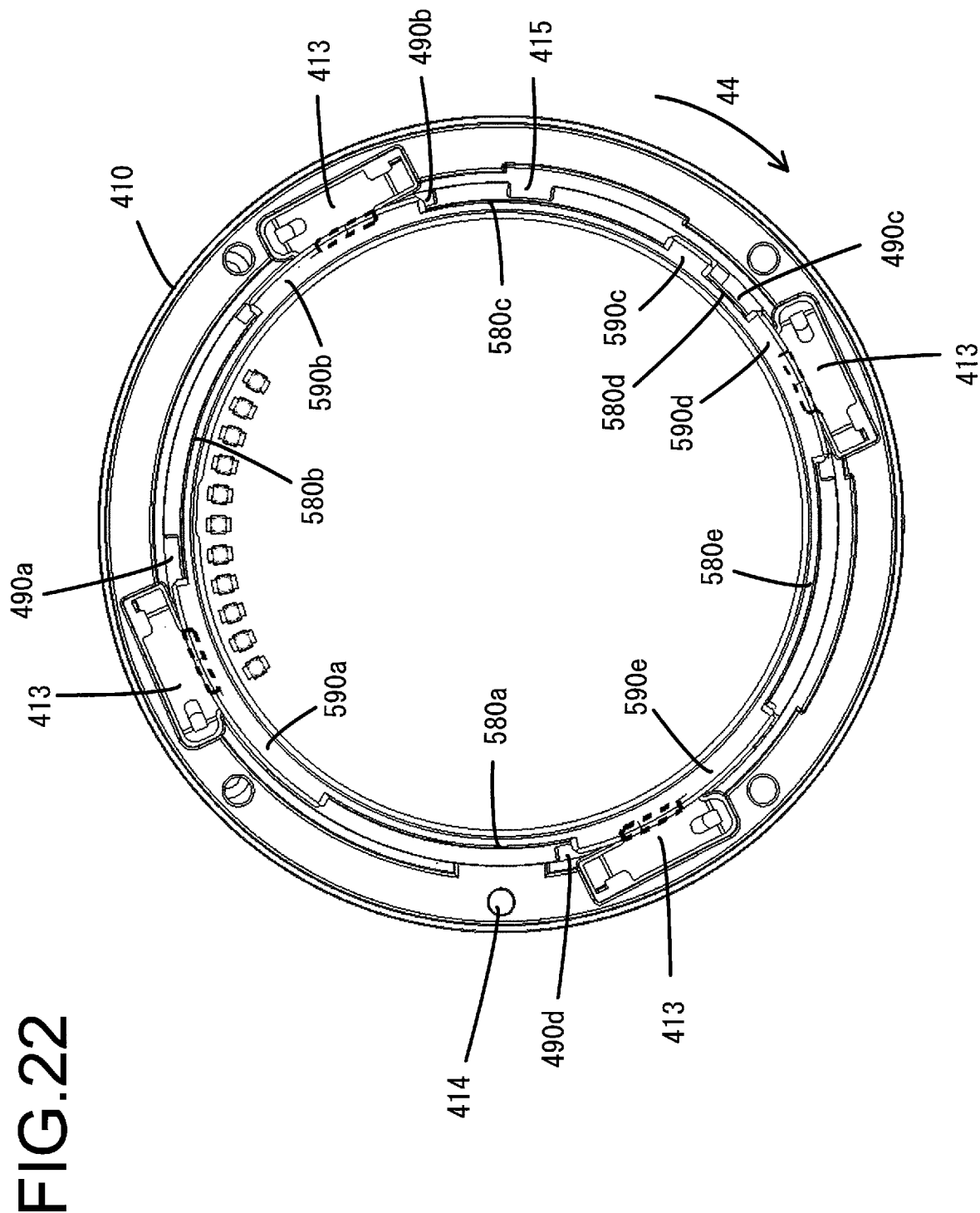
FIG. 22 is a front view of the front claw portion and the lens-side claw portion, as seen from the image side.

FIG. 22 is a schematic view of the front mount 410, as seen from the image sensor side (the image side). FIG. 22 is inverted with respect to FIG. 9 and FIG. 10 in the horizontal direction. A flat spring 413 is provided at a position corresponding to the front claw portion 490 (on the image side of the front claw portion 490). Although the flat spring 413 is substantially the same as the flat spring 213 provided on the body-side mount 210, the flat spring 413 can be changed as appropriate as long as the compatible lens 5 can be attached. Dotted regions indicate positions at which the flat spring 413 urges the lens-side claw portion 590 of the compatible lens 5 which will be described later. Since no lens-side claw portion 590 of the compatible mount 510, which will be described later, faces the protrusion 415 at the completion of attachment, the flat spring 413 is not disposed on the image side of the protrusion 415.

Compatible Mount 510 of Compatible Lens 5

Figure 11:
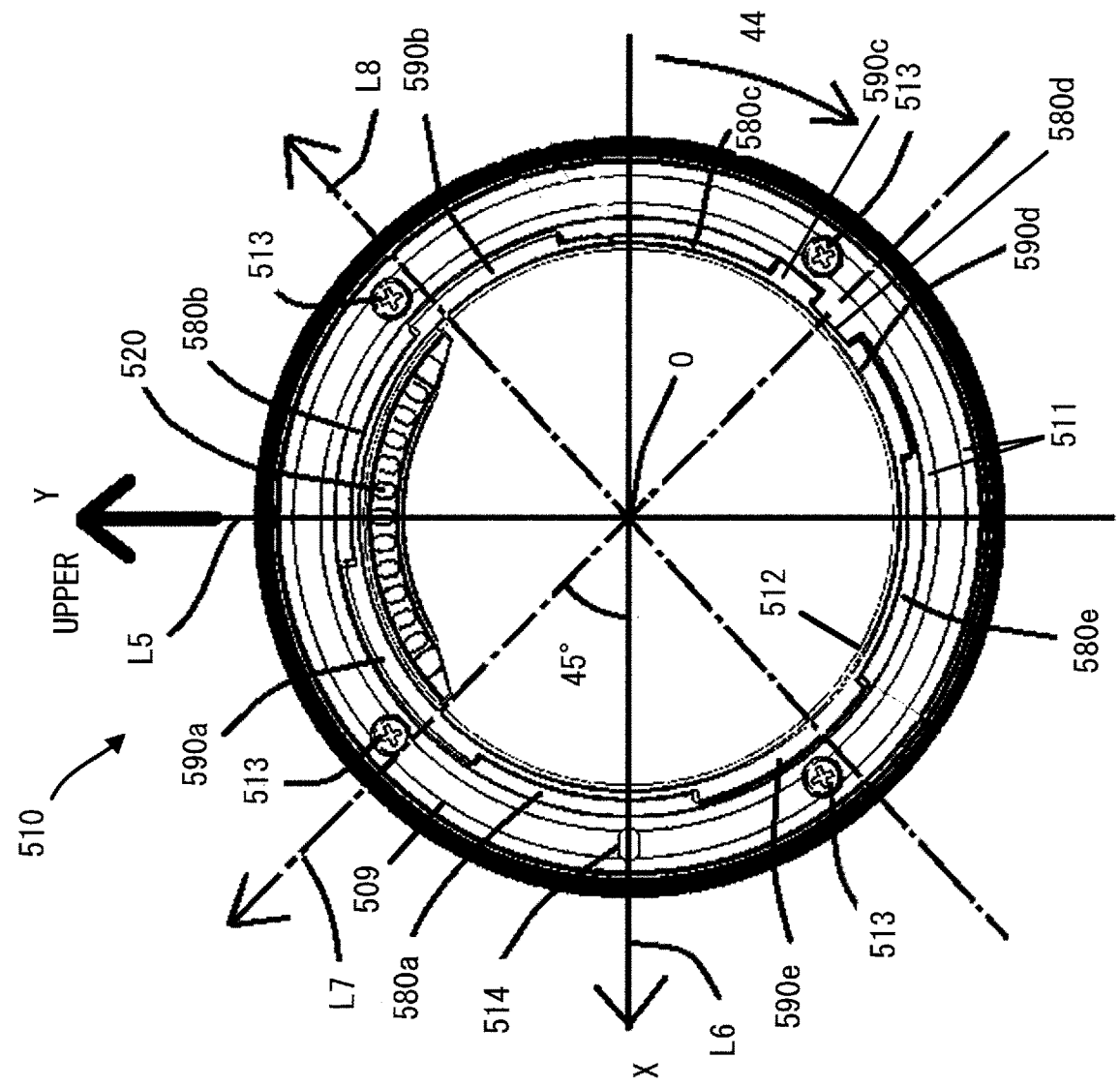
FIG. 11 is a schematic view of a compatible mount of a compatible lens, as seen from the image side.
Figure 12:
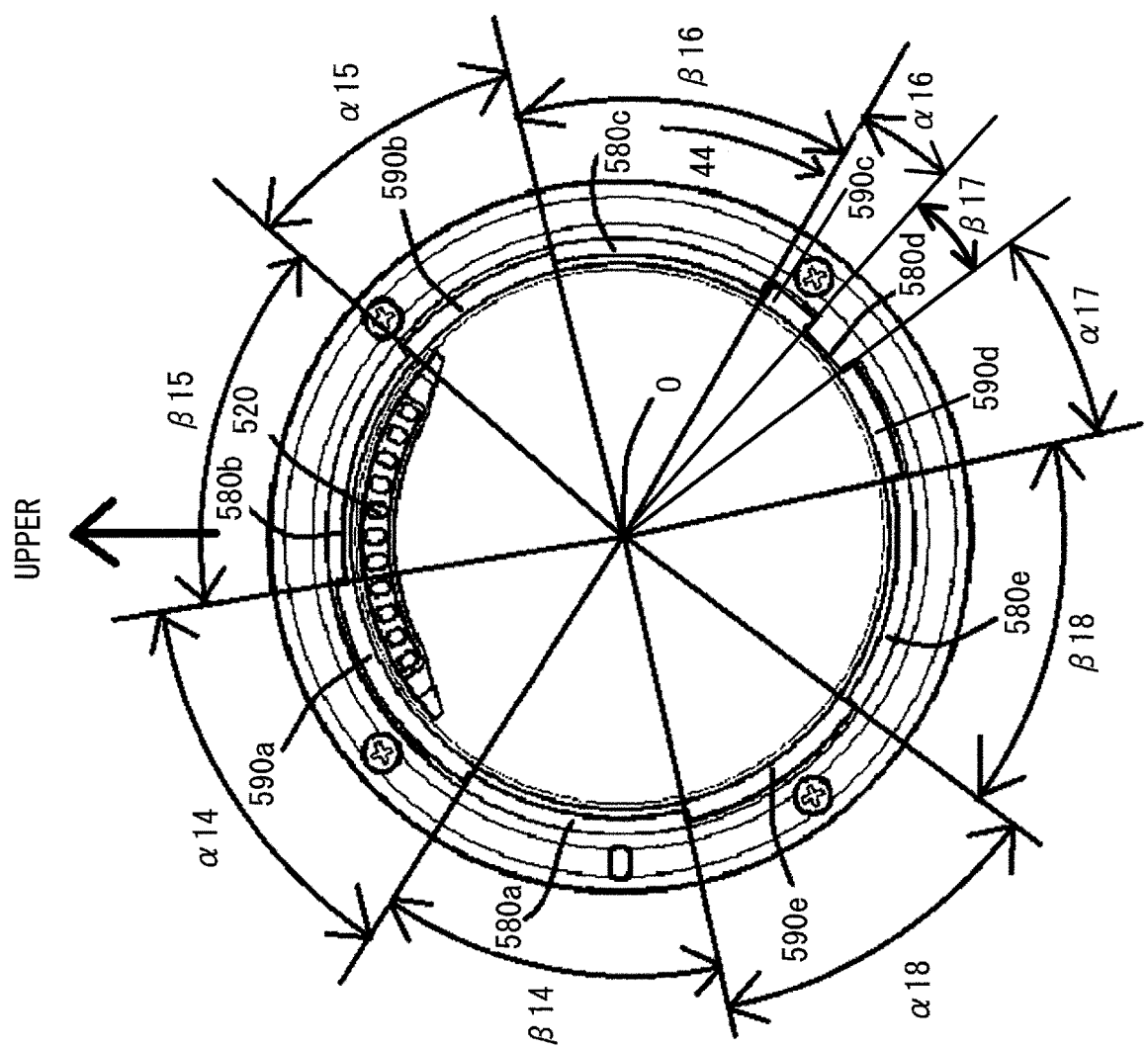
FIG. 12 is a schematic view of the compatible mount of the compatible lens, as seen from the image side.

FIG. 11 and FIG. 12 are schematic views of the compatible mount 510 of the compatible lens 5, as seen from the image side. The compatible mount 510 is different from the non-compatible mount 610 of the non-compatible lens 6 and the rear mount 310 of the teleconverter 3 in that the compatible mount 510 is provided with a cutout through which the protrusion 415 of the front mount 410 passes upon attachment. Lens-side reference lines L5 to L8 in FIG. 11 are the same as the teleconverter-side reference lines L1 to L4 of the rear mount 310 of the teleconverter 3.

The mount at the image side of the compatible lens 5 includes the compatible mount 510, a lens-side terminal holding unit 520, a reference surface 511, a lock pin slide surface 509, a screw 513, a cylindrical portion 512, a lock pin receiving portion 514, a lens-side claw portion 590, and a lens-side through portion 580. The lens-side terminal holding unit 520, the reference surface 511, the lock pin slide surface 509, the screw 513, the cylindrical portion 512, and the lock pin receiving portion 514 are substantially the same as the rear terminal holding unit 320, the reference surface 311, the lock pin slide surface 309, the screw 313, the cylindrical portion 312, and the lock pin receiving portion 314 of the rear mount 310. The lens-side terminal holding unit 520 includes a plurality of lens-side terminals or contacts (hereinafter referred to as a "lens-side terminal group"). The lens-side terminal group is connected to the lens-side CPU 530.

The mount on the image side of the compatible lens 5 includes the lens-side claw portion 590 disposed between the front mount 410 and the front claw portion 490 in the optical axis O direction, once the compatible lens 5 is attached to the teleconverter 3. Further, the mount on the image side of the compatible lens 5 includes the lens-side through portion 580 through which the corresponding lens-side claw portion 590 passes when the compatible lens 5 is attached to the teleconverter 3.

The number of lens-side claw portions 590 and the number of lens-side through portions 580 are each at least two or more. The number is five in the present embodiment. Preferably, the number of the lens-side claw portions 590 and the number of the lens-side through portions 580 are each four or more. This achieves a sufficient strength even if the diameter of the cylindrical portion 312 is made larger. In the present embodiment, a first lens-side through portion 580a, a first lens-side claw portion 590a, a second lens-side through portion 580b, a second lens-side claw portion 590b, a third lens-side through portion 580c, a third lens-side claw portion 590c, a fourth lens-side through portion 580d, a fourth lens-side claw portion 590d, a fifth lens-side through portion 580e, and a fifth lens-side claw portion 590e are disposed in this order from the position of the inner periphery of the lock pin receiving portion 514 along the circumferential direction of the cylindrical portion 512.

Once the compatible lens 5 is attached to the teleconverter 3, four lens-side claw portions 590 other than the third lens-side claw portion 590c come into contact with the respective flat springs 413 of the front mount 410. When the flat springs 413 and the four lens-side claw portions 590 come into contact with each other, the four lens-side claw portions 590 are urged by the flat spring 413 in a direction away from the front claw portion 490. As a result, the four lens-side claw portions 590 are pressed against the front mount 410 to stabilize the attachment of the teleconverter 3 to the compatible lens 5.

As illustrated in FIG. 11, lengths in the circumferential directions of the lens-side claw portion 590 are different from each other. That is, angles respectively formed by lines connecting one ends of the lens-side claw portions 590 in the circumferential direction and the optical axis O and lines connecting the other ends of the lens-side claw portions 590 in the circumferential direction and the optical axis O are different from one another. Specifically, the first lens-side claw portion 590a is the longest, the fifth lens-side claw portion 590e is the second longest, the second lens-side claw portion 590b is the third longest, and the fourth lens-side claw portion 590d is the fourth longest, and the third lens-side claw portion 590c is the shortest. The length of each lens-side claw portion 590 in the circumferential direction may be any value as long as the lens-side claw portion 590 can receive the urging force from the flat spring 413 once the compatible lens 5 is attached to the teleconverter 3. The compatible mount 510 preferably abuts on at least two of the front claw portions 490 at an erroneous attachment position, which will be described later, when inserting the compatible mount 510 into the front mount 410.

An angle $\alpha 14$ formed by a line connecting one end of the first lens-side claw portion 590a and the optical axis O and a line connecting the other end of the first lens-side claw portion 590a and the optical axis O is approximately 48 degrees, and is between 46 degrees and 50 degrees.

An angle $\alpha 15$ formed by a line connecting one end of the second lens-side claw portion 590b and the optical axis O and a line connecting the other end of the second lens-side claw portion 590b and the optical axis O is approximately 36 degrees, and is between 34 degrees and 38 degrees. Note that the angle $\alpha 6$ is less than the rotation angle.

An angle $\alpha 16$ formed by a line connecting one end of the third lens-side claw portion 590c and the optical axis O and a line connecting the other end of the third lens-side claw portion 590c and the optical axis O is approximately 9.5 degrees, and is between 7.5 degrees and 11.5 degrees.

An angle $\alpha 17$ formed by a line connecting one end of the fourth lens-side claw portion 590d and the optical axis O and a line connecting the other end of the fourth lens-side claw portion 590d and the optical axis O is approximately 29 degrees, and is between 27 degrees and 31 degrees.

An angle $\alpha 18$ formed by a line connecting one end of the fifth lens-side claw portion 590e and the optical axis O and a line connecting the other end of the fifth lens-side claw portion 590e and the optical axis O is approximately 43 degrees, and is between 41 degrees and 45 degrees.

Lengths of the first lens-side claw portion 590a to the fifth lens-side claw portion 590e in a radial direction (heights of the claw portions) are substantially the same. Further, lengths of the first lens-side claw portion 590a to the fifth lens-side claw portion 590e in the optical O direction (thicknesses of the claw portions) are substantially the same. Note that the third lens-side claw portion 590c does not receive urging force from the flat spring 413 at the completion of attachment; thus, the height and thickness of the third lens-side claw portion 590c may be smaller than those of other lens-side claw portions, as long as the third lens-side claw portion 590c is not damaged upon erroneous insertion which will be described later.

Lengths of the first lens-side through portion 580a to the fourth lens-side through portion 580e in the circumferential direction are different from each other. Specifically, the second lens-side through portion 580b is the longest, the first lens-side through portion 580a, the third lens-side through portion 580c, and the fifth lens-side through portion 580e have substantially the same length, and the fourth lens-side through portion 580d is the shortest. The length of each lens-side through portion 580 in the circumferential direction can be changed as appropriate, as long as the lens-side through portion 580 can allow the front claw portion 490 to pass therethrough when the compatible mount 510 is inserted into the front mount 410.

An angle $\beta 14$ formed by a line connecting one end of the first lens-side through portion 580a and the optical axis O and a line connecting the other end of the first lens-side through portion 580a and the optical axis O is approximately 45 degrees, and is between 47 degrees and 52 degrees.

An angle $\beta 15$ formed by a line connecting one end of the second lens-side through portion 580b and the optical axis O and a line connecting the other end of the second lens-side through portion 580b and the optical axis O is approximately 49.5 degrees, and is between 48 degrees and 51 degrees.

An angle $\beta 16$ formed by a line connecting one end of the third lens-side through portion 580c and the optical axis O and a line connecting the other end of the third lens-side through portion 580c and the optical axis O is approximately 44 degrees, and is between 42 degrees and 46 degrees.

An angle β17 formed by a line connecting one end of the fourth lens-side through portion 580d and the optical axis O and a line connecting the other end of the fourth lens-side through portion 580d and the optical axis O is approximately 10 degrees, and is between 8 degrees and 11 degrees. Note that the angle β17 can be changed as appropriate as long as it is larger than the angle α11 of the protrusion 415.

An angle β18 formed by a line connecting one end of the fifth lens-side through portion 580e and the optical axis O and a line connecting the other end of the fifth lens-side through portion 580e and the optical axis O is approximately 44.5 degrees, and is between 42.5 degrees and 46.5 degrees.

A sum of the angles α14 to α18 of all the lens-side claw portions 590 and the angles β14 to β18 of all the lens-side through portions 580 is 360 degrees.

Further, the first lens-side claw portion 590a is disposed on the third lens-side line L7 to face at least a part of the third lens-side claw portion 590c, the fourth lens-side through portion 580d, and at least a part of the fourth lens-side claw portion 590d, across the optical axis O.

The first lens-side claw portion 590a is disposed at an upper left side of the lens-side terminal holding unit 520, and the second lens-side through portion 580b is disposed at an upper right side of the lens-side terminal holding unit 520. Therefore, an angle formed by a line connecting one end of the lens-side terminal holding unit 520 and the optical axis O and a line connecting the other end of the lens-side terminal holding unit 520 and the optical axis O is smaller than a sum of the angle α14 of the first lens-side claw portion 590a and the angle β15 of the second lens-side through portion 580b.

A restriction pin (not shown) is disposed between the reference surface 511 of the compatible mount 510 and the fifth lens-side claw portion 590d and projects from an outer circumferential surface of the cylindrical portion 512. This restriction pin is substantially equivalent to the restriction pin 315 of the rear mount 310 illustrated in FIG. 8.

Non-Compatible Mount 610 of Non-Compatible Lens 6

The mount on the image side of the non-compatible lens 6 is substantially equivalent to the rear mount of the teleconverter 3 and includes, in addition to the non-compatible mount 610, a reference surface, a lock pin slide surface, a screw, a cylindrical portion, a through portion, and a claw portion. The reference surface, the lock pin slide surface, the screw, the cylindrical portion, the through portion, and the claw portion of the non-compatible lens 6 are substantially equivalent to those of the rear mount of the teleconverter 3, and thus are not shown. The mount on the image side of the non-compatible lens 6 is substantially equivalent to the rear mount of the teleconverter 3, and an attachment method, a detachment method, and an erroneous insertion prevention method of the non-compatible lens 6 to the camera body 2, which will be described later, are also the same as those of the rear mount of the teleconverter 3. The non-compatible mount 610 includes a terminal holding unit having substantially the same shape as the rear terminal holding unit 320. The terminal holding unit of the non-compatible mount 610 has a lens-side terminal group including a plurality of lens-side terminals. The lens-side terminal group comes into contact with the body-side terminal group of the body-side mount 210 to make an electrical connection when the non-compatible mount 610 is attached to the camera body 2. The lens-side terminal group of the non-compatible mount 610 is connected to the lens-side CPU 630.

Here, the body-side claw portion 290, the rear claw portion 390, the front claw portion 490, and the lens-side claw portion 590 are collectively referred to as a claw portion. The body-side through portion 280, the rear through portion 380, the front through portion 480, and the lens-side through portion 580 are collectively referred to as a through portion.

Method for Attaching Teleconverter 3 to Camera Body 2

Figure 13:
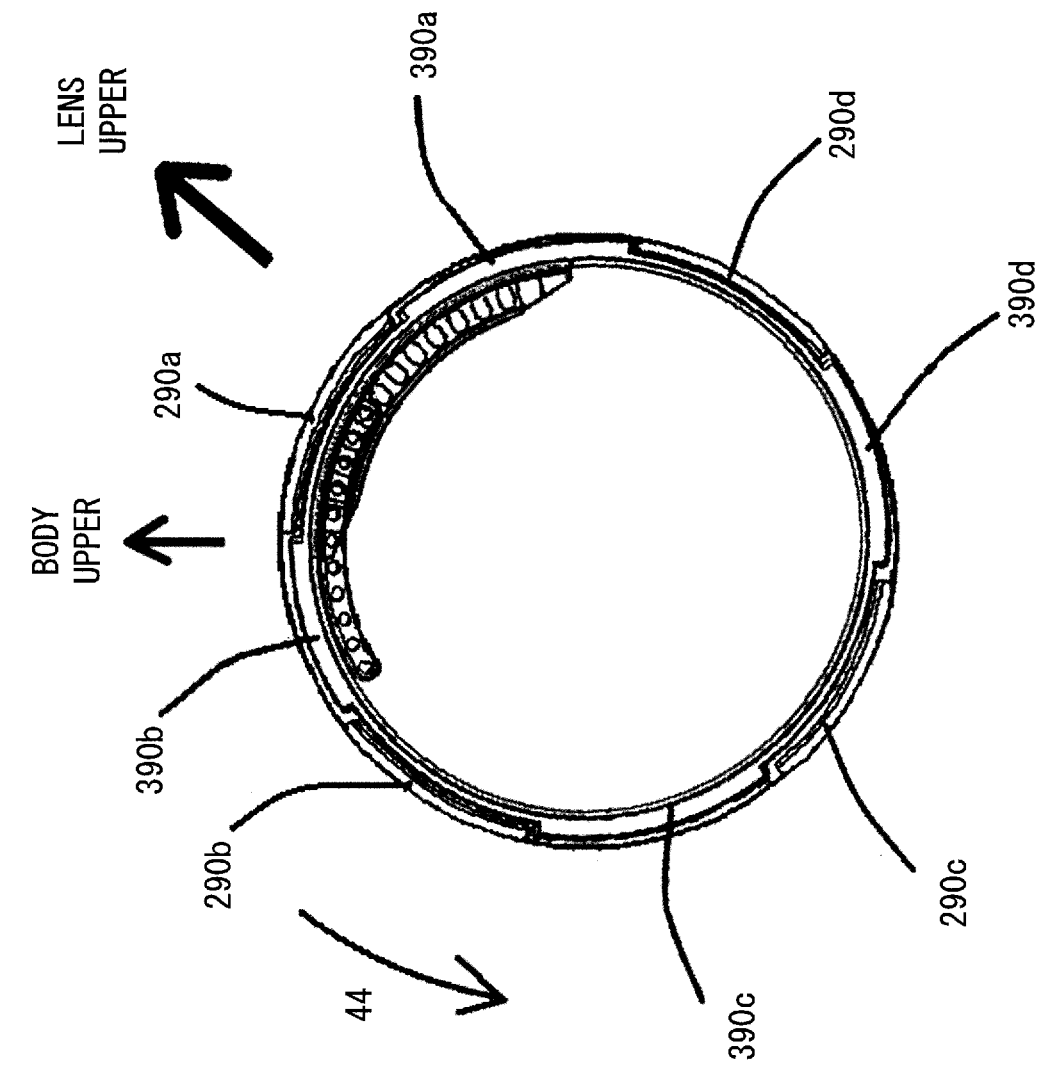
FIG. 13 is a front view of a body-side claw portion and a lens-side claw portion at an insertion position, as seen from the subject side.
Figure 14:
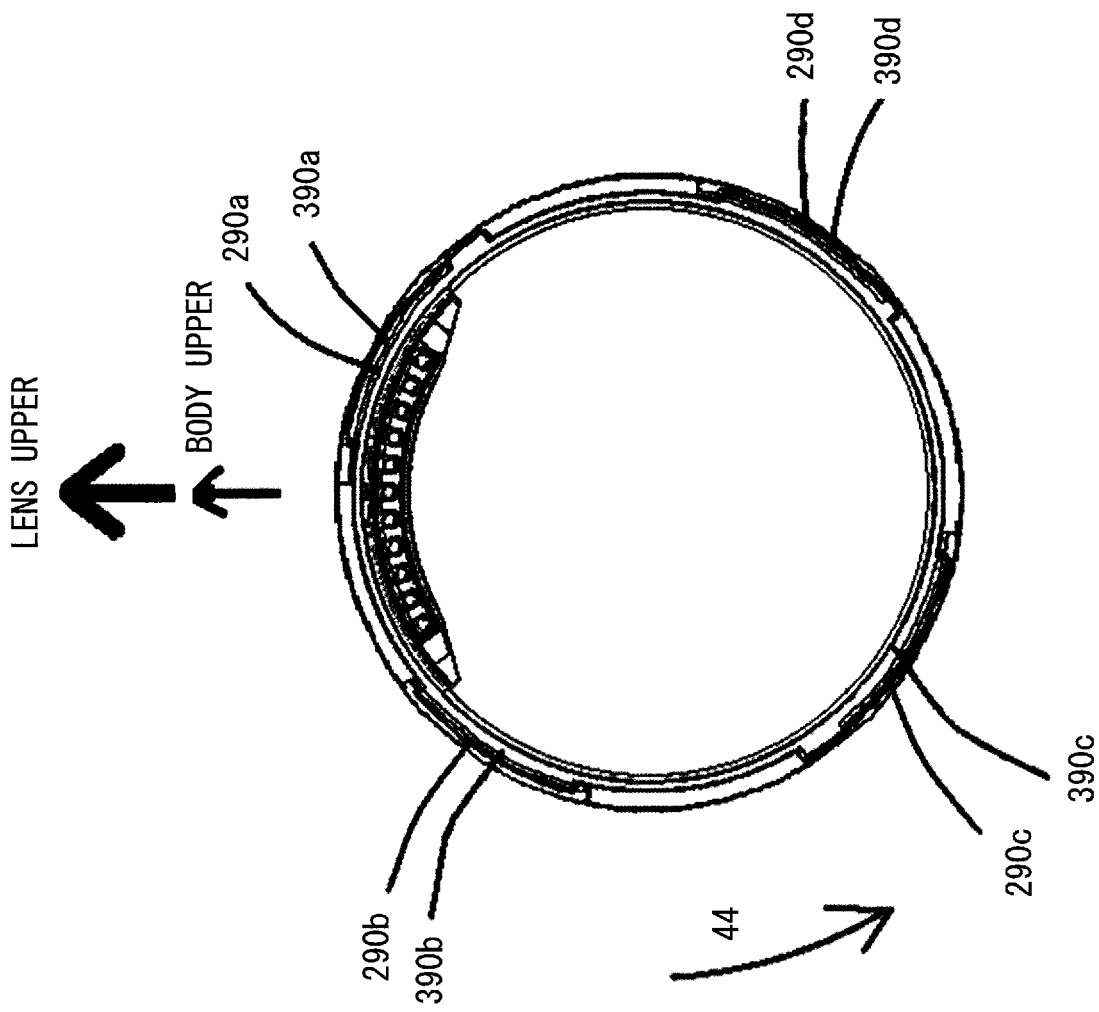
FIG. 14 is a front view of the body-side claw portion and the lens-side claw portion at an insertion position, as seen from the subject side.

A method for attaching the teleconverter 3 to the camera body 2 will be described next with reference to FIG. 13 and FIG. 14. FIG. 13 and FIG. 14 are views illustrating positional relationship between the body-side claw portion 290 of the camera body 2 and the rear claw portion 390 of the teleconverter 3, and are views for making a state where the claw portions abut on each other understandable. Further, FIG. 13 and FIG. 14 are views of the body-side mount 210 and the rear mount 310, as seen from the subject side to the image sensor 270 side (seen in the +Z direction), and the rear mount 310 is horizontally inverted with respect to that in FIG. 6 and FIG. 7.

When the teleconverter 3 is attached to the camera body 2, first, a position of an index (not illustrated) provided on the outer peripheral surface of the teleconverter 3 and a position of an index (not illustrated) provided on an exterior surface of the camera body 2 are aligned, the body-side mount 210 and the rear mount 310 are made to face each other, and each rear claw portion 390 is inserted into each body-side through portion 280. That is, as illustrated in FIG. 13, the first rear claw portion 390a is inserted into the first body-side through portion 280a, the second rear claw portion 390b is inserted into the second body-side through portion 280b, the third rear claw portion 390c is inserted into the third body-side through portion 280c, and the fourth rear claw portion 390d is inserted into the fourth body-side through portion 280d. At this time, the first body-side claw portion 290a is inserted into the second rear through portion 380b, the second body-side claw portion 290b is inserted into the third rear through portion 380c, the third body-side claw portion 290c is inserted into the fourth rear through portion 380d, and the fourth body-side claw portion 290d is inserted into the first rear through portion 380a. The position of the teleconverter 3 with respect to the camera body 2 at this time will be referred to as an insertion position.

The teleconverter 3 is rotated in the attaching direction 44 illustrated in FIG. 13 from the above-described insertion position. The attaching direction 44 is a direction along the circumferential direction around the optical axis O in a plane which is substantially orthogonal to the optical axis O. In association with rotation of the teleconverter 3, the first body-side claw portion 290a and the flat spring 213a go into space between the first rear claw portion 390a and the reference surface 311.

That is, the first rear claw portion 390a goes into the image sensor 270 side (+Z side) of the first body-side claw portion 290a so that the first rear claw portion 390a faces the image sensor 270 side (+Z side) of the flat spring 213a. In conjunction with this, the first body-side claw portion 290a and the flat spring 213a go into space between the first rear claw portion 390a and the reference surface 311. In a similar manner, the second body-side claw portion 290b and the flat spring 213b go into space between the second rear claw portion 390b and the reference surface 311, the third body-side claw portion 290c and the flat spring 213c go into space between the third rear claw portion 390c and the reference surface 311, and the fourth body-side claw portion 290d and the flat spring 213d go into space between the fourth rear claw portion 390d and the reference surface 311. At this time, the rear terminals sequentially come into contact with the body-side terminals.

Note that, while the teleconverter 3 is made to rotate in the attaching direction 44 with respect to the camera body 2, it is also possible to make the camera body 2 rotate in a direction opposite to the attaching direction 44 with respect to the teleconverter 3.

FIG. 14 is a view of the teleconverter 3 which has been rotated in the attaching direction 44 by a first angle with respect to the camera body 2 from the insertion position in FIG. 13, and illustrates a state where attachment of the teleconverter 3 to the camera body 2 is completed. The position of the teleconverter 3 at this time will be referred to as an attachment position. The first rotating angle is approximately 40 degrees in the present embodiment, and is between 38.5 degrees and 41.5 degrees.

At the attachment position, the lock pin 214 of the camera body 2 being pushed to the −Z direction goes into the lock pin receiving portion 314 of the teleconverter 3. After the lock pin 214 fits into the lock pin receiving portion 314, rotation of the teleconverter 3 to be removed from the camera body 2 is restricted. That is, when each body-side claw portion 290 and each rear claw portion 390 reach the attachment position, a relative position between the body-side mount 210 and the rear mount 310 in the circumferential direction are fixed.

Further, the rear claw portion 390 is pushed to the image sensor 270 side (+Z direction) by the flat spring 213, so that the reference surface 311 of the rear mount 310 comes into contact with the reference surface 211 of the body-side mount 210. By the rear mount 310 being in surface contact with the body-side mount 210 and being urged by the flat spring 213, the teleconverter 3 is tightly attached to the camera body 2.

At the attachment position, the plurality of rear terminals respectively come into contact with the corresponding plurality of body-side terminals, and are electrically connected to the plurality of body-side terminals.

Further, a state from each rear claw portion 390 being inserted into each corresponding body-side through portion 280 at the insertion position in FIG. 13 until immediately before the attachment position in FIG. 14 will be referred to as an attachment incompletion state. Because the lock pin 214 of the camera body 2 is pushed in the −Z direction, in the attachment incompletion state, an end portion of the lock pin 214 in the −Z direction is in contact with the lock pin slide surface 309 of the rear mount 310.

In association with rotation of the teleconverter 3, the end portion of the lock pin 214 in the −Z direction slides on the lock pin slide surface 309 of the teleconverter 3. Therefore, in a first angle range in a direction opposite to the attaching direction 44 from the lock pin receiving portion 314 of the lock pin slide surface 309, a fixing screw for fixing the rear mount 310 is not disposed. By a fixing screw not being disposed in the above-described first rotating angle range in the opposite direction, the end portion of the lock pin 214 in the −Z direction does not abut on the fixing screw as the lock pin 214 slides on the lock pin slide surface 309. It is thus possible to smoothly attach and remove the teleconverter 3.

Method for Removing Teleconverter 3 from Camera Body 2

If a user depresses the unlocking button which is not illustrated of the camera body 2 at the attachment position, the lock pin 214 evacuates from the lock pin receiving portion 314 to the image sensor 270 side. As a result, the rotation restriction of the teleconverter 3 with respect to the camera body 2 is canceled, so that the rear mount 310 can be rotated with respect to the body-side mount 210. By this means, restriction on rotation of the teleconverter 3 with respect to the camera body 2 is canceled, so that the rear mount 310 is allowed to rotate with respect to the body-side mount 210. If the teleconverter 3 is rotated in a direction opposite to the attaching direction 44 (removing direction) with respect to the camera body 2 while the unlocking button which is not illustrated is depressed, each rear claw portion 390 moves to a position of each body-side through portion 280 from a position facing an image side surface of each body-side claw portion 290, and reaches the insertion position illustrated in FIG. 13.

Explanation of Over-Rotated State in Attaching Direction in Operation of Attaching Teleconverter 3 to Camera Body 2

Figure 15:
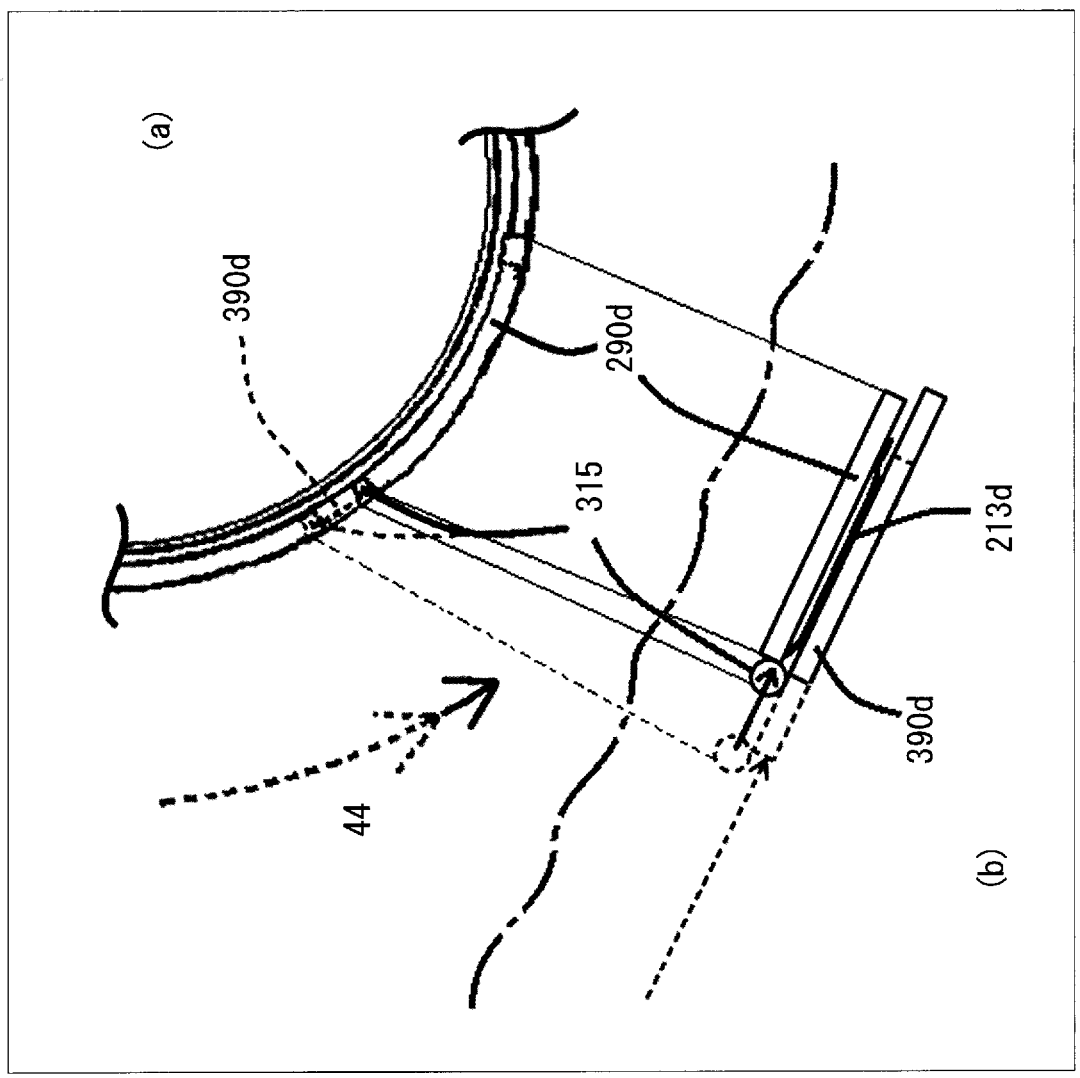
FIG. 15 shows a front view and a side view of the body-side claw portion and the lens-side claw portion in an over-rotated state in an attaching direction, as seen from the subject side.

An over-rotated state where the teleconverter 3 is rotated in the attaching direction 44 with respect to the camera body 2 by an angle equal to or greater than the first rotating angle will be described next with reference to FIG. 15. FIG. 15 is a schematic view illustrating positional relationship between the fourth body-side claw portion 290d of the camera body 2 and the fourth rear claw portion 390d of the teleconverter 3. A part (a) on an upper side of a dashed-dotted line is a view seen from the subject side to the image sensor 270 side, and a part (b) on a lower side of the dashed-dotted line is a view of the mounts seen from a side (an outer peripheral direction). In an operation of attaching the teleconverter 3 to the camera body 2, if the user rotates the teleconverter 3 in the attaching direction 44 while depressing the unlocking button, the lock pin 214 does not go into the lock pin receiving portion 314 at the attachment position. Therefore, it is possible to rotate the teleconverter 3 further from the attachment position illustrated in FIG. 14 with respect to the camera body 2. In the case where the teleconverter 3 is rotated in the attaching direction 44 further from the attachment position with respect to the camera body 2, the restriction pin 315 abuts on the rear end of the fourth body-side claw portion 290d in the attaching direction 44, and further rotation of the teleconverter 3 with respect to the camera body 2 is prevented.

Explanation of Over-Rotated State in Removing Direction in Operation of Removing Teleconverter 3 from Camera Body 2

Figure 16:
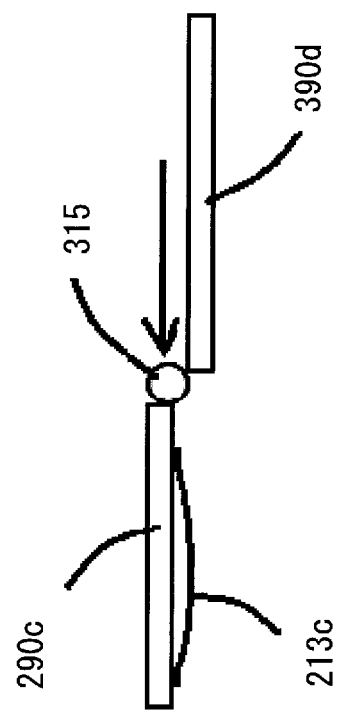
FIG. 16 is a side view of the body-side claw portion and the lens-side claw portion in an over-rotated state in a removing direction, as seen from the subject side.

An over-rotated state where the teleconverter 3 is rotated beyond the insertion position in a direction opposite to the attaching direction 44 (removing direction) with respect to the camera body 2 will be described next with reference to FIG. 16. FIG. 16 is a view of part of a lens mount mechanism in an over-rotated state in the removing direction, as seen from a side. Because the restriction pin 315 is disposed at a rear end portion of the fourth rear claw portion 390d in the attaching direction 44, if the user tries to inversely rotate the teleconverter 3 after the teleconverter 3 is inserted into the camera body 2, the restriction pin 315 abuts on a tip of the third body-side claw portion 290c in the attaching direction 44, so that further rotation of the teleconverter 3 in the removing direction with respect to the camera body 2 is prevented.

In this manner, by the restriction pin 315 abutting on the end portion of the body-side claw portion 290 in the circumferential direction, both over-rotation in the attaching direction 44 and over-rotation in the removing direction are prevented. Because the restriction pin 315 prevents both the over-rotation in the attaching direction 44 and the over-rotation in the removing direction, it is not necessary to prepare two members for preventing over-rotation in the attaching direction 44 and for preventing over-rotation in the removing direction.

Further, because the restriction pin 315 prevents over-rotation by utilizing the end portion of the body-side claw portion 290 in the circumferential direction, it is not necessary to separately provide a member which abuts on the restriction pin 315 upon over-rotation.

Explanation of Erroneous Insertion State of Teleconverter 3 with Respect to Camera Body 2

Figure 17:
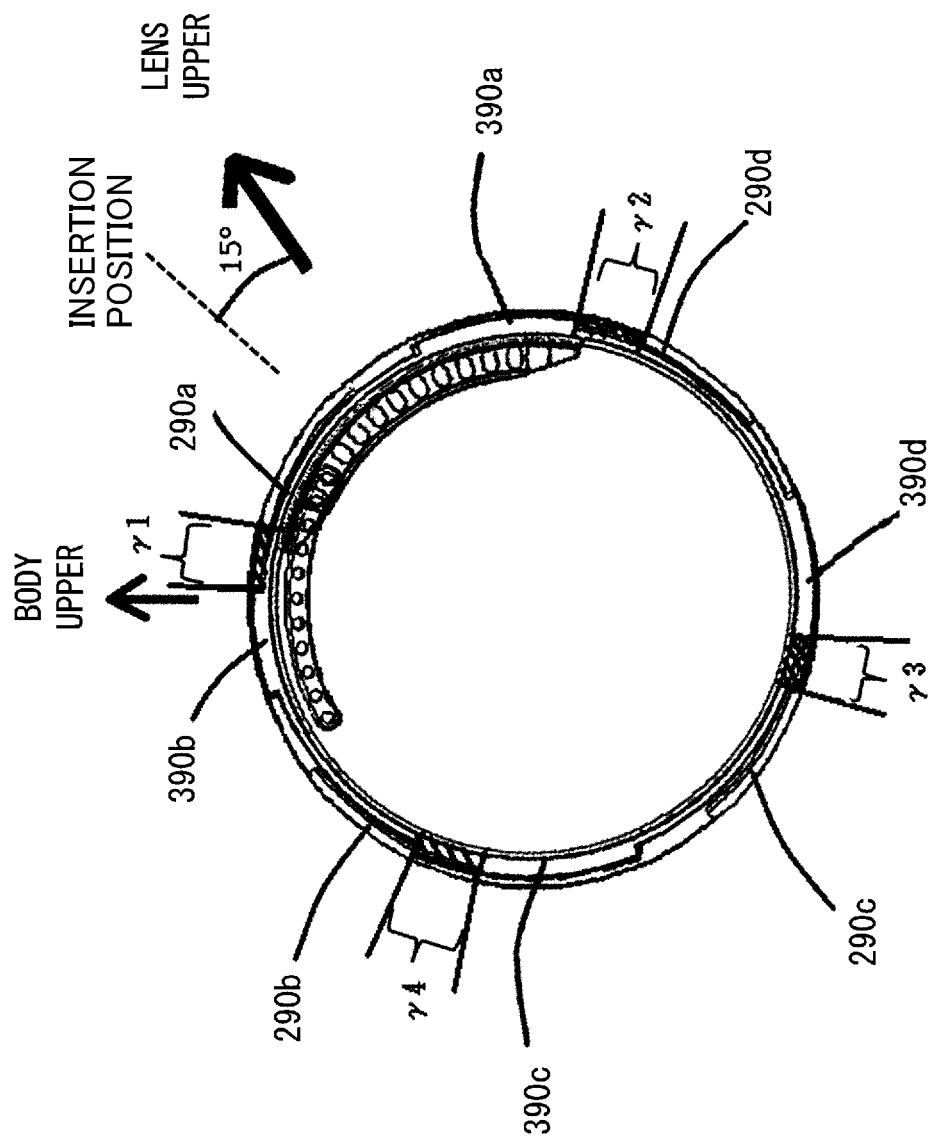
FIG. 17 is a front view of the body-side claw portion and a rear claw portion in a first erroneous insertion state, as seen from the subject side.
Figure 18:
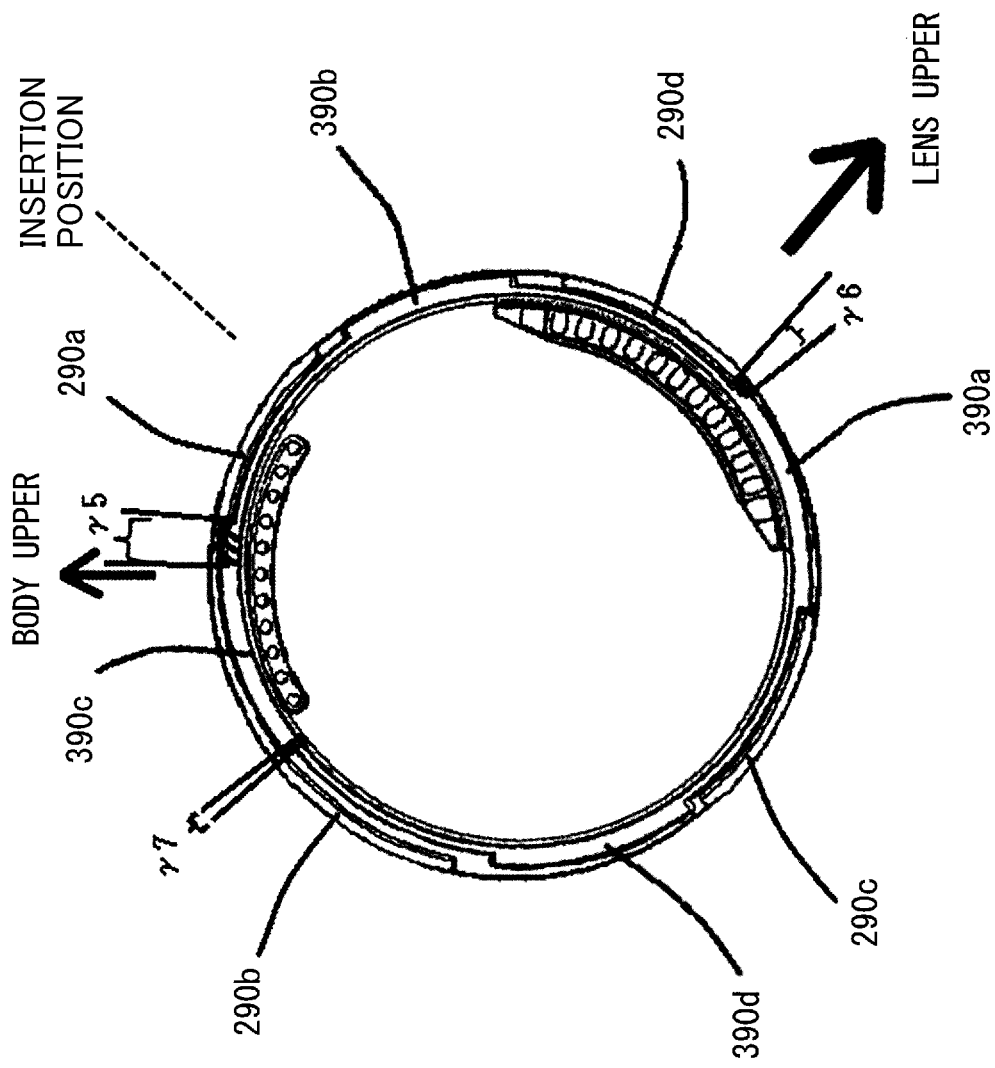
FIG. 18 is a front view of the body-side claw portion and the rear claw portion in a second erroneous insertion state, as seen from the subject side.
Figure 19:
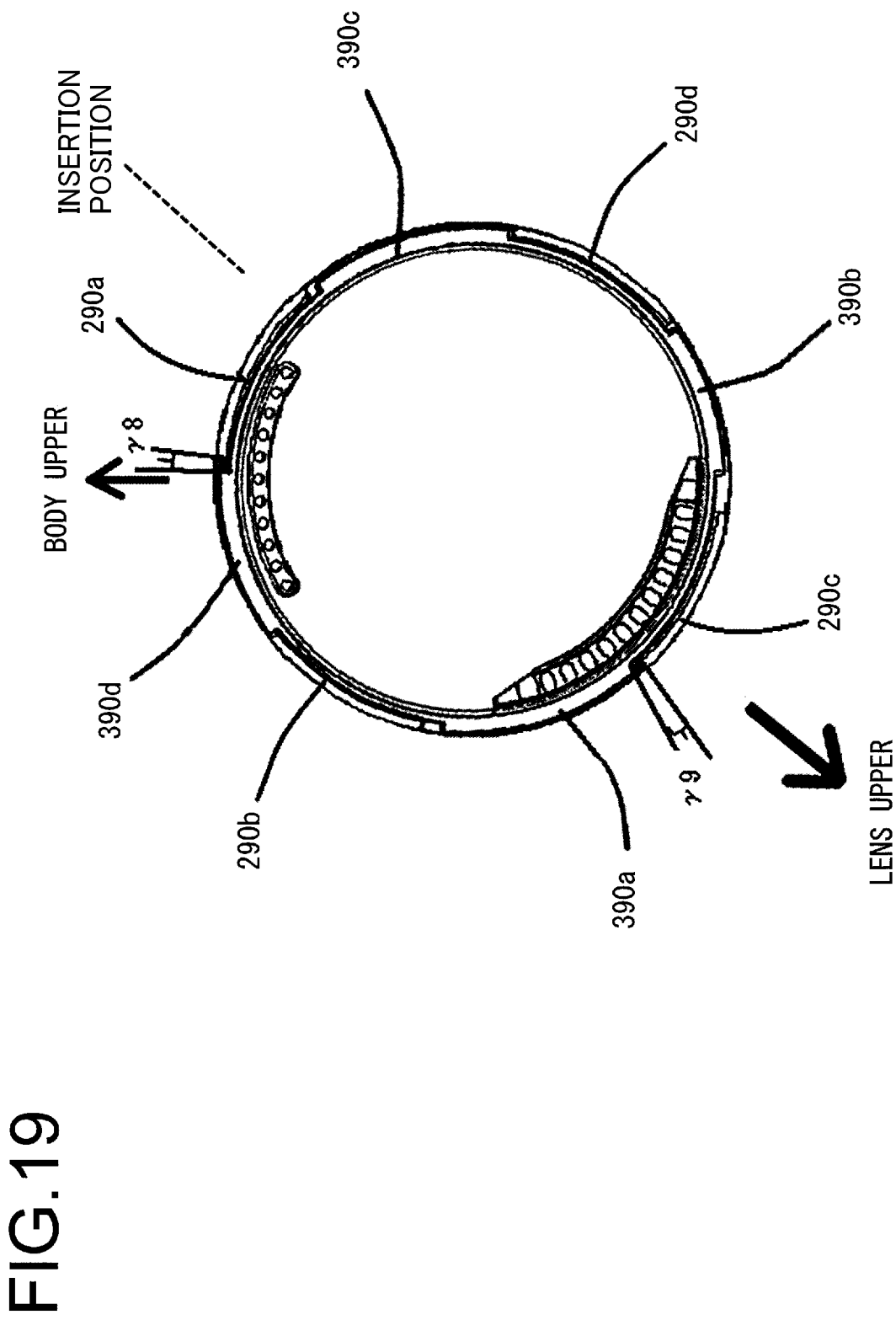
FIG. 19 is a front view of the body-side claw portion and the rear claw portion in a third erroneous insertion state, as seen from the subject side.
Figure 20:
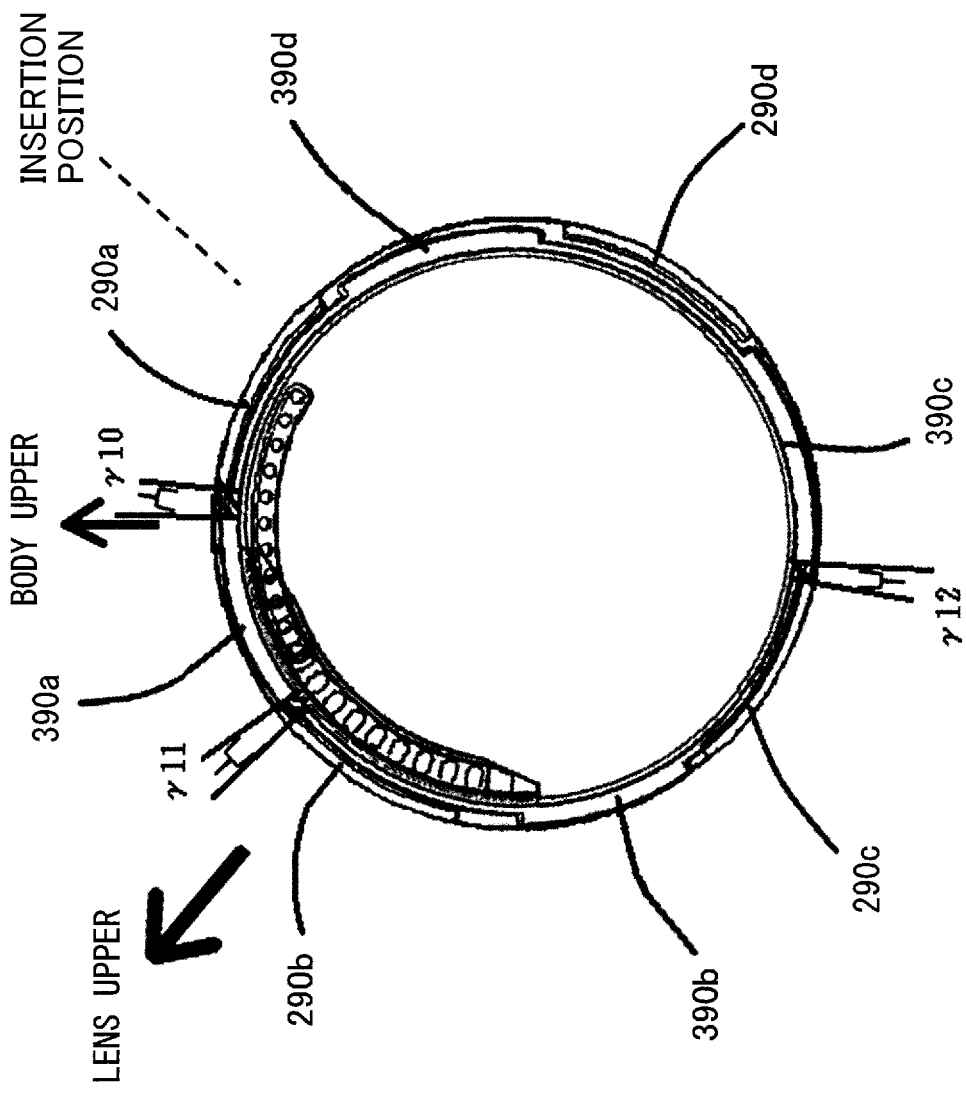
FIG. 20 is a front view of the body-side claw portion and the rear claw portion in a fourth erroneous insertion state, as seen from the subject side.

An erroneous insertion state where the user tries to insert the teleconverter 3 into the camera body 2 at a wrong position without aligning the index of the teleconverter 3 and the index of the camera body 2 will be described next. Because the rear claw portion 390 does not pass through the body-side through portion 280 in an erroneous insertion state, positional relationship between the rear claw portion 390 and the body-side claw portion 290 on the optical axis O is different from positional relationship at the insertion position. FIG. 17 to FIG. 20 are schematic views illustrating positional relationship between the body-side claw portion 290 of the camera body 2 and the rear claw portion 390 of the teleconverter 3, and are views for making a state where the claw portions abut on each other understandable. Further, FIG. 17 to FIG. 20 are views of the body-side mount 210 and the rear mount 310, as seen from the subject side to the image sensor 270 side (seen in the +Z direction), and the rear mount 310 is horizontally inverted with respect to that in FIG. 6 and FIG. 7. As an example of the erroneous insertion state, a state where the index of the teleconverter 3 and the index of the camera body 2 are not aligned and the index of the teleconverter 3 is displaced from the insertion position in the removing direction by 15 degrees is illustrated in FIG. 17. Further, states where the index of the interchangeable lens 3 with respect to the index of the camera body 2 is displaced from the insertion position at intervals of 90 degrees are illustrated in FIG. 18 to FIG. 20.

FIG. 17 illustrates a state where the index is displaced from the insertion position in the removing direction by 15 degrees (first erroneous insertion state). As indicated with hatching in FIG. 17, because the rear claw portion 390 abuts on the body-side claw portion 290 at portions indicated with four reference signs γ1 to γ4, the rear claw portion 390 is not inserted into the body-side through portion 280. That is, in the first erroneous insertion state, by the rear claw portion 390 abutting on the body-side claw portion 290 at four portions, erroneous insertion is reliably prevented.

FIG. 18 is a view illustrating a state where the index of the teleconverter 3 with respect to the index of the camera body 2 is displaced from the insertion position in the removing direction by approximately 90 degrees (second erroneous insertion state). FIG. 19 is a view illustrating a third erroneous insertion state where the index of the teleconverter 3 with respect to the index of the camera body 2 is displaced from the insertion position in the removing direction by approximately 180 degrees. FIG. 20 is a view illustrating a fourth erroneous insertion state where the index of the teleconverter 3 with respect to the index of the camera body 2 is displaced from the insertion position in the removing direction by approximately 270 degrees.

As illustrated in FIG. 18, in a case of the second erroneous insertion state, because the third rear claw portion 390c abuts on the first body-side claw portion 290a at a portion indicated with reference sign γ5, and abuts on the second body-side claw portion 290b at a portion indicated with reference sign γ7, the third rear claw portion 390c cannot be inserted into the second body-side through portion 280b. Further, because the first rear claw portion 390a abuts on the fourth body-side claw portion 290d at a portion indicated with reference sign γ6, the first rear claw portion 390a cannot be inserted into the fourth body-side through portion 280d. In this manner, in the second erroneous insertion state, erroneous insertion is prevented by the rear claw portion 390 abutting on the body-side claw portion 290 at three positions.

As illustrated in FIG. 19, in a case of the third erroneous insertion state, because the fourth rear claw portion 390d abuts on the first body-side claw portion 290a at a portion indicated with reference sign γ8, the fourth rear claw portion 390d cannot be inserted into the second body-side through portion 280b. Further, because the first rear claw portion 390a abuts on the third body-side claw portion 290c at a portion indicated with reference sign γ9, the first rear claw portion 390a cannot be inserted into the third body-side through portion 280c. In this manner, in the third erroneous insertion state, by the rear claw portion 390 abutting on the body-side claw portion 290 at two positions, erroneous insertion is prevented.

As illustrated in FIG. 20, in a case of the fourth erroneous insertion state, because the first rear claw portion 390a abuts on the first body-side claw portion 290a at a portion indicated with reference sign γ10 and abuts on the second body-side claw portion 290b at a portion indicated with reference sign γ11, the first rear claw portion 390a cannot be inserted into the second body-side through portion 280b. Further, because the third rear claw portion 390c abuts on the third body-side claw portion 290c at a portion indicated with reference sign γ12, the third rear claw portion 390c cannot be inserted into the fourth body-side through portion 280d. In this manner, in the fourth erroneous insertion state, erroneous insertion is prevented by the rear claw portion 390 abutting on the body-side claw portion 290 at three positions.

As described above, in the erroneous insertion states other than the insertion state, the rear claw portion 390 abuts on the body-side claw portion 290 at at least two positions. Thus, the rear claw portion 390 is prohibited from being inserted into the body-side through portion 280 at positions other than the insertion position. Therefore, even if it is tried to attach the teleconverter 3 to the camera body 2 at the erroneous insertion positions, erroneous insertion is reliably prevented by the claw portions abutting on each other at at least two positions.

Further, in the first erroneous insertion state to the fourth erroneous insertion state, one of two or more abutment positions is located above the upper side of the image sensor 270. That is, at the erroneous insertion positions, insertion of the claw portions 390 other than the second rear claw portion 390b into the second body-side through portion 280b is prevented by one of the first rear claw portion 390a to the fourth rear claw portion 390d abutting on an end portion on a leading side of the first body-side claw portion 290a in the attaching direction 44. As mentioned above, the body-side terminal holding unit 220 is disposed within the opening 212 of the body-side mount 210 and above the upper side of the image sensor 270. The first body-side claw portion 290a is located above the body-side terminal holding unit 220, and a length of the first body-side claw portion 290a in the circumferential direction is the longest among the four body-side claw portions 290. Further, the second body-side through portion 280b is located above the body-side terminal holding unit 220, and the second body-side through portion 280b is the shortest among the four body-side through portions 280. Therefore, only the second rear claw portion 390b is capable of being inserted into the second body-side through portion 280b at a proper insertion position, and none of the first rear claw portion 390a, the third rear claw portion 390c or the fourth rear claw portion 390d is erroneously inserted into the second body-side through portion 280b. Further, even if the first rear claw portion 390a, the third rear claw portion 390c or the fourth rear claw portion 390d tilts (tilts in a direction intersecting with the optical axis O direction), they do not go into the second body-side through portion 280b. By this means, the rear claw portions 390a to 390d are prevented from colliding with the body-side terminal holding unit 220 and damaging the body-side terminals in the erroneous insertion states.

Further, while erroneous insertion of the rear claw portions 390 is prevented by the first body-side claw portion 290a abutting on any of the rear claw portions 390 in the erroneous insertion states, the length of the first body-side claw portion 290a in the circumferential direction is the longest among the four body-side claw portions 290 and the first body-side claw portion 290a has high rigidity. It is thus possible to lower a possibility that the first body-side claw portion 290a is broken upon erroneous insertion. Further, in the second to the fourth erroneous insertion states, at least one of the abutment positions is located at a position opposite to the body-side terminal holding unit 220 in relation to the optical axis O. That is, one of the abutment positions is located near the body-side terminal holding unit 220 and above the second body-side line B2 which passes through the optical axis O, and another one of the abutment positions is located below the second body-side line B2 which passes through the optical axis O. Therefore, while there are two or three abutment positions in the second to the fourth erroneous insertion states, the claw portions respectively abut above and below the second body-side line B2 which passes through the optical axis O. It is thus possible to lower a possibility of erroneous insertion. Furthermore, in the second to fourth erroneous insertion states, a space between at least two of the abutment positions in the circumferential direction can be larger than approximately 120 degrees. Thus, upon an erroneous insertion, the first rear claw portion 390a to the fourth rear claw portion 390d do not tilt and go into the second body-side through portion 280b.

Further, in the first to fourth erroneous insertion states, one of the two or more abutment positions is located at an outer periphery side of the rear terminal holding unit 320. That is, in the erroneous insertion positions, one of the first to fourth body-side claw portions 290a to 290d abuts on an end portion on a leading side of the first rear claw portion 390a in the attaching direction 44. Therefore, erroneous insertion of any of the second to fourth body-side claw portions 290b to 290d into the second rear through portion 380b is prevented. As mentioned above, an end portion of a leading side of the first rear claw portion 390a in the attaching direction 44 is located above the rear terminal holding unit 320. By this means, the first rear claw portion 390a is prevented from passing through the body-side through portions 280b to 280d other than the first body-side through portion 280a, thereby preventing colliding with the rear terminal holding unit 320 and damaging the rear terminals. Further, while erroneous insertion of the first rear claw portion 390a is prevented by the first rear claw portion 390a abutting on one of the body-side claw portions 290 in the erroneous insertion states, the length of the first rear claw portion 390a in the circumferential direction is the second longest among the four rear claw portions 390 and the first rear claw portion 390a has relatively high rigidity. It is thus possible to lower a possibility that the first rear claw portion 390a is broken upon erroneous insertion.

Here, as illustrated in FIG. 13, the second rear claw portion 390b passes through the second body-side through portion 280b to be disposed at the insertion position, and then faces the second body-side claw portion 290b at the attachment position. The angle α6 (FIG. 7) of the second rear claw portion 390b is smaller than the angle β2 (FIG. 4) of the second body-side through portion 280b. The angle β2 of the second body-side through portion 280b is smaller than the first angle which is an angular range from the insertion position to the attachment position. Therefore, by making an angle of the second rear claw portion 390b smaller than the first angle, it is possible to make the second body-side through portion 280b smaller and prevent other rear claw portions 390 other than the second rear claw portion 390b from passing through the second body-side through portion 280b in the erroneous insertion states. Particularly, in the second erroneous insertion state to the fourth erroneous insertion state where the rear claw portion 390 abuts on the body-side claw portion 290 at two or three positions, it is possible to prevent other rear claw portions 390a, 390c and 390d other than the second rear claw portion 390b from passing through the second body-side through portion 280b. Because the body-side terminal holding unit 220 is disposed on an inner circumferential side of the second body-side through portion 280b, by the above-described other rear claw portions 390a, 390c and 390d being prevented from passing through, it is also possible to prevent the other rear claw portions 390 and the cylindrical portion 312 from colliding with the body-side terminal holding unit 220 and breaking the body-side terminals.

Note that the angle α6 of the second rear claw portion 390b may be smaller than the angles α5, α7 and α8 of the first rear claw portion 390a, the third rear claw portion 390c and the fourth rear claw portion 390d. The angle β2 of the second body-side through portion 280b may be smaller than the angles α5, α7 and α8 of the above-described first rear claw portion 390a, the third rear claw portion 390c and the fourth rear claw portion 390d.

Method for Attaching Compatible Lens 5 to Teleconverter 3 and the Like

Figure 21:
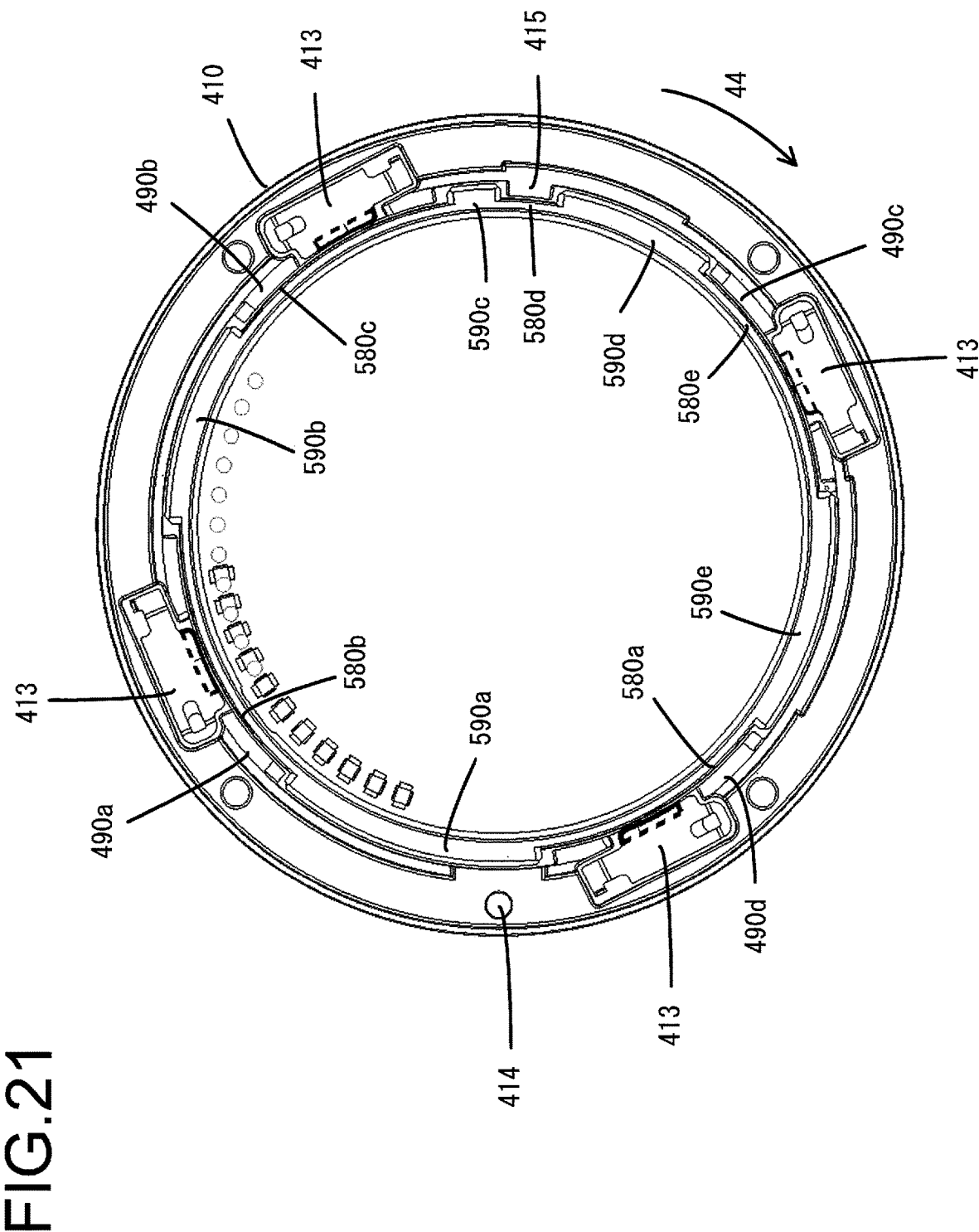
FIG. 21 is a front view of a front claw portion and a lens-side claw portion, as seen from the image side.

A method for attaching the compatible lens 5 to the teleconverter 3 will be described next with reference to FIG. 21 and FIG. 22. FIG. 21 and FIG. 22 are views illustrating positional relationship between the front claw portion 490 of the teleconverter 3 and the lens-side claw portion 590 of the compatible lens 5, and are views for making a state where the claw portions abut on each other understandable. Further, FIG. 21 and FIG. 22 are views of the front mount 410 and the compatible mount 510, as seen from the image sensor 270 side to the subject side (seen in the −Z direction), and FIG. 21 and FIG. 22 are horizontally inverted with respect to FIG. 13 and FIG. 14.

When attaching the compatible lens 5 to the teleconverter 3, first, a position of an index (not illustrated) provided on the outer peripheral surface of the compatible lens 5 and a position of an index (not illustrated) provided on an exterior surface of the teleconverter 3 are aligned, the front mount 410 and the compatible mount 510 are made to face each other, and each lens-side claw portion 590 is inserted into each front through portion 480. That is, as illustrated in FIG. 21, the first lens-side claw portion 590a is inserted into the first front through portion 480a, the second lens-side claw portion 590b is inserted into the second front through portion 480b, and the third lens-side claw portion 590c is inserted into the third front through portion 480c, the fourth lens-side claw portion 590d is inserted into the fourth front through portion 480d, and the fifth lens-side claw portion 590*e* is inserted into the fifth front through portion 480*e*. At this time, the first front claw portion 490*a* is inserted into the second lens-side through portion 580*b*, the second front claw portion 490*b* is inserted into the third lens-side through portion 580*c*, the protrusion 415 is inserted into the fourth lens-side through portion 580*d*, the third front claw portion 490*c* is inserted into the fifth lens-side through portion 580*e*, and the fourth front claw portion 490*d* is inserted into the first lens-side through portion 580*a*. The position of the compatible lens 5 with respect to the teleconverter 3 at this time will be referred to as an insertion position.

The compatible lens 5 is rotated in the attaching direction 44 illustrated in FIG. 21 from the above-described insertion position. The attaching direction 44 and an attaching angle (first angle) are the same as when the teleconverter 3 is attached to the camera body 2. In association with rotation of the compatible lens 5, the front claw portions 490 and each flat spring 413 go into respective space between each lens-side claw portion 590 and the reference surface 511. At this time, the lens-side terminals come into contact with the front terminals, and are electrically connected to the front terminals.

FIG. 22 is a view of the compatible lens 5 which is rotated in the attaching direction 44 by the first angle with respect to the teleconverter 3 from the insertion position in FIG. 21, and illustrates a state where attachment of the compatible lens 5 to the teleconverter 3 is completed. The position of the compatible lens 5 at this time will be referred to as an attachment position. In an attachment completed state, the third lens-side claw portion 590*c* does not face the third front claw portion 490*c*.

At the attachment position, the lock pin 414 of the teleconverter 3 being pushed to the −Z direction goes into the lock pin receiving portion 514 of the compatible lens 5. After the lock pin 414 fits into the lock pin receiving portion 514, rotation of the compatible lens 5 to be removed from the teleconverter 3 is restricted. That is, when each front claw portion 490 and each lens-side claw portion 590 reach the attachment position, a relative position between the front mount 410 and the compatible mount 510 in the circumferential direction are fixed.

Further, the lens-side claw portion 590 is pushed to the image sensor 270 side (+Z direction) by the flat spring 413, so that the reference surface 511 of the compatible mount 510 comes into contact with the reference surface 411 of the front mount 410. By the compatible mount 510 being in surface contact with the front mount 410 and being urged by the flat spring 413, the compatible lens 5 is tightly attached to the teleconverter 3.

Additionally, a state from the insertion position in FIG. 21 to the attachment position in FIG. 22 will be referred to as an attachment incompletion state. In the attachment incompletion state, an end portion of the lock pin 414 of the teleconverter 3 in the −Z direction is in contact with the lock pin slide surface 509 of the compatible mount 510. In association with rotation of the compatible lens 5, the end portion of the lock pin 414 in the −Z direction slides on the lock pin slide surface 509 of the compatible lens 5. Therefore, in a range of the first angle in a direction opposite to the attaching direction 44 from the lock pin receiving portion 514 of the lock pin slide surface 509, a fixing screw for fixing the compatible mount 510 is not disposed. By a fixing screw not being disposed in the above-described first angle range in the opposite direction, the end portion of the lock pin 414 in the −Z direction does not abut on the fixing screw as the lock pin 414 slides on the lock pin slide surface 509. It is thus possible to smoothly attach and remove the teleconverter 3.

Method for Removing Compatible Lens 5 from Teleconverter 3 or the Like

A method for removing the compatible lens 5 from the teleconverter 3 is substantially the same as the method for removing the teleconverter 3 from the camera body 2. An unlocking button (not shown) of the teleconverter 3 is depressed to rotate the compatible lens 5 with respect to the teleconverter 3 in the removing direction and relatively rotate the compatible lens 5 from the attachment position to the insertion position.

An over-rotated state in the attaching direction in the operation of attaching the compatible lens 5 to the teleconverter 3 is also substantially equivalent to the over-rotated state in the attaching direction in the operation of attaching the teleconverter 3 to the camera body 2. The restriction pin of the compatible lens 5 abuts on the rear end of the fourth front claw portion 490*d* in the attaching direction 44, and further rotation of the compatible lens 5 with respect to the teleconverter 3 is prevented.

An over-rotated state in the removing direction in the operation of removing the compatible lens 5 from the teleconverter 3 is also substantially equivalent to the over-rotated state in the removing direction in the operation of removing the teleconverter 3 from the camera body 2. The restriction pin of the compatible lens 5 abuts on the tip of the third front claw portion 490*c* in the attaching direction 44, and further rotation of the compatible lens 5 with respect to the teleconverter 3 in the removing direction is prevented.

Explanation of Erroneous Insertion State of Compatible Lens 5 with Respect to Teleconverter 3

An erroneous insertion state where the user tries to insert the compatible lens 5 into the teleconverter 3 at a wrong position without aligning the index of the compatible lens 5 and the index of the teleconverter 3 will be described next. In the erroneous insertion state, the lens-side claw portion 590 does not pass through the front through portion 480.

Figure 23:
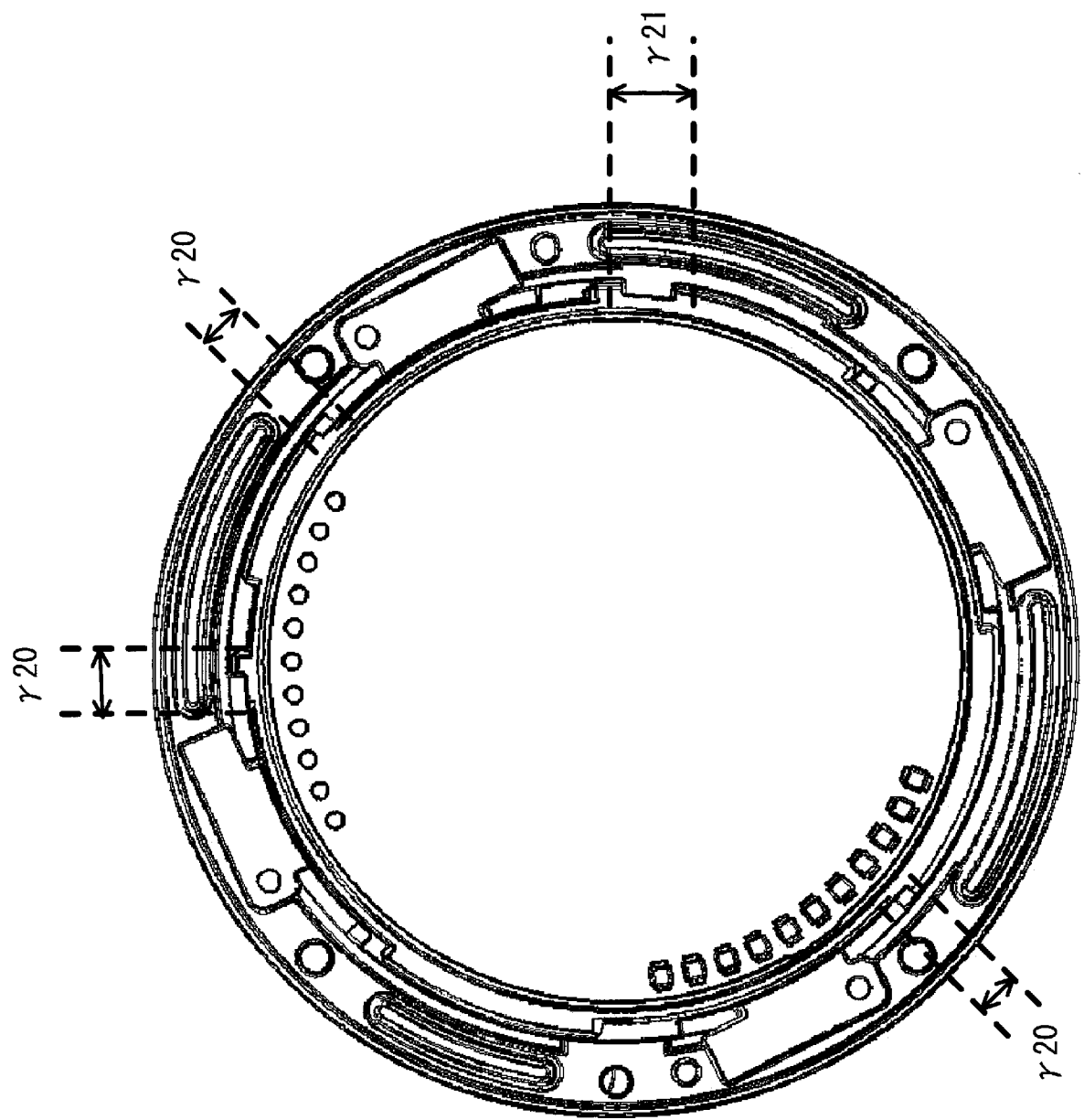
FIG. 23 is a view illustrating abutment positions between front claw portions or protrusions and lens-side claw portions in an erroneous insertion state, as seen from the image side.
Figure 24:
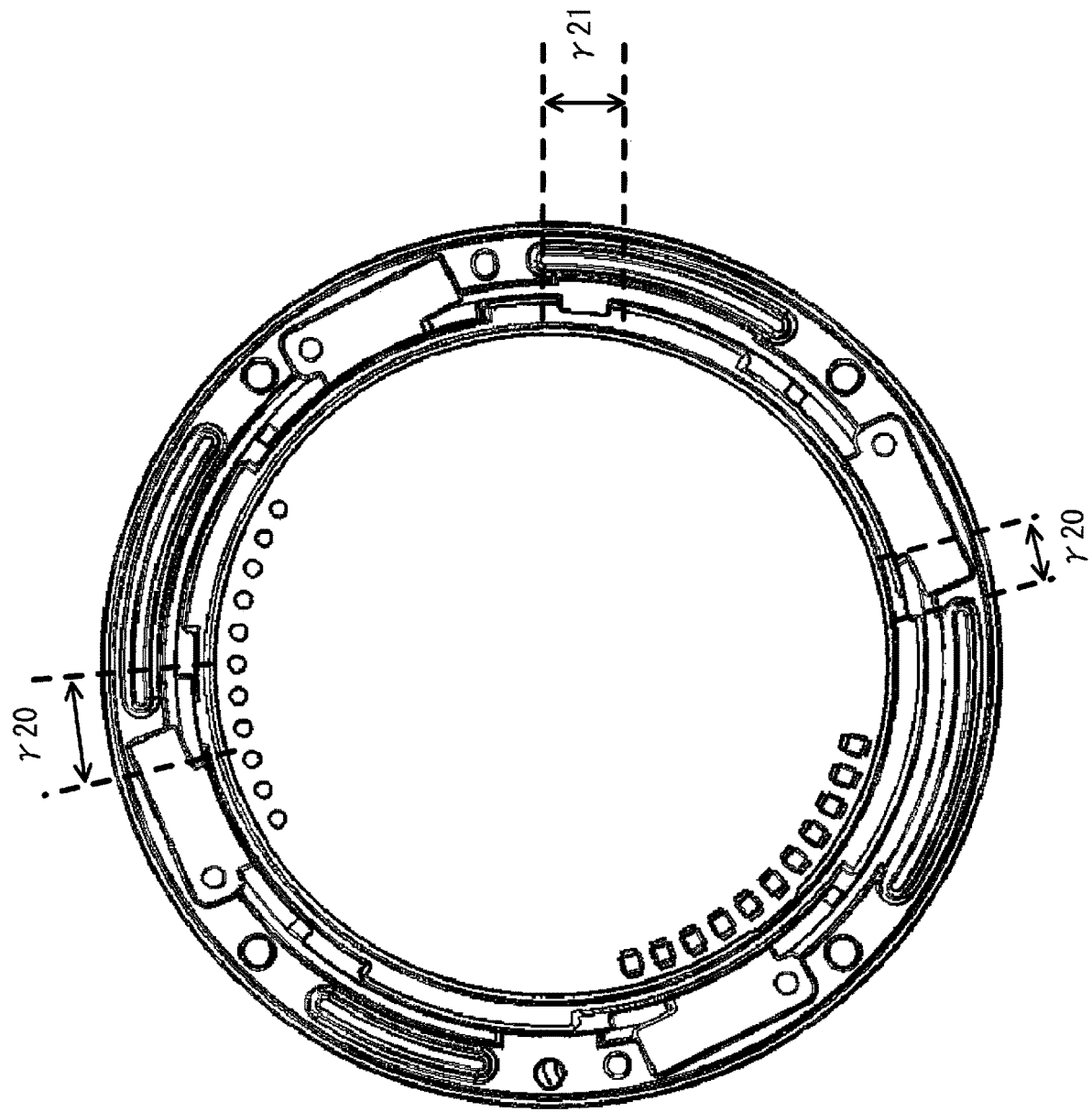
FIG. 24 is a view illustrating abutment positions between the front claw portions or protrusions and the lens-side claw portions in an erroneous insertion state, as seen from the image side.
Figure 25:
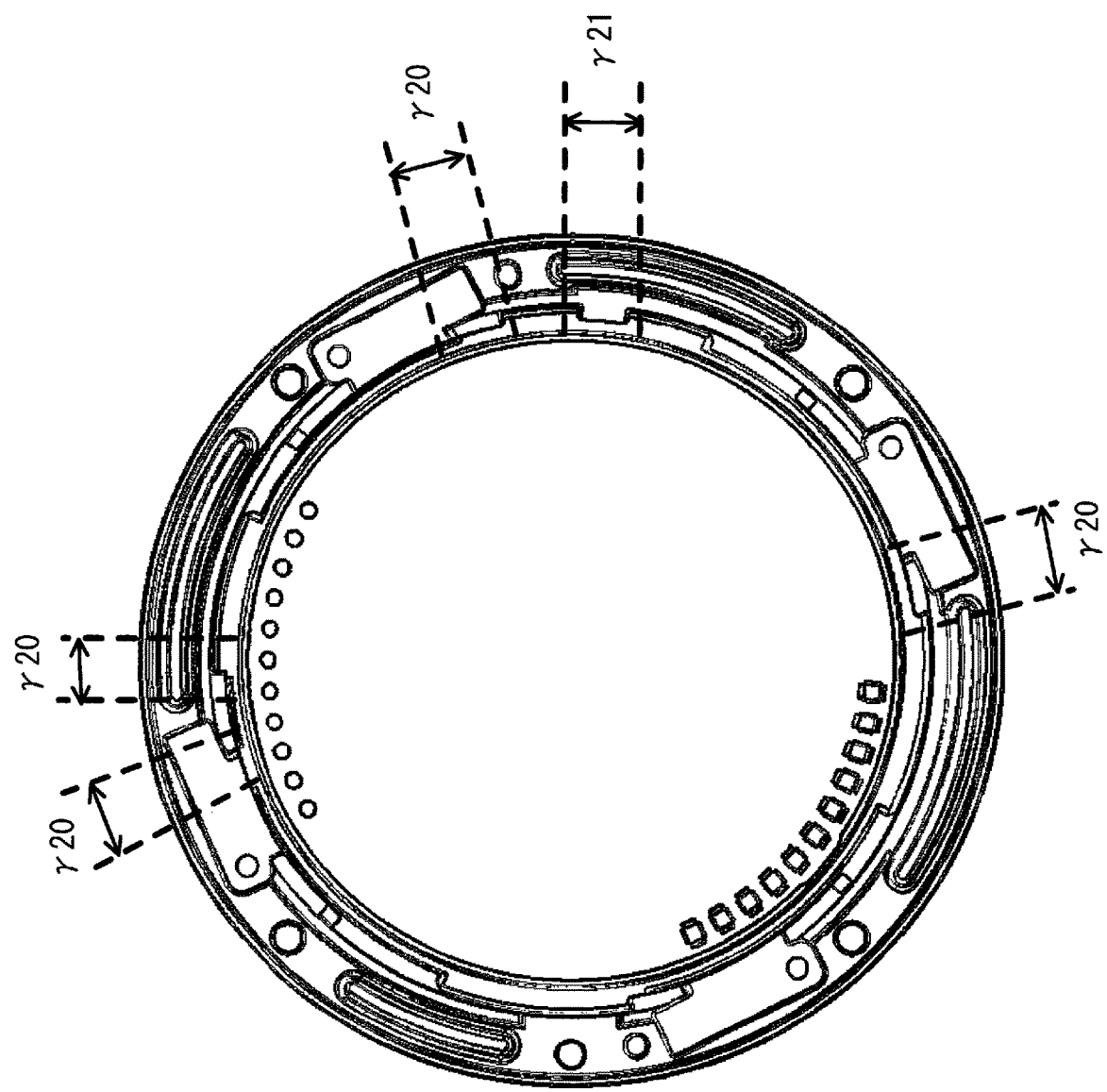
FIG. 25 is a view illustrating abutment positions between the front claw portions or protrusions and the lens-side claw portions in an erroneous insertion state, as seen from the image side.
Figure 26:
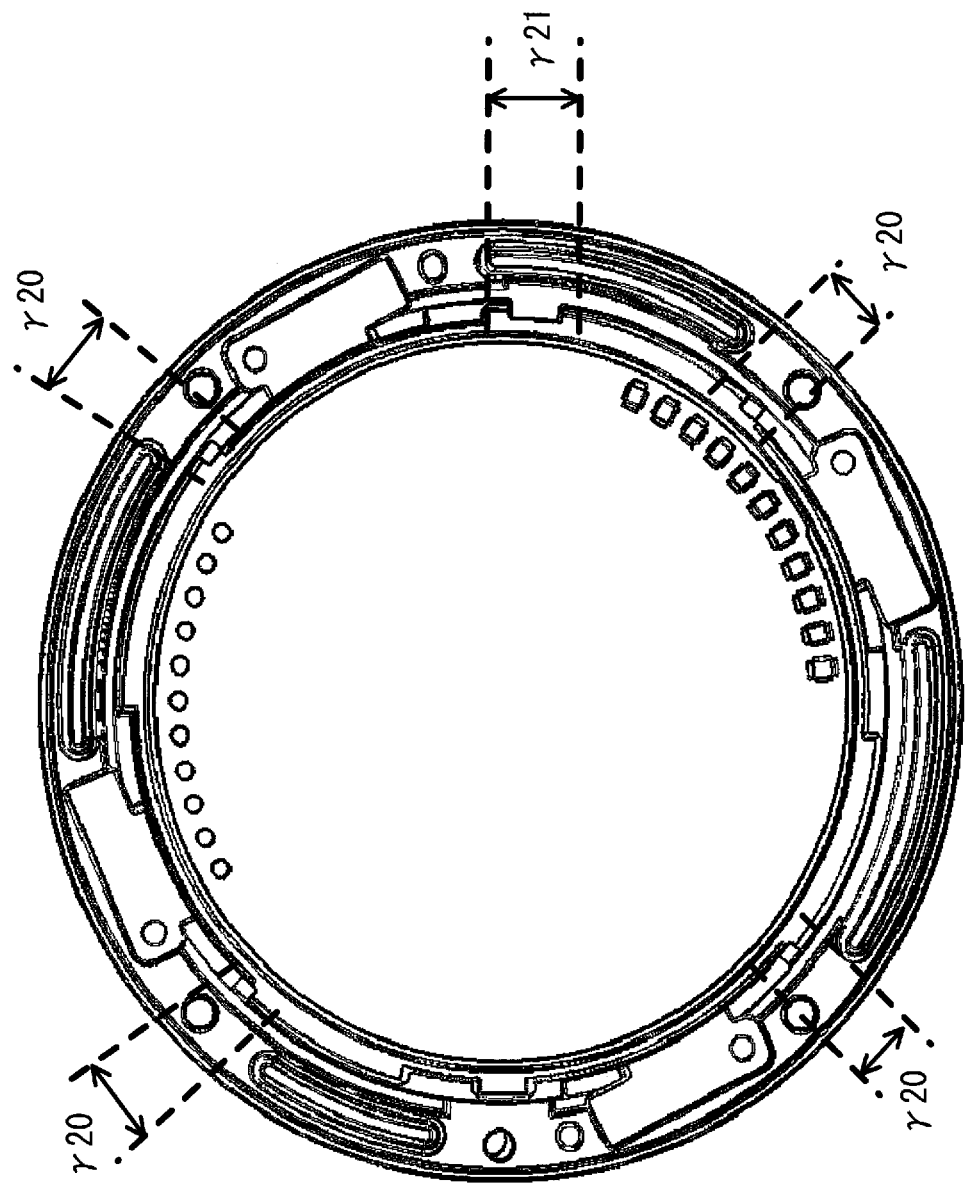
FIG. 26 is a view illustrating abutment positions between the front claw portions or protrusions and the lens-side claw portions in an erroneous insertion state, as seen from the image side.
Figure 27:
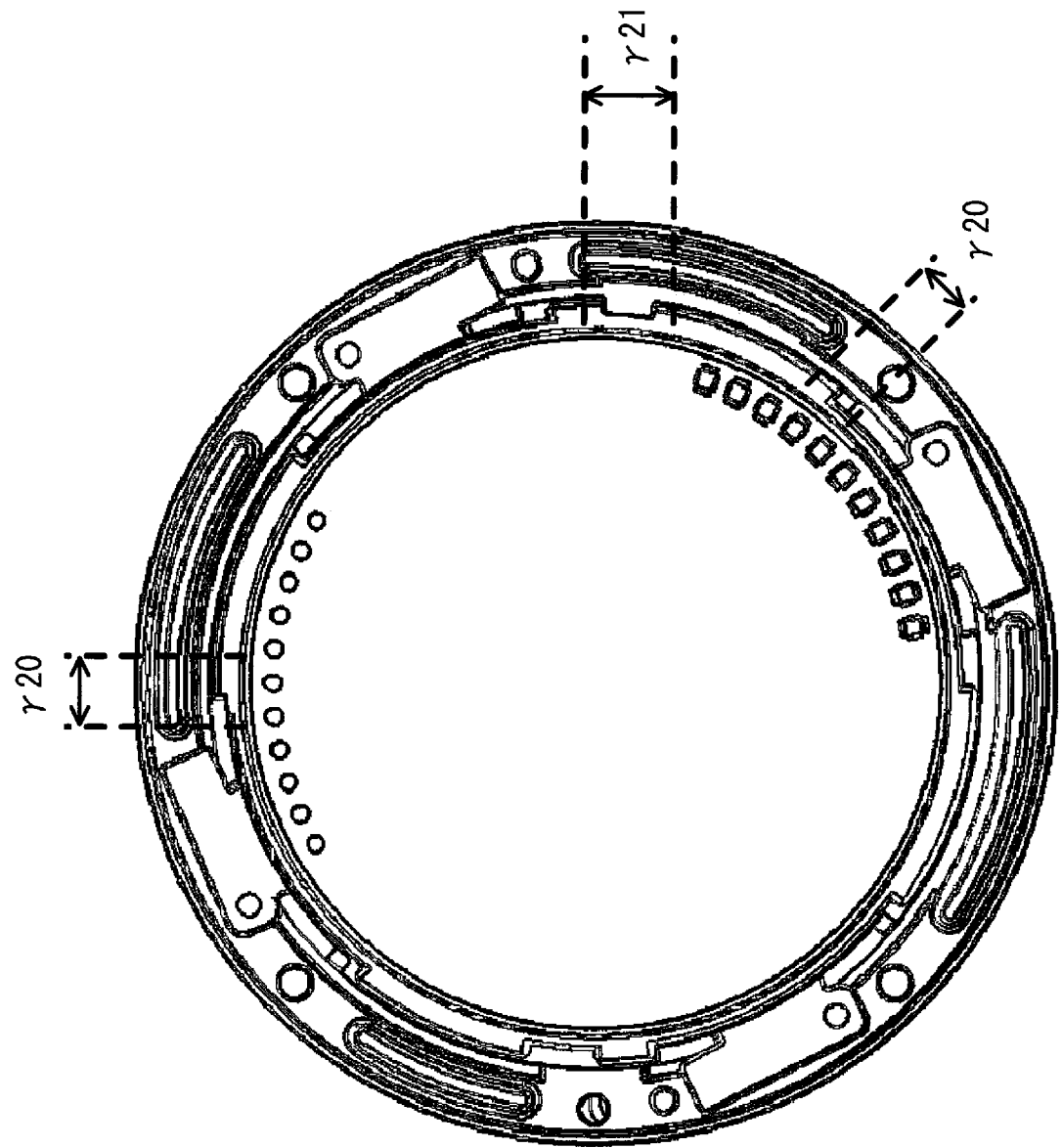
FIG. 27 is a view illustrating abutment positions between the front claw portions or protrusions and the lens-side claw portions in an erroneous insertion state, as seen from the image side.

FIG. 23 to FIG. 27 are views illustrating abutment positions between the front claw portion 490 or the protrusion 415 and the lens-side claw portion 590 in the erroneous insertion state, with dotted lines. FIG. 23 illustrates a state where the compatible lens 5 is displaced from the angle of the insertion position of FIG. 21 in a direction opposite to the attaching direction 44 by approximately 90 degrees (fifth erroneous insertion state). FIG. 24 illustrates a state where the compatible lens 5 is displaced from the fifth erroneous insertion state in a direction opposite to the attaching direction 44 by approximately 10 degrees (sixth erroneous insertion state). FIG. 25 illustrates a state where the compatible lens 5 is displaced from the sixth erroneous insertion state in a direction opposite to the attaching direction 44 by approximately 10 degrees (seventh erroneous insertion state). FIG. 26 illustrates a state where the compatible lens 5 is displaced from the seventh erroneous insertion state in a direction opposite to the attaching direction 44 by approximately 70 degrees (eighth erroneous insertion state). FIG. 27 illustrates a state where the compatible lens 5 is displaced from the eighth erroneous insertion state in a direction opposite to the attaching direction 44 by approximately 5 degrees (ninth erroneous insertion state). In the fifth to ninth erroneous insertion states, erroneous insertion is reliably prevented by the lens-side claw portion 590 abutting on the front claw portion 490 or the protrusion 415 at at least three positions ($\gamma20$, $\gamma21$). In the erroneous insertion states, because of the presence of the protrusion 415, the number of abutment positions of the lens-side claw portion 590 and the front claw portion 490 or the protrusion 415 is larger than the number of abutment positions of the rear claw portion 390 and the body-side claw portion 290.

As described above, in the erroneous insertion states, the lens-side claw portion 590 abuts on the front claw portion 490 at at least three positions. Thus, the lens-side claw portion 590 is prohibited from being inserted into the front through portion 480 at positions other than the insertion position. Therefore, even if it is tried to attach the compatible lens 5 to the teleconverter 3 at the erroneous insertion positions, erroneous insertion is reliably prevented by the claw portions abutting on each other at at least three positions.

Further, in the erroneous insertion states, one of the abutment positions is located on the subject side (−Z direction) and at the outer periphery side of the front terminal holding unit 420. That is, at the erroneous insertion positions, by one of the lens-side claw portions 590 abutting on at least one of a leading end portion of the first front claw portion 490a and a rear end portion of the second front claw portion 490b in the attaching direction 44, insertion of the lens-side claw portions 590 other than the second lens-side claw portion 590b into the second front through portion 480b is prevented to protect the front terminal holding unit 220. Further, while one of the lens-side claw portions 590 other than the second lens-side claw portion 590b abuts on the first front claw portion 490a in the erroneous insertion states, the length of the first front claw portion 490a in the circumferential direction is the longest among the four front claw portions 490 and the first front claw portion 490a has high rigidity. It is thus possible to lower a possibility that the first front claw portion 490a is broken upon erroneous insertion.

Further, in the erroneous insertion states, at least one of the abutment positions is located at a position opposite to the front terminal holding unit 420 in relation to the optical axis O. That is, one of the abutment positions is located above the sixth teleconverter-side line B6, and another one of the abutment positions is located below the sixth teleconverter-side line B6 which passes through the optical axis O. Therefore, while there are two or three abutment positions in the second to the fourth erroneous insertion states, the claw portions respectively abut above and below the sixth teleconverter-side line B6 which passes through the optical axis O. It is thus possible to lower a possibility of erroneous insertion. Furthermore, in the erroneous insertion states, a space between at least two of the abutment positions in the circumferential direction can be larger than approximately 120 degrees. Thus, upon an erroneous insertion, any of the lens-side claw portions 580 other than the second lens-side claw portion 590b do not tilt and go into the second front through portion 480b.

Further, in the erroneous insertion states, at one of the abutment positions the front claw portion abuts on the first lens-side claw portion 590a located at the outer periphery side of the lens-side terminal holding unit 520, so that the front claw portions 490 other than the first front claw portion 490a are prevented from being inserted and colliding with the lens-side terminal holding unit 520. Further, while the first lens-side claw portion 590a abuts on one of the front claw portions 490 in the erroneous insertion states, the length of the first lens-side claw portion 590a in the circumferential direction is the longest among the four lens-side claw portions 590 and the first lens-side claw portion 590a has relatively high rigidity. It is thus possible to lower a possibility that the first lens-side claw portion 590a is broken upon erroneous insertion.

Here, as illustrated in FIG. 21, the second lens-side claw portion 590b passes through the second front through portion 480b to be disposed at the insertion position, and then faces the second front claw portion 490b at the attachment position. The angle α15 (FIG. 12) of the second lens-side claw portion 590b is smaller than the angle β10 (FIG. 10) of the second front through portion 480b. The angle β10 of the second front through portion 480b is smaller than the first angle which is from the insertion position to the attachment position. Therefore, by making an angle of the second lens-side claw portion 590b smaller than the first angle, it is possible to make the second front through portion 480b smaller and prevent other lens-side claw portions 590 other than the second lens-side claw portion 590b from passing through the second front through portion 480b in the erroneous insertion states. Particularly, in the erroneous insertion states where the lens-side claw portion 590 and the front claw portion 490 abut on each other at three positions, it is possible to prevent the lens-side claw portions 590 other than the second lens-side claw portion 590b from passing through the second front through portion 480b. Because the front terminal holding unit 420 is disposed on an inner circumferential side of the second front through portion 490b, by the above-described other lens-side claw portions 590 being prevented from passing through, it is also possible to prevent the other lens-side claw portions 590 and the cylindrical portion 512 from colliding with the front terminal holding unit 420 and breaking the front terminals.

Method for Preventing Attachment of Non-Compatible Lens 6 to Teleconverter 3

A method for preventing attachment of the non-compatible lens 6 to the teleconverter 3 will be described next. The non-compatible mount 610 has substantially the same shape as the rear mount 310. Thus, when it is tried to insert the non-compatible lens 6 into the teleconverter 3 at the insertion position, the protrusion 415 abuts on the third lens-side claw of the non-compatible mount 610 to prevent the insertion.

Method for Attaching Compatible Lens 5 or Non-Compatible Lens 6 to Camera Body 2 and the Like Attachment of the compatible lens 5 or the non-compatible lens 6 to the camera body 2 is performed in the same manner as the attachment of the teleconverter 3 to the camera body 2. The compatible mount 510 or the non-compatible mount 610 is attached to the body-side mount 210. Since the body-side mount 210 has no protrusion 415, the third lens-side claw portion 590c and the fourth lens-side claw portion 590d of the compatible mount 510 can be inserted into the third body-side through portion 280c of the body-side mount 210. Further, when inserting the compatible mount 510 into the body-side mount 210, at the erroneous insertion positions, they abut on each other at at least two positions γ20 illustrated in FIG. 23 to FIG. 27 to prevent erroneous insertion.

According to the above-described embodiment, it is possible to properly attach the teleconverter 3, the compatible lens 5, and the non-compatible lens 6 to the camera body 2 in a usable manner. Particularly, once the teleconverter 3, the compatible lens 5, or the non-compatible lens 6 is attached to the camera body 2, the four claw portions 390, 590 are respectively pressed in the +Z direction from the flat springs 213 of the four body-side claw portions 290. That is, even in a case where the camera system 1 is subjected to impact, high impact resistance is provided because there are respectively four projecting portions (the rear claw portions 390, the lens-side claw portions 490, body-side claw portions 290).

Further, once the teleconverter 3, the compatible lens 5, or the non-compatible lens 6 is attached to the camera body 2, it is possible to perform communication, power supply, and control through respective terminals to properly use the camera system 1.

The four projecting portions of the teleconverter 3, the compatible lens 5, or the non-compatible lens 6 are disposed on lines intersecting with a line connecting the center of the contact holding unit and the optical axis O, at approximately 45 degrees on the optical axis O. The four projecting portions come into contact with four flat springs 213 disposed around the optical axis O at intervals of approximately 90 degrees to face the four projecting portions of the camera body 2. By this means, high impact resistance is provided both in a case where the camera system 1 is laterally held and in a case where the camera system 1 is longitudinally held. Particularly, even if one of the teleconverter 3, the compatible lens 5, the non-compatible lens 6, and the camera body 2 is subjected to impact in a vertical direction, the impact in the vertical direction can be received at two or more projecting portions because two projecting portions are disposed each on the right side and the left side of the lines (B1, L1, B5, L5) connecting the center of the contact holding unit and the optical axis O.

The second body-side claw portion 290b and the fourth body-side claw portion 290d are disposed on the third body-side line B3, and the first body-side claw portion 290a and the third body-side claw portion 290c are disposed on the fourth body-side line B4. Here, the angle $\alpha 4$ of the fourth body-side claw portion 290d is the third largest among the four body-side claw portions 290, and the angle $\alpha 2$ of the second body-side claw portion 290b is the smallest (the fourth largest) among the four body-side claw portions 290. The angle $\alpha 1$ of the first body-side claw portion 290a is the largest among the four body-side claw portions 290, and the angle $\alpha 3$ of the third body-side claw portion 290c is the second largest among the four body-side claw portions.

Therefore, in a case where one of the teleconverter 3, the compatible lens 5, the non-compatible lens 6, and the camera body 2 is subjected to impact in a vertical direction, force applied to combination of the two projecting portions on the upper side (the first body-side claw portion 290a and the second body-side claw portion 290b) becomes substantially equal to force applied to combination of the two projecting portions on the lower side (the fourth body-side claw portion 290d and the third body-side claw portion 290c). Also in a case where one of the teleconverter 3, the compatible lens 5, the non-compatible lens 6, and the camera body 2 is subjected to impact in a horizontal direction, force applied to combination of the two projecting portions on the left side (the third body-side claw portion 290c and the second body-side claw portion 290b) becomes substantially equal to force applied to combination of the two projecting portions on the right side (the first body-side claw portion 290a and the fourth body-side claw portion 290d).

The first rear claw portion 390a and the third rear claw portion 390c are disposed on the third teleconverter-side line L3, and the second rear claw portion 390b and the fourth rear claw portion 390d are disposed on the fourth teleconverter-side line L4. Here, the angle $\alpha 8$ of the fourth rear claw portion 390d is the third largest among the four rear claw portions 390, and the angle $\alpha 6$ of the second rear claw portion 390b is the smallest (the fourth largest) among the four rear claw portions 390. Further, the angle $\alpha 5$ of the first rear claw portion 390a is the second largest among the four rear claw portions, and the angle $\alpha 7$ of the third rear claw portion 390c is the largest among the four rear claw portions.

Therefore, in a case where one of the teleconverter 3, the compatible lens 5, the non-compatible lens 6, and the camera body 2 is subjected to impact in a vertical direction, force applied to combination of the two projecting portions on the upper side (the first rear claw portion 390a and the second rear claw portion 390b) becomes substantially equal to force applied to combination of the two projecting portions on the lower side (the fourth rear claw portion 390d and the third rear claw portion 390c). Also in a case where one of the teleconverter 3, the compatible lens 5, the non-compatible lens 6, and the camera body 2 is subjected to impact in a horizontal direction, force applied to combination of the two projecting portions on the left side (the third rear claw portion 390c and the second rear claw portion 390b) becomes substantially equal to force applied to combination of the two projecting portions on the right side (the first rear claw portion 390a and the fourth rear claw portion 390d).

Further, in the present embodiment, the angle of the third rear claw portion 390c is larger between the first rear claw portion 390a and the third rear claw portion 390c disposed on the third teleconverter-side line L3, and the angle of the fourth rear claw portion 390d is larger between the second rear claw portion 390b and the fourth rear claw portion 390d disposed on the fourth teleconverter-side line L4. That is, the two rear claw portions 390 on the lower side of the second teleconverter-side line L2 (extending in a horizontal direction) are larger among the two rear claw portions 390 facing across the optical axis O. Therefore, it is possible to receive impact, to which the teleconverter 3 is subjected from a lower direction when the camera system is laterally held, with a large area of the two rear claw portions 390 which have the large angle range and are located below the second teleconverter-side line L2. Further, in a case where the teleconverter 3 is subjected to impact from a lower direction when the camera system 1 is laterally held, the impact acts on the rear claw portions 390 on the lower side of the second teleconverter-side line L2 in a direction (−Z direction) toward the body-side claw portion 290. Here, the flat spring 213 presses the rear claw portion 390 in a direction (+Z direction) away from the body-side claw portion 290. Therefore, even if teleconverter 3 is subjected to impact from a lower direction in a state where the camera system 1 is laterally held, high impact resistance is provided because the rear claw portions 390 on the lower side of the second teleconverter-side line L2 can absorb impact with a large area and also with urging force of the flat springs 213 of the corresponding body-side claw portions 290 facing the rear claw portions 390.

The body-side terminal holding unit 220 is disposed above the image sensor 270 in a state where the compatible lens 5 or the like is attached to the camera body 2. Because sunlight entering the compatible lens 5 or the like is incident on a lower side at an exit side of the compatible lens 5 or the like when the camera system 1 is laterally held, ghost is likely to occur on the lower side of the image sensor 270. In the present embodiment, it is possible to suppress ghost by disposing the body-side terminal holding unit 220 not below but above the image sensor 270.

The four flat springs 213 are disposed around the optical axis O at intervals of approximately 90 degrees. Therefore, at least two flat springs 213, which face each other across the optical axis O, among the four flat springs 213 come into contact with two projecting portions, and the two projecting portions are pressed in the +Z direction. In the present embodiment, the teleconverter 3, the compatible lens 5, or the non-compatible lens 6 includes at least four projecting portions. However, even in a case where one of the four projecting portions is broken, at least two projecting portions are disposed at positions facing each other across the optical axis O. The projecting portions are thus pressed by two flat springs 213 disposed at positions facing each other across the optical axis O. Therefore, it is possible to provide the camera system 1 in which the teleconverter 3, the compatible lens 5, or the non-compatible lens 6 can be attached to the camera body 2 in a usable manner even if a projecting portion is broken.

Further, since the flat spring 213 is located on the line B10 (FIG. 5), the lens-side terminals near the line B10 can be strongly pressed against the body-side terminals.

The screws 313, 513 are disposed at the outer periphery of the rear end side in the attaching direction 44 of the claw portion. Further, at least a part of the screws 313, 513 is disposed on the outer periphery of the claw portion. In the present embodiment, even if external force is applied upon attachment, the four claw portions together receive the external force. Furthermore, at least a part of the screws 313, 513 is disposed on the outer periphery side of the claw portion. Thus, when external force is transmitted among the rear mount 310, the compatible mount 510 and a fixing member 5101 in the compatible lens 5, the external force is transmitted through four claw portions and four screws 313 and 513 to prevent concentration of the external force at a specific position. Since concentration of the external force can be prevented, the fixing members 3101, 5101 can be firmly fixed with the rear mount 310 and the compatible mount 510. If inner diameters of the rear mount 310 and the compatible mount 510 are larger, it is necessary to proportionally increase diameters of the reference surfaces 311, 511 and projecting amounts of the claw portions. According to the present embodiment, however, the four claw portions and the four screws 313, 513 can receive external force. Thus, according to the present embodiment, even if the inner diameters of the rear mount 310 and the compatible mount 510 are larger, it is not necessary to proportionally enlarge the diameters of the reference surfaces 311, 511 and the projecting amount of the claw portions, which can avoid increase in sizes of the compatible lens 5, the non-compatible lens 6, the camera body 2, and the teleconverter 3.

The following modifications are also possible, and one or more modifications may be combined with the above-described embodiment.

First Modification

Figure 28:
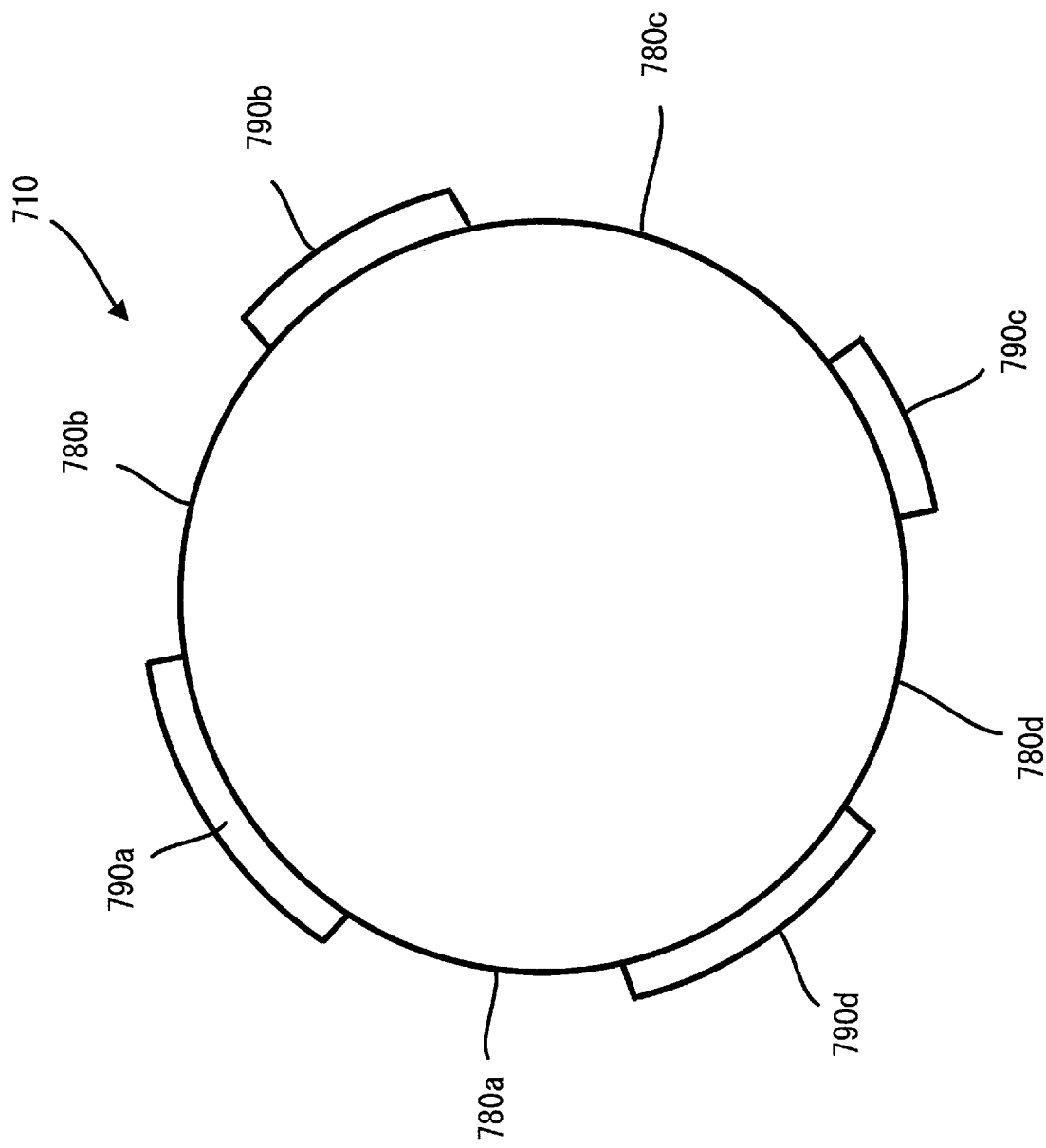
FIG. 28 is a schematic view for explaining a compatible mount of a first modification.

The smallest claw portion of the compatible mount 510 may be omitted. As illustrated in FIG. 28, a second mount 710 which does not have the fifth lens-side claw portion 590e as in the compatible mount 510 includes a first lens-side claw portion 790a to a fourth lens-side claw portion 790d and a first lens-side through portion 780a to a fourth lens-side through portion 780d. The first lens-side claw portion 790a to the fourth lens-side claw portion 790d are substantially equivalent to the first lens-side claw portion 590a, the second lens-side claw portion 590b, the fourth lens-side claw portion 590d, and the fifth lens-side claw portion 590e of the compatible mount 510, respectively. The first lens-side through portion 780a, the second lens-side through portion 780b, and the fourth lens-side through portion 780d are substantially equivalent to the first lens-side through portion 580a, the second lens-side through portion 580b, and the fifth lens-side through portion 580e of the compatible mount 510, respectively. The length of the third lens-side through portion 780c in the circumferential direction is equal to a sum of the lengths of the third lens-side through portion 580c, the third lens-side claw portion 590c, and the fourth lens-side through portion 580d of the compatible mount 510 in the circumferential direction. The second mount 710 can be attached to both the camera body 2 and the teleconverter 3. Further, in a state where the second mount 710 is attached to the camera body 2 or the teleconverter 3, at least a part of the first lens-side claw portion 790a to the fourth lens-side claw portion 790d is urged by the flat springs 213, 413 to stabilize the attachment.

Second Modification

Figure 29:
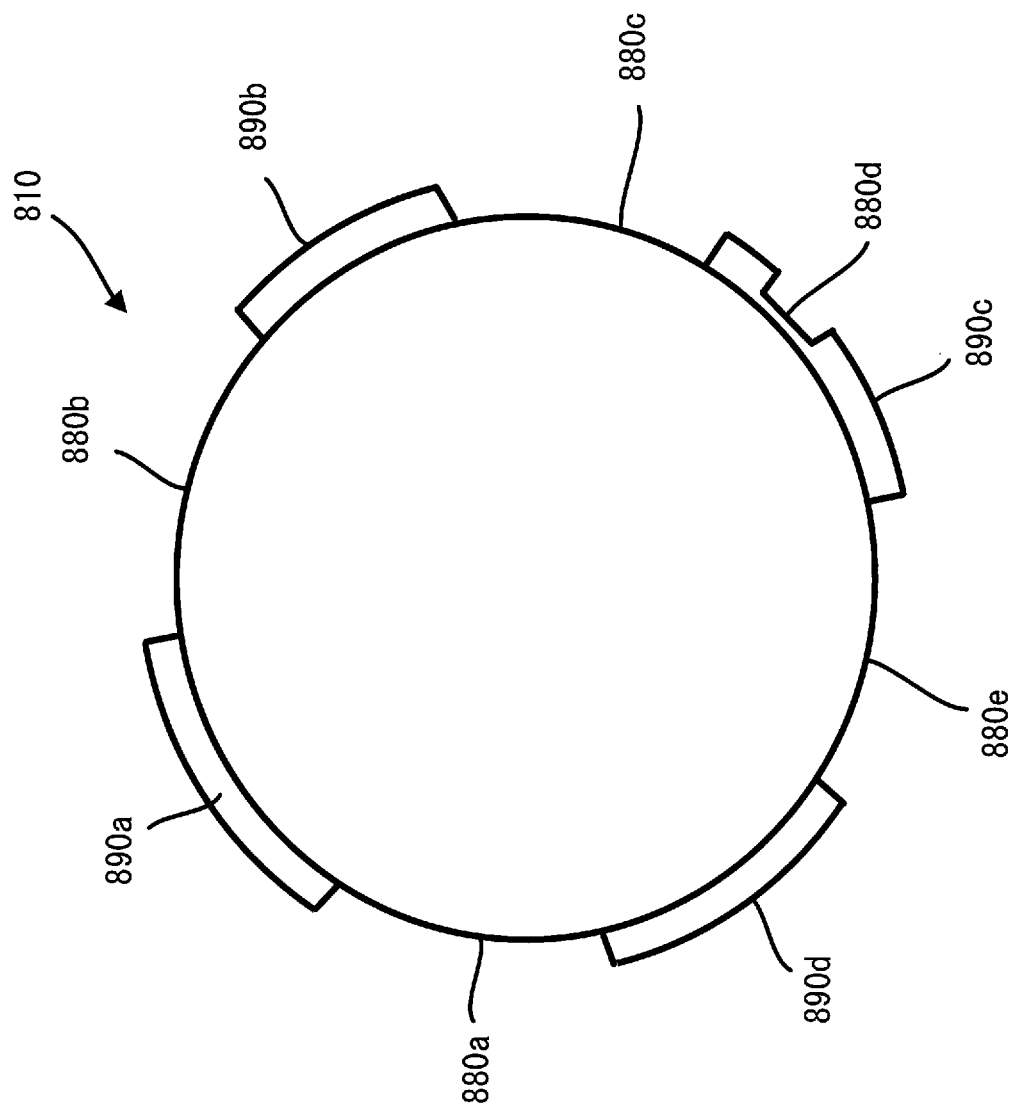
FIG. 29 is a schematic view for explaining a compatible mount of a second modification.

The fourth lens-side through portion 580d of the compatible mount 510 can be changed as appropriate, as long as it has a shape that allows the protrusion 415 to pass therethrough. As illustrated in FIG. 29, a third mount 810 includes a first lens-side claw portion 890a to a fourth lens-side claw portion 890d and a first lens-side through portion 880a to a fifth lens-side through portion 880e. The first lens-side claw portion 890a, the second lens-side claw portion 890b, and the fifth lens-side claw portion 890e are substantially equivalent to the first lens-side claw portion 590a, the second lens-side claw portion 590b, and the fifth lens-side claw portion 590e of the compatible mount 510, respectively. The first lens-side through portion 880a to the third lens-side through portion 880c and the fifth lens-side through portion 880e are substantially equivalent to the first lens-side through portion 580a to the third lens-side through portion 580c and the fifth lens-side through portion 580e of the compatible mount 510, respectively. The third lens-side claw portion 890c is the third lens-side claw portion 590c and the fourth lens-side claw portion 590d of the compatible mount 510 being connected along the cylindrical portion 512. The fourth lens-side through portion 880d has a shape that allows the protrusion 415 to pass therethrough. The third mount 810 can be attached to both the camera body 2 and the teleconverter 3. Further, in a state where the third mount 810 is attached to the camera body 2 or the teleconverter 3, at least a part of the first lens-side claw portion 890a to the fourth lens-side claw portion 890d is urged by the flat springs 213, 413 to stabilize the attachment.

Third Modification

Figure 30:
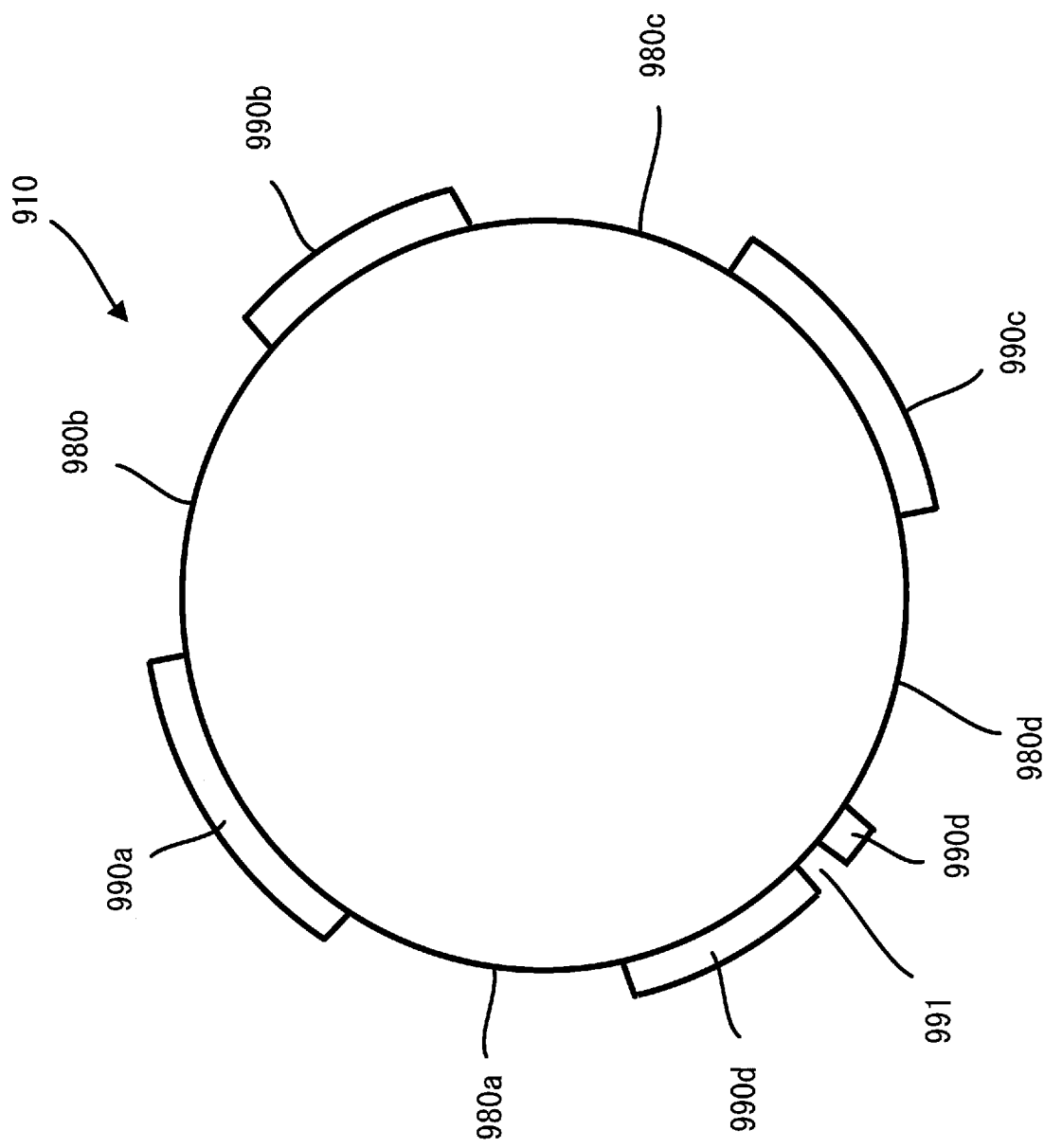
FIG. 30 is a schematic view for explaining a compatible mount of a third modification.

A part of the claw portions 590, 390 of the compatible mount 510 or the rear mount 310 may be cut out. Although there is no particular limitation on shape and position of the cutout, the cutout is preferably provided at a position where no urging force is applied by the flat springs 213, 413 upon attachment. As illustrated in FIG. 30, a fourth mount 910 includes a first lens-side claw portion 990a to a fourth lens-side claw portion 990d, a first lens-side through portion 980a to a fourth lens-side through portion 980d, and a cutout 991. The first lens-side claw portion 990a to the third lens-side claw portion 990c are substantially equivalent to the first rear claw portion 390a to the third rear claw portion 390c of the rear mount 310, respectively. The first lens-side through portion 980a to the fourth lens-side through portion 980d are substantially equivalent to the first rear through portion 380a to the fourth rear through portion 380d of the rear mount 310, respectively. The fourth lens-side claw portion 990d is provided with the cutout 991 from the inner circumference toward the outer circumference. The length of the fourth lens-side claw portion 990d in the circumferential direction is substantially equivalent to the length of the fourth rear claw portion 390d of the rear mount 310 in the circumferential direction. In a state where the fourth mount 910 is attached to the camera body 2, at least a part of the first lens-side claw portion 990a to the fourth lens-side claw portion 990d is urged by the flat springs 213 to stabilize the attachment. Further, the cutout 991 does not receive urging force from the flat spring 213. That is, while one part of the fourth lens-side claw portion 990d in the circumference direction receives urging force from the flat spring 213, the other part of the fourth lens-side claw portion 990d in the circumference direction does not receive urging force from the flat spring 213. Here, the fourth lens-side claw portion 990d is divided by the cutout 991 into two parts in the circumferential direction; however, in a state where the fourth mount 910 is attached to the camera body 2, regions on both sides of the cutout 991 of the fourth lens-side claw portion 990d in the circumferential direction face the fourth body-side claw portion 290d or the fourth front claw portion 490d. In this manner, a region or regions facing one body-side claw portion in the attached state will be referred to as one lens-side claw portion.

Note that the cutout 991 may be provided to divide the claw portion into two or more parts in the circumferential direction, the cutout 991 may be provided to remove a part of the claw portion, or the cutout 991 may be provided so that a length of at least a part of the claw portion in a radial direction becomes short. Further, a part of the claw portion on the lines (the lines L3, L4, L7, L8) intersecting a line passing through the optical axis O and the center of the terminal holding unit at 45 degrees may be cut out.

Fourth Modification

Although the explanation was given that the rear mount 310 is substantially equivalent to the non-compatible mount 610, the rear mount 310 may be substantially equivalent to the compatible mount 510. A teleconverter having the rear mount 310 that is substantially equivalent to the compatible mount 510 can be attached to both the camera body 2 and the teleconverter 3.

Fifth Modification

It is also possible to employ a configuration where one of the four lens-side claw portions 590 is removed, and three lens-side claw portions are provided. Because the flat springs 213 of the camera body 2 are disposed around the optical axis O at intervals of 90 degrees even if there are three lens-side claw portions, attachment in a usable manner can be achieved by the lens-side claw portions being pressed from at least three flat springs 213.

It is also possible to employ a configuration where two lens-side claw portions 590 which faces each other across the optical axis O are removed among the four lens-side claw portions 590, and two lens-side claw portions which face each other across the optical axis O are provided. Even if there are two lens-side claw portions, because the lens-side claw portions are disposed to face each other across the optical axis O and the flat springs of the camera body 2 are disposed around the optical axis at intervals of 90 degrees, attachment in a usable manner can be achieved by the lens-side claw portions being pressed from at least the flat springs 213 facing each other across the optical axis O. Note that, in a case where a configuration is employed where two lens-side claw portions facing each other across the optical axis O are provided, it is preferable that one of the two lens-side claw portions is disposed at a position close to the center of the lens-side terminal holding unit 520. By the lens-side claw portion being disposed at a position close to the center of the lens-side terminal holding unit 520 and brought into contact with the flat spring 213, it is possible to properly use the camera system 1 while bringing the lens-side terminals into contact with the body-side terminals.

A material of the compatible mount 510 is not particularly limited, and may be a metal or a resin. Further, an end portion of the compatible mount 510 (such as an end portion of an outer periphery side of the lens-side claw portion 590, an end portion of the lens-side claw portion 590 in a circumferential direction, and an end portion of the cylindrical portion 512 in the optical axis O direction) may be formed such that at least part is sloped. An end portion of the compatible mount 510 does not have to be sloped and may be partially stepped.

A shape of the lens-side terminal holding unit 520 is not particularly limited, and can be changed as appropriate. Particularly, by causing the end portion of the lens-side terminal holding unit 520 in the circumferential direction to be sloped, it is possible to smoothly bring the lens-side terminal holding unit 520 into contact with the body-side terminal holding unit 220 in rotating from the insertion position to the attachment position. Further, while the lens-side terminal holding unit 520 includes a plurality of lens-side terminals disposed in an arc shape, the positions of the lens-side terminals may be displaced as long as the lens-side terminals come into contact with the body-side terminals once the teleconverter 3 is attached to the camera body 2.

A central position and a length of the lens-side claw portion 590 in the circumferential direction can be changed as appropriate, as long as the lens-side claw portion 590 can be pressed from the flat spring 213 at the attachment position. The central position of the lens-side claw portion 590 in the circumferential direction and the central position of the urged portion in the circumferential direction may be located at different positions. That is, a position where the lens-side claw portion 590 is pressed from the central position of the flat spring 213 in the circumferential direction may be different from the central position of the lens-side claw portion 590 in the circumferential direction. In a similar manner, the central position of the lens-side claw portion 590 in the circumferential direction does not have to coincide with the central position of the body-side claw portion 290 in the circumferential direction at the attachment position. Further, the length of the lens-side claw portion 590 in the circumferential direction does not have to be the same as the length of the corresponding body-side claw portion 290 in the circumferential direction.

The rear claw portion 390 or the lens-side claw portions 590 other than the third lens-side claw portion 590c includes an urged portion as a contact portion which is urged in a direction away from the body-side claw portion 290 or from the front claw portion 490 by being brought into contact with the flat springs 213, 413. The urged portion may have any shape as long as the rear claw portion 390 or the lens-side claw portions 590 can receive sufficient urging force from the flat springs 213, 413, and contact between the flat springs 213, 413 and the urged portion may be one of point contact, line contact and surface contact. The flat springs 213, 413 may have any shape and material as long as the flat springs 213, 413 can sufficiently press the claw portions which face the flat springs 213, 413, and the shape and the material can be changed as appropriate. Further, it is only required that one or two flat springs 213, 413 and the corresponding claw portion(s) face each other at least upon completion of attachment, and it is not necessary that they contact each other at all time. For example, when the camera system 1 is subjected to external force, the flat springs 213, 413 and the claw portions may be brought in a non-contact state. Urging force received by the claw portions from the flat springs 213, 413 does not have to be constant all the time and may vary according to the external force to which the camera system 1 is subjected.

Note that lengths of the claw portions facing each other upon attachment in the circumferential direction are not necessarily the same. The lengths of the rear claw portion 390 or the lens-side claw portions 590 other than the third lens-side claw portion 590c in the circumferential direction can be changed as long as the flat spring 213 can press the claw portions. Additionally, the entire surface of one claw portion does not necessarily face the entire surface of the corresponding claw portion upon attachment, and a position of an end portion of the one claw portion in the circumferential direction may be different from a position of an end portion of the corresponding claw portion in the circumferential direction.

Further, lengths of the claw portion and the corresponding through portion in the circumferential direction are not necessarily substantially the same. The length of the claw portion to be inserted may be equal to or lower than the length of the through portion in the circumferential direction.

Further, a length of the first rear claw portion 390a in the circumferential direction may be changed as long as the first rear claw portion 390a passes through the corresponding first body-side through portion 280a upon insertion. The same applies to the second rear claw portion 390b, the third rear claw portion 390c, and the fourth rear claw portion 390d.

Still further, a thickness of the cylindrical portion 312 in the radial direction can be changed as appropriate, and it is also possible to employ a shape in which at least part projects inwardly from the cylindrical portion 312 of the present embodiment.

Note that in the present embodiment, the teleconverter 3 has been described as an intermediate accessory by way of example; however, the intermediate accessory may be an adapter, a closeup ring, or the like.

While various embodiments and modifications have been described above, the present invention is not limited to these contents. Other aspects which can be considered within a scope of the technical idea of the present invention are incorporated into the scope of the present invention.

REFERENCE SIGNS LIST

1 . . . camera system, 2 . . . camera body, 3 . . . teleconverter, 5 . . . compatible lens, 6 . . . non-compatible lens, 44 . . . attaching direction, 210 . . . body-side mount, 211, 311, 411, 511 . . . reference surface, 212, 412 . . . opening, 213, 413 . . . flat spring, 220 . . . body-side terminal holding unit, 270 . . . image sensor, 280 . . . body-side through portion, 290 . . . body-side claw portion, 310 . . . rear mount, 311 . . . reference surface, 312, 512 . . . cylindrical portion, 320 . . . rear terminal holding unit, 370 . . . lens, 380 . . . rear through portion, 390 . . . rear claw portion, 410 . . . front mount, 415 . . . protrusion, 420 . . . front terminal holding unit, 480 . . . front through portion, 490 . . . front claw portion, 510 . . . compatible mount, 520 . . . lens-side terminal holding unit, 560, 660 . . . imaging optical system, 580 . . . lens-side through portion, 590 . . . lens-side claw portion, B1-B4 body-side reference line (first to fourth lines), B5-B8 teleconverter-side reference line, B10 . . . line, L1-L4 teleconverter-side reference line (first to fourth lines), L5-L8 lens-side reference line, O . . . optical axis

The invention claimed is:

1. An interchangeable lens removably attachable to a camera body that includes:
   an image sensor onto which a subject light is incident;
   a body-side terminal group disposed in an arc shape outside the image sensor;
   a body-side mount having a ring shape disposed outside the body-side terminal group;
   a plurality of body-side projecting portions each projecting inwardly from the body-side mount; and
   a plurality of elastic members respectively disposed at an image side of the plurality of body-side projecting portions, the interchangeable lens comprising:
   a lens-side mount that is configured to contact with the body-side mount with the interchangeable lens being attached to the camera body;
   a cylindrical portion extending from an inner peripheral edge of the lens-side mount in an optical axis direction of the subject light;
   a lens-side terminal group that is disposed inside the cylindrical portion and is configured to contact with the body-side terminal group with the interchangeable lens being attached to the camera body;
   a first lens-side projecting portion disposed at an outer periphery side of the lens-side terminal group, the first lens-side projecting portion projecting outwardly from the cylindrical portion and extending in a circumferential direction of the cylindrical portion;
   a second lens-side projecting portion; and
   a third lens-side projecting portion at least partly disposed at a position facing the first lens-side projecting portion across the optical axis, the third lens-side projecting portion projecting outwardly from the cylindrical portion and extending in the circumferential direction; and
   a cutout provided at the third lens-side projecting portion in the circumferential direction.

2. The interchangeable lens according to claim 1, wherein:
   a region at one end in the circumferential direction from the cutout in the third lens-side projecting portion does not face any of the elastic members with the interchangeable lens being attached to the camera body; and
   a region at another end in the circumferential direction from the cutout in the third lens-side projecting portion faces one of the elastic members with the interchangeable lens being attached to the camera body.

3. The interchangeable lens according to claim 1, wherein:
   the interchangeable lens removably attachable to an intermediate accessory, the intermediate accessory comprising:
   a cylindrical tube portion that allows the subject light to pass therethrough;
   an accessory-side terminal group disposed in an arc shape at an inner periphery of the tube portion;
   an accessory-side mount having a ring shape disposed at an outer periphery side of the tube portion;
   a plurality of accessory-side projecting portions each projecting inwardly from the accessory-side mount; and a plurality of accessory elastic members each disposed at an image side of a part of the plurality of accessory-side projecting portions; and the cutout does not contact with any of the accessory-side projecting portions when the interchangeable lens is attached to the intermediate accessory.

4. The interchangeable lens according to claim 1, wherein:

when the third lens-side projecting portion faces a first region at an outer periphery of the body-side terminal group where none of the plurality of body-side projecting portions is disposed, the region at one end in the circumferential direction from the cutout abuts on a body-side projecting portion among the plurality of body-side projecting portions adjacent to one end of the first region, and the region on another end in the circumferential direction from the cutout abuts on a body-side projecting portion among the plurality of body-side projecting portions adjacent to another end of the first region.

5. An interchangeable lens removably attachable to a camera body that includes:

an image sensor onto which a subject light is incident;

a body-side terminal group disposed in an arc shape outside the image sensor;

a body-side mount having a ring shape disposed outside the body-side terminal group;

a plurality of body-side projecting portions each projecting inwardly from the body-side mount; and a plurality of elastic members respectively disposed at an image side of the plurality of body-side projecting portions, the interchangeable lens comprising:

a lens-side mount that is configured to contact with the body-side mount with the interchangeable lens being attached to the camera body;

a cylindrical portion extending from an inner peripheral edge of the lens-side mount in an optical axis direction of the subject light; and a plurality of lens-side projecting portions (i) projecting outwardly from the cylindrical portion, (ii) extending in the circumferential direction of the cylindrical portion, and (iii) comprising first, second, third, fourth, and fifth lens-side projecting portions, wherein:

of the plurality of lens-side projecting portions:

the fifth lens-side projecting portion has a fifth longest length in the circumferential direction; and the fourth lens-side projecting portion has a fourth longest length in the circumferential direction; and the first lens-side projecting portion is disposed at a position facing at least a part of the fifth lens-side projecting portion and at least a part of the fourth lens-side projecting portion across the optical axis.

6. The interchangeable lens according to claim 5, wherein:

a region between the fourth lens-side projecting portion and the fifth lens-side projecting portion in the circumferential direction is a shortest region among a plurality of regions in which the plurality of lens-side projecting portions is not provided in the circumferential direction of the cylindrical portion.

7. The interchangeable lens according to claim 5, wherein:

a longest region among a plurality of regions in which the plurality of lens-side projecting portions is not provided in the circumferential direction of the cylindrical portion, and the first lens-side projecting portion are sequentially disposed in the circumferential direction.

8. An interchangeable lens removably attachable to a camera body that includes:

an image sensor onto which a subject light is incident;

a body-side terminal group disposed in an arc shape outside the image sensor;

a body-side mount having a ring shape disposed outside the body-side terminal group;

a plurality of body-side projecting portions each projecting inwardly from the body-side mount; and a plurality of elastic members respectively disposed at an image side of the plurality of body-side projecting portions, the interchangeable lens comprising:

a lens-side mount that is configured to contact with the body-side mount;

a cylindrical portion extending from an inner peripheral edge of the lens-side mount in an optical axis direction of the subject light; a lens-side terminal group that is disposed inside the cylindrical portion and is configured to contact with the body-side terminal group when attached to the camera body; and a plurality of lens-side projecting portions (i) projecting outwardly from the cylindrical portion, (ii) extending in a circumferential direction of the cylindrical portion, and (iii) comprising first, second, third, and fourth lens-side projecting portions, wherein:

of the plurality of lens-side projecting portions:

the first lens-side projecting portion is disposed at an outer circumference side of the lens-side terminal group, the first lens-side projecting portion having a longest length in the circumferential direction among the plurality of lens-side projecting portions; and the fourth lens-side projecting portion is disposed at a position facing the first lens-side projecting portion across the optical axis, the fourth lens-side projecting portion having a fourth longest length in the circumferential direction among the plurality of lens-side projecting portions.

9. The interchangeable lens according to claim 8, wherein:

the second lens-side projecting portion is provided between the first lens-side projecting portion and the fourth lens-side projecting portion in the circumferential direction, the second lens-side projecting portion having a second longest length in the circumferential direction among the plurality of lens-side projecting portions.

10. The interchangeable lens according to claim 8, wherein:

a plurality of regions in which the plurality of lens-side projecting portions is not provided in the circumferential direction of the cylindrical portion have different lengths in the circumferential direction from one another.

11. An interchangeable lens removably attachable to a camera body that includes:

an image sensor onto which a subject light is incident;

a body-side terminal group disposed in an arc shape outside the image sensor;

a body-side mount having a ring shape disposed outside the body-side terminal group;

a plurality of body-side projecting portions each projecting inwardly from the body-side mount; and four elastic members respectively disposed at an image side of the plurality of body-side projecting portions, the interchangeable lens comprising:

a lens-side mount that is configured to contact with the body-side mount;

a fixing member to which the lens-side mount is fixed, the fixing member being disposed in a direction orthogonal to an optical axis of the subject light;

a cylindrical portion extending from an inner peripheral edge of the lens-side mount in the optical axis direction;

a lens-side terminal group that is disposed inside the cylindrical portion and is configured to contact with the body-side terminal group when attached to the camera body; and a plurality of lens-side projecting portions projecting outwardly from the cylindrical portion and extending in a circumferential direction of the cylindrical portion, wherein:

the plurality of lens-side projecting portions include four facing portions that face the four elastic members when the interchangeable lens is attached to the camera body;

the lens-side mount is fixed to the fixing member with at least four screws; and the four screws are respectively disposed at an outer periphery side of the four facing portions and at one side of the four facing portions in the circumferential direction.

12. The interchangeable lens according to claim 11, wherein:

at least two of the four screws are respectively disposed at outer periphery side of two of the plurality of lens-side projecting portions.

13. The interchangeable lens according to claim 11, wherein:

the four screws are disposed at positions of approximately 45 degrees from a line passing through the optical axis and a center between one terminal arranged at one end of the lens terminal group in the circumferential direction and another terminal arranged at another end of the lens terminal group.

14. An interchangeable lens removably attachable to a camera body that includes a body-side mount and a body-side terminal group, the interchangeable lens comprising:

a lens-side mount that is configured to contact with the body-side mount with the interchangeable lens being attached to the camera body;

a cylindrical portion extending from an inner peripheral edge of the lens-side mount in an optical axis direction of light entering the camera body;

a lens-side terminal group that is disposed inside the cylindrical portion and is configured to contact with the body-side terminal group when the interchangeable lens is attached to the camera body;

a first lens-side projecting portion disposed at an outer circumference side of the lens-side terminal group, the first lens-side projecting portion projecting outwardly from the cylindrical portion and extending in a circumferential direction of the cylindrical portion;

a second lens-side projecting portion; and a third lens-side projecting portion that projects outwardly from the cylindrical portion and extends in the circumferential direction, at least part of the third lens-side projecting portion being disposed at a position facing the first lens-side projecting portion across the optical axis; and a cutout provided at the third lens-side projecting portion in the circumferential direction.

15. An interchangeable lens removably attachable to a camera body that includes a body-side mount and a body-side terminal group, the interchangeable lens comprising:

a lens-side mount that is configured to contact with the body-side mount with the interchangeable lens being attached to the camera body;

a cylindrical portion extending from an inner peripheral edge of the lens-side mount in an optical axis direction of a subject light;

a plurality of lens-side projecting portions (i) projecting outwardly from the cylindrical portion, (ii) extending in a circumferential direction of the cylindrical portion, and (iii) comprising first, second, third, fourth, and fifth lens-side projecting portions, wherein:

of the plurality of lens-side projecting portions:

the fifth lens-side projecting portion has a fifth longest length in the circumferential direction; and the fourth lens-side projecting portion has a fourth longest length in the circumferential direction; and the first lens-side projecting portion is disposed at a position facing at least a part of the fifth lens-side projecting portion and at least a part of the fourth lens-side projecting portion across the optical axis.

16. The interchangeable lens according to claim 14, wherein:

the lens-side terminal group is configured to come into contact with the body-side terminal group that is disposed in an arc shape at an outer periphery side of an image sensor onto which a subject light is incident in the camera body.

17. The interchangeable lens according to claim 14, wherein:

a region at one end in the circumferential direction from the cutout in the third lens-side projecting portion does not face an elastic member that is provided at an image side of a body-side projecting portion projecting inwardly from the body-side mount when the interchangeable lens is attached to the camera body; and a region at another end in the circumferential direction from the cutout in the third lens-side projecting portion faces the elastic member when the interchangeable lens is attached to the camera body.

* * * * *